T. H. SEELY.
LASTING MACHINE.
APPLICATION FILED MAR.
945,891.
Patented Jan. 4, 1910.
26 SHEETS—SHEET 17.
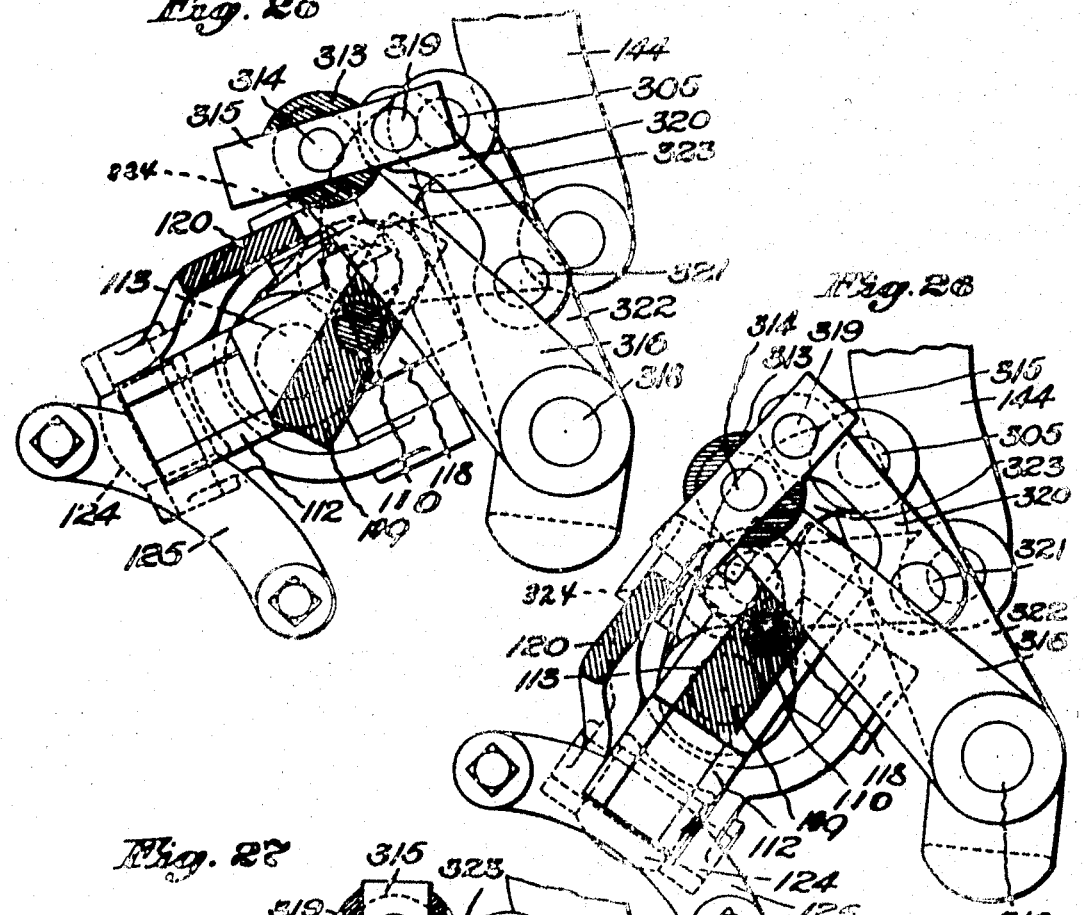
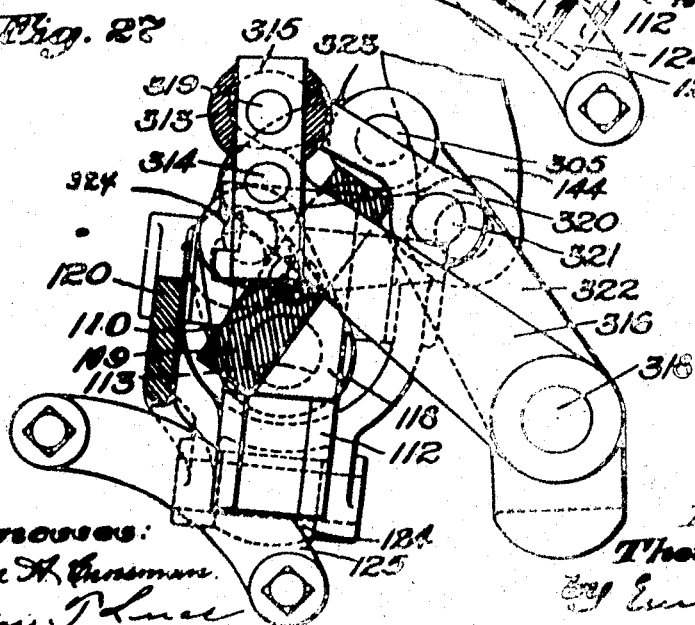
Witnesses:
Horace W. Cushman
Edwin T. Luce
Inventor:
Thomas H. Seely
By Emery Booth
Attys.

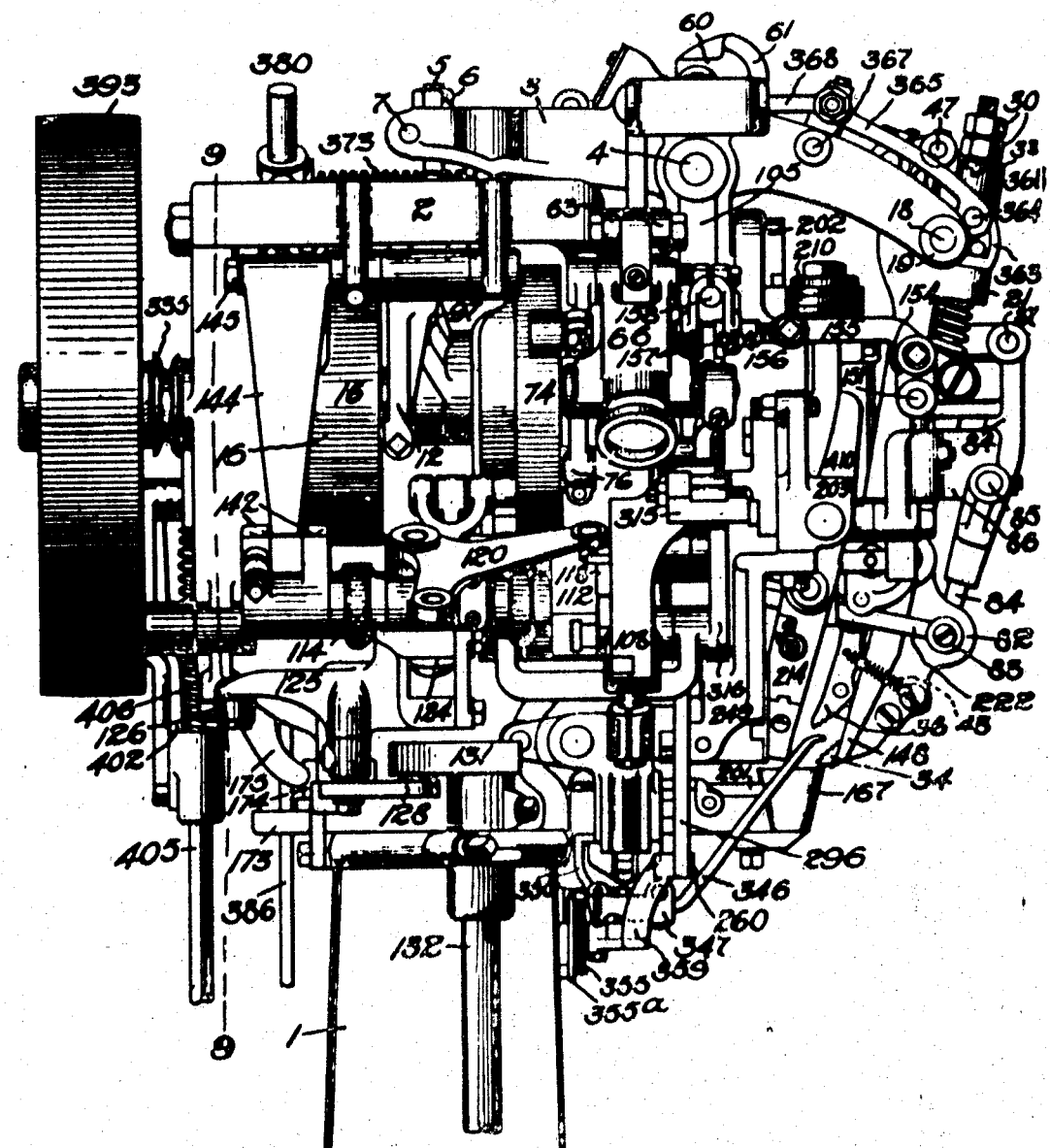

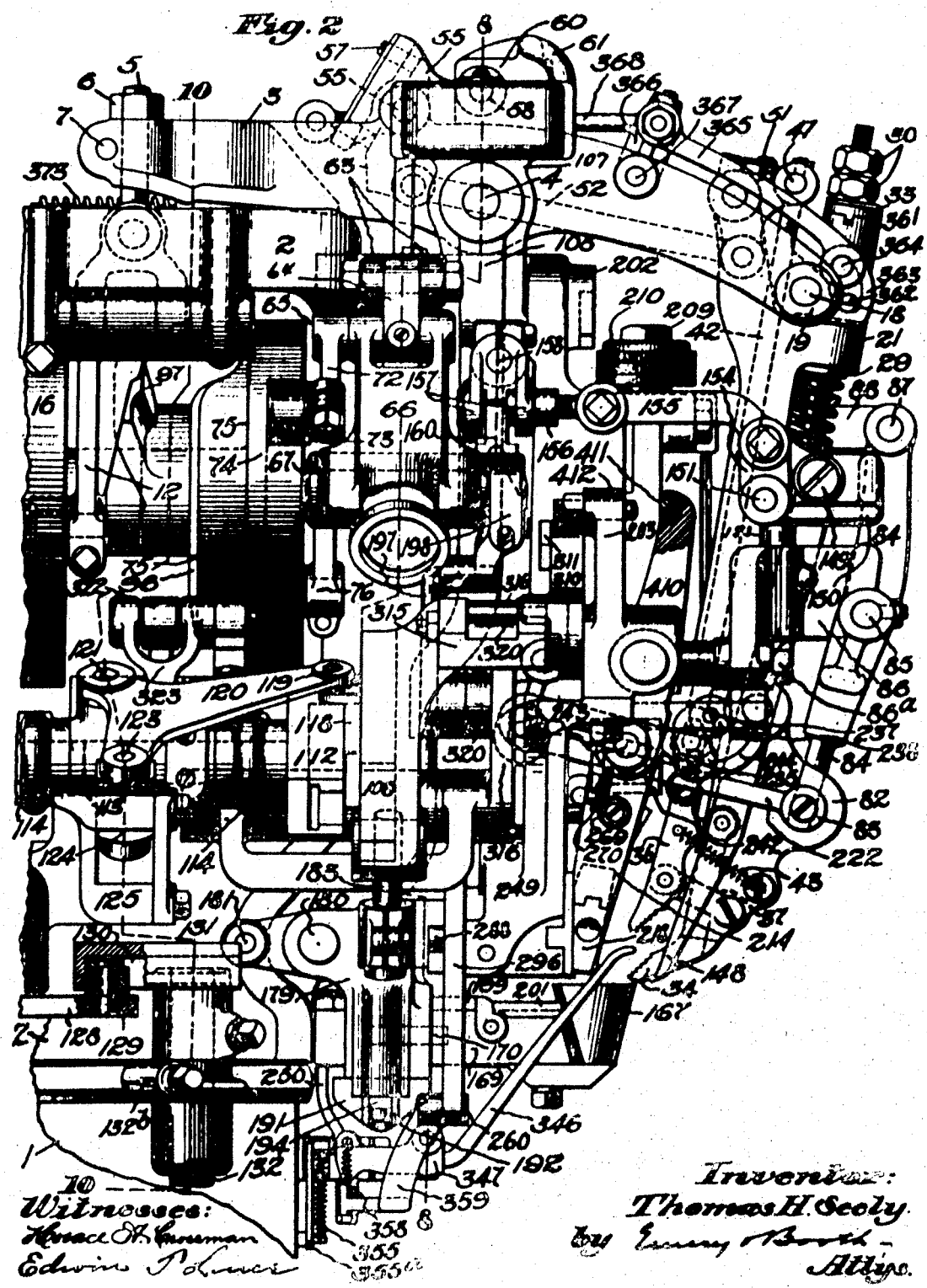

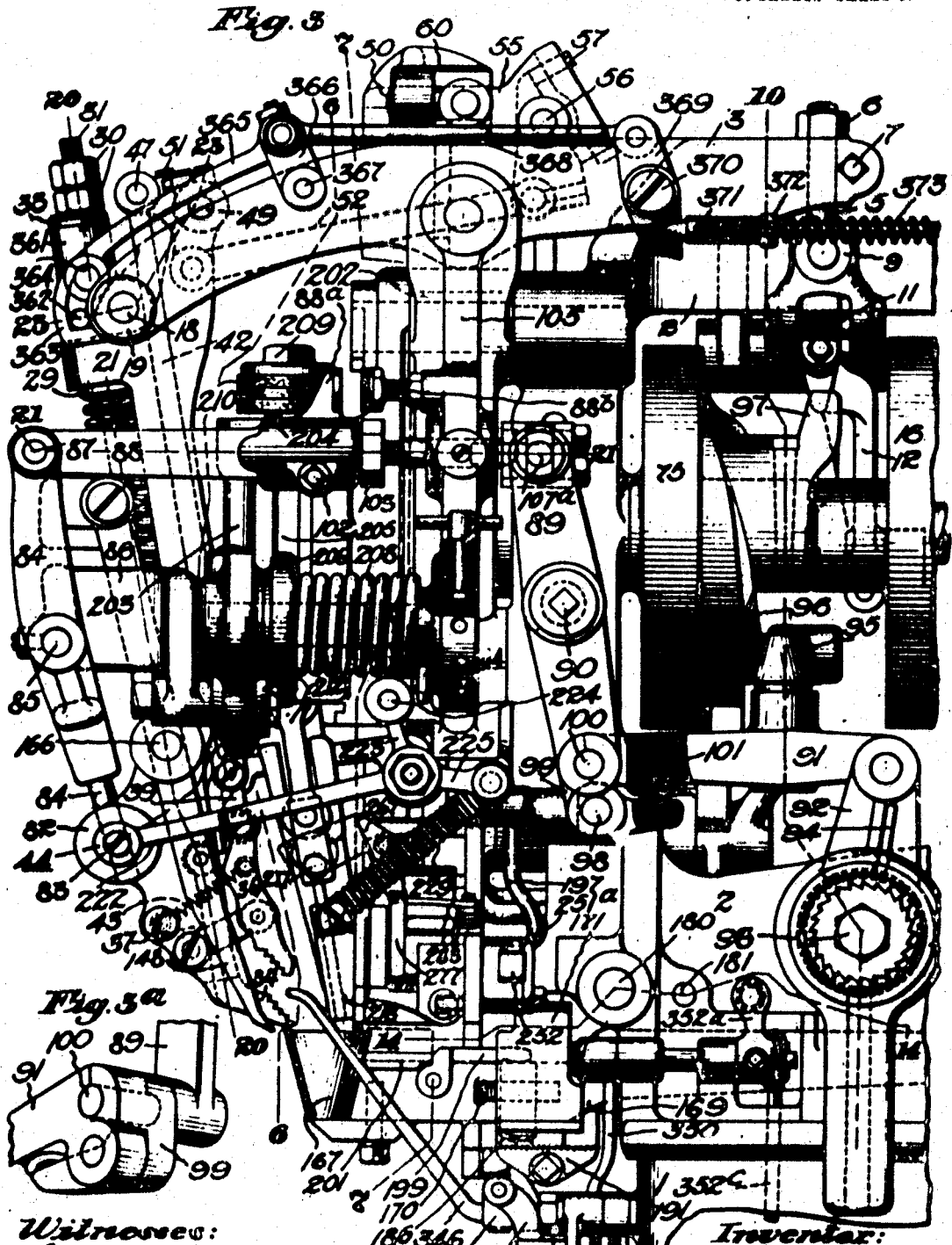

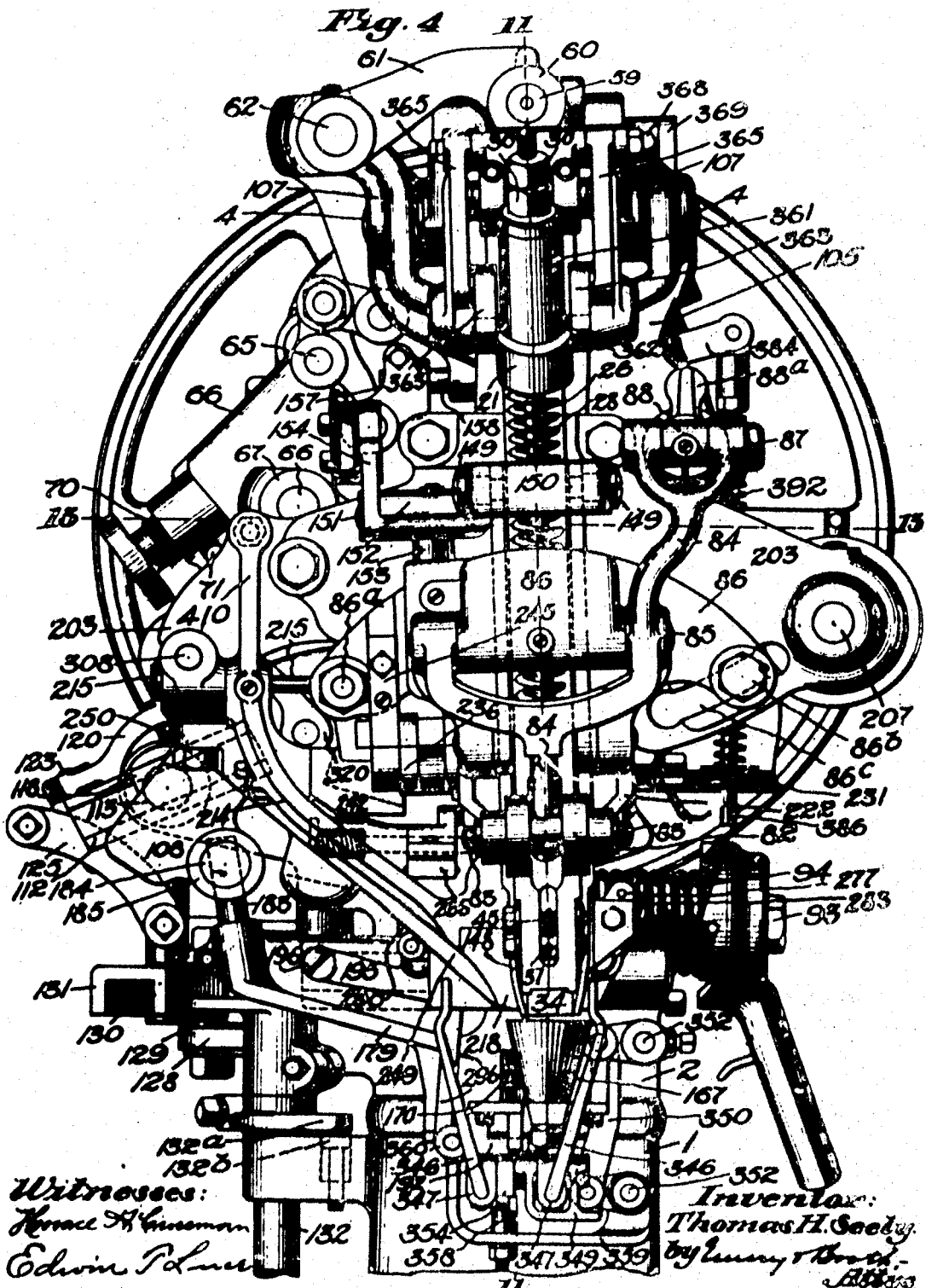

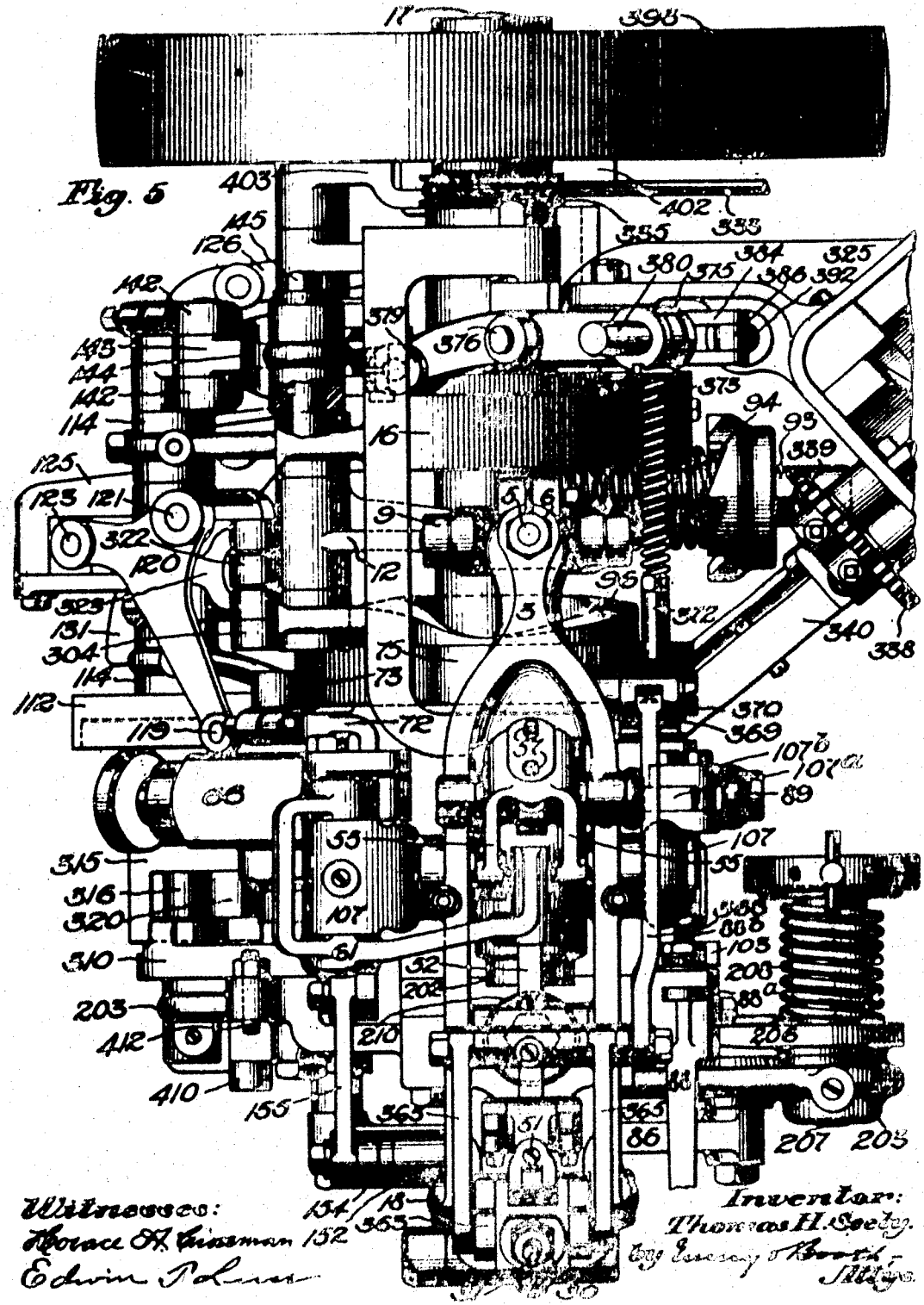

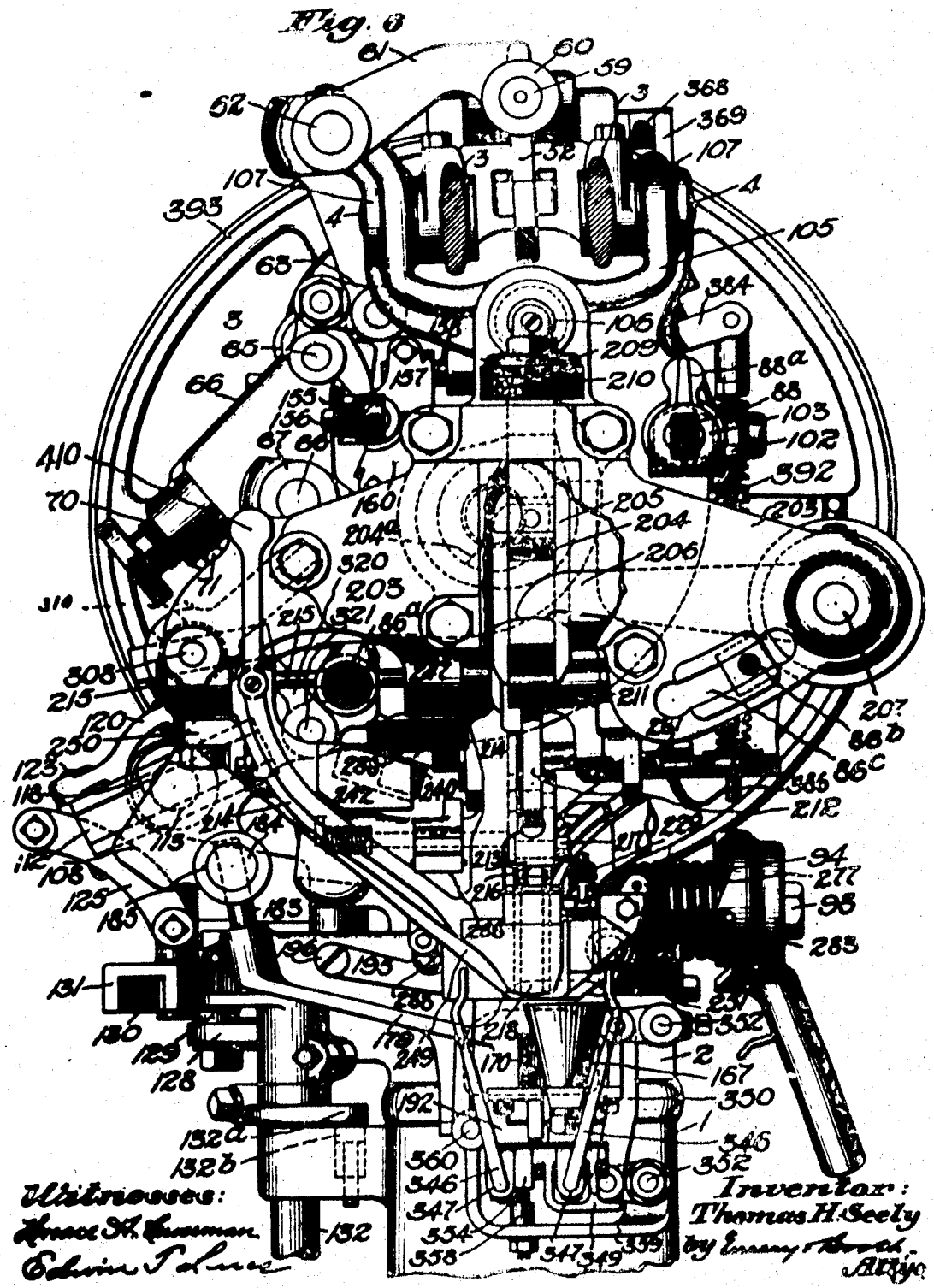

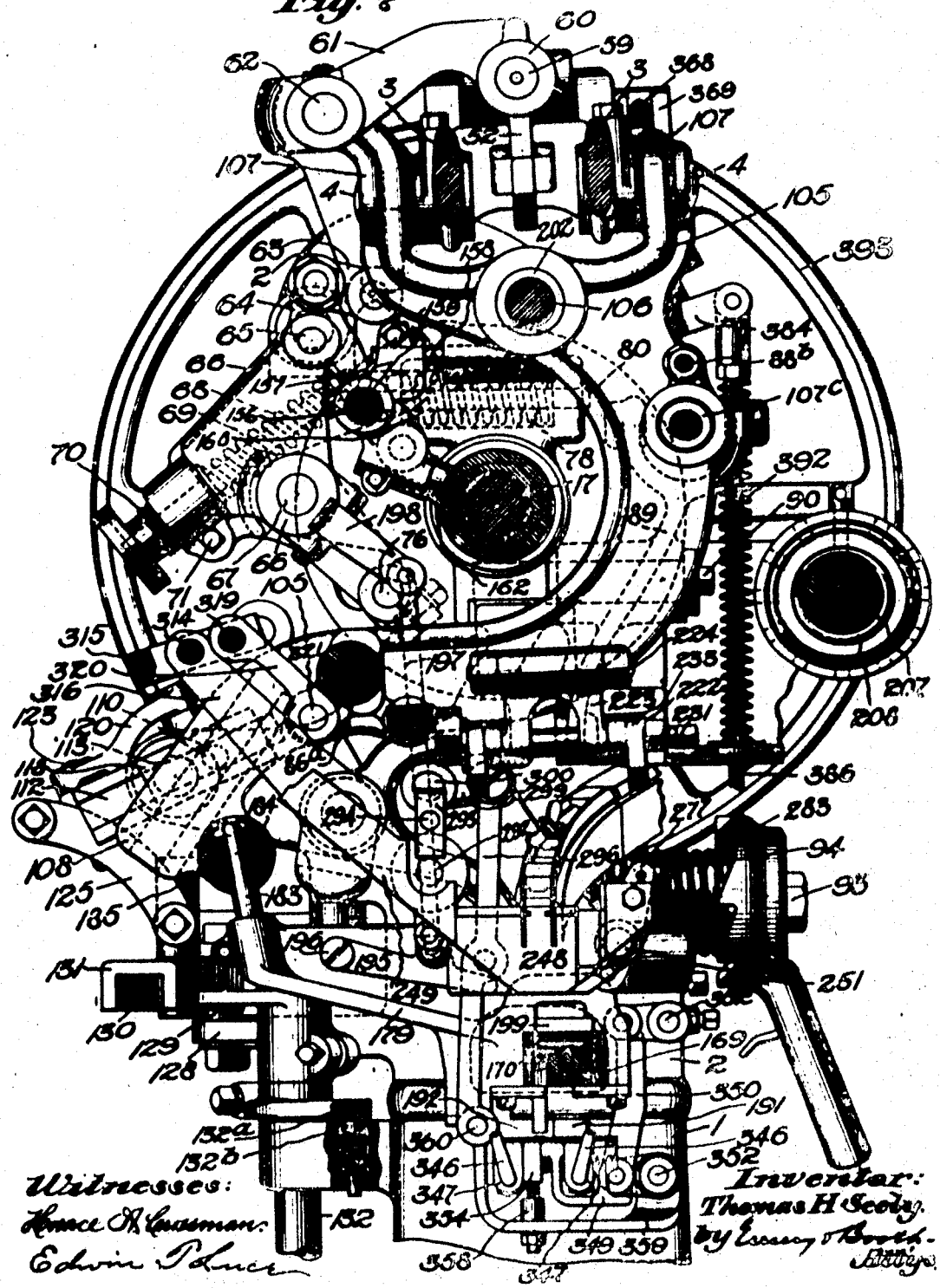

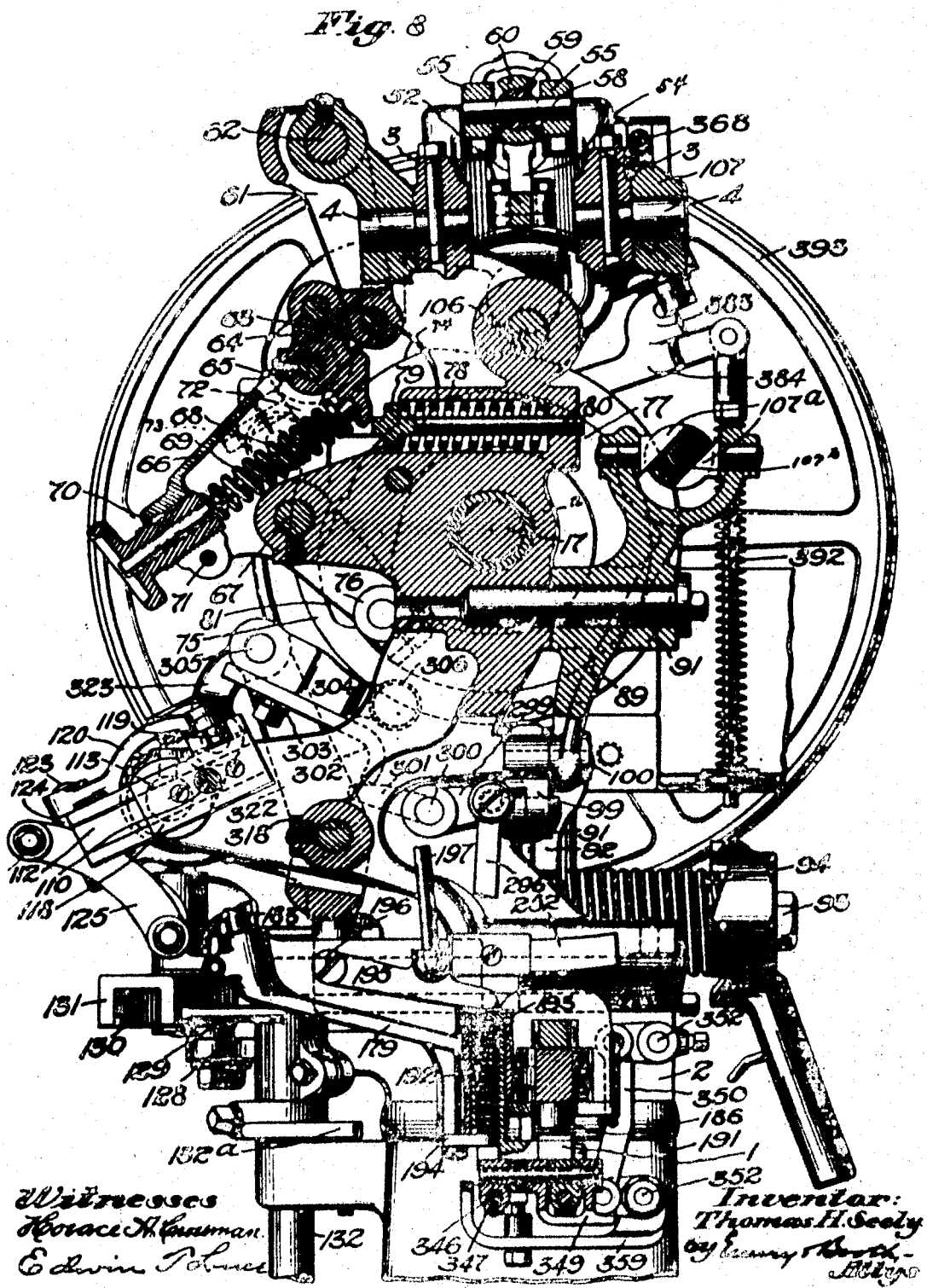

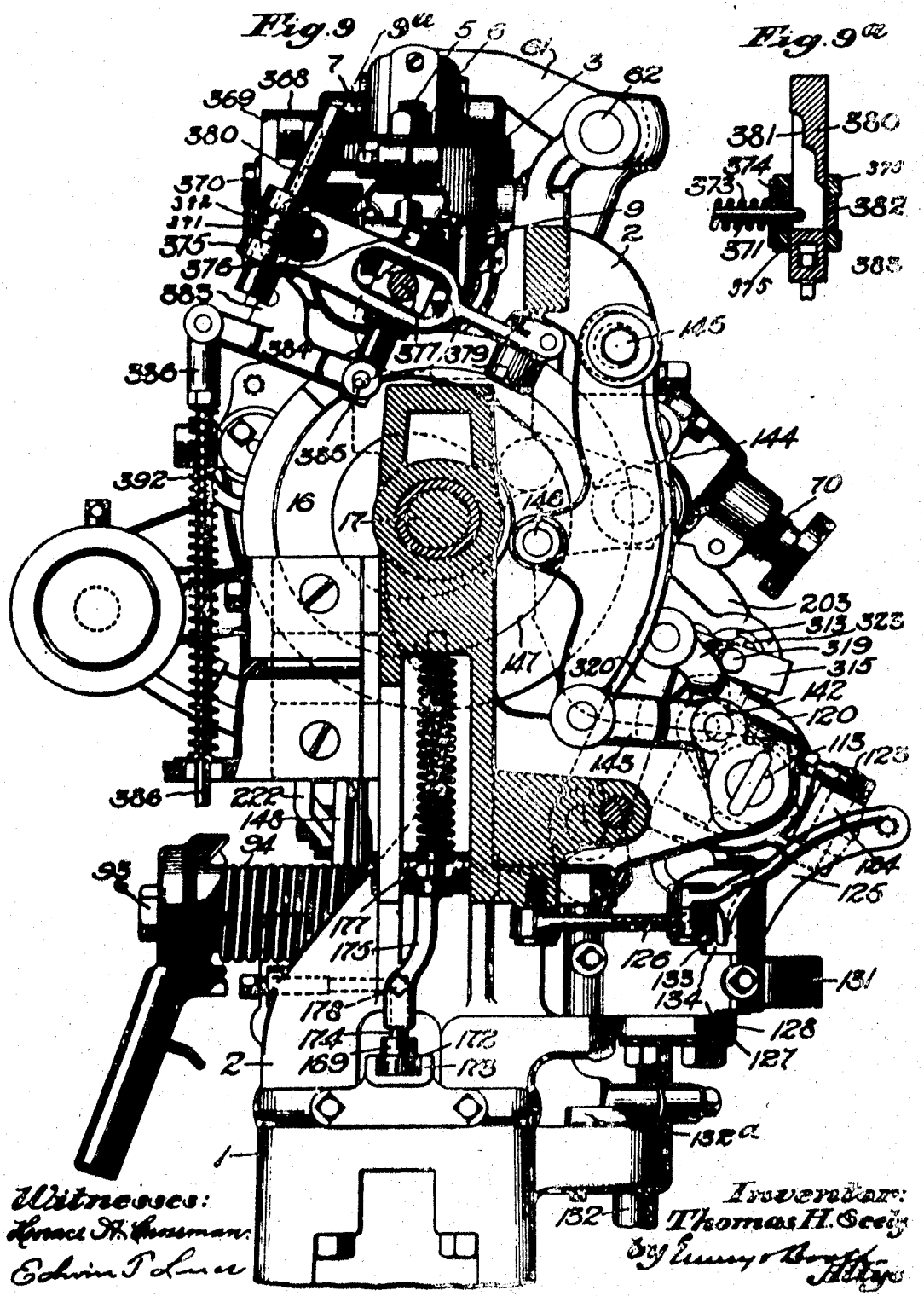

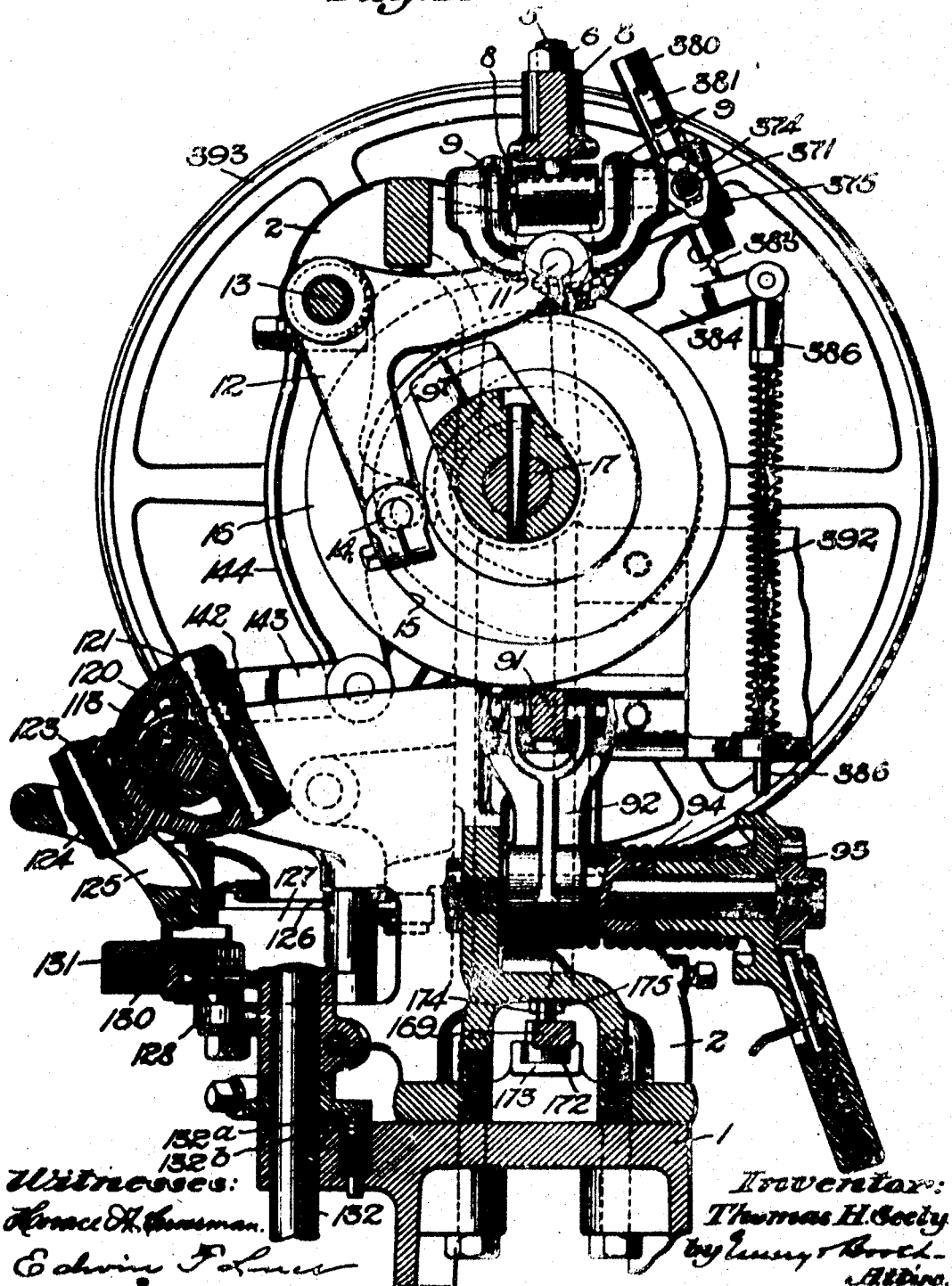

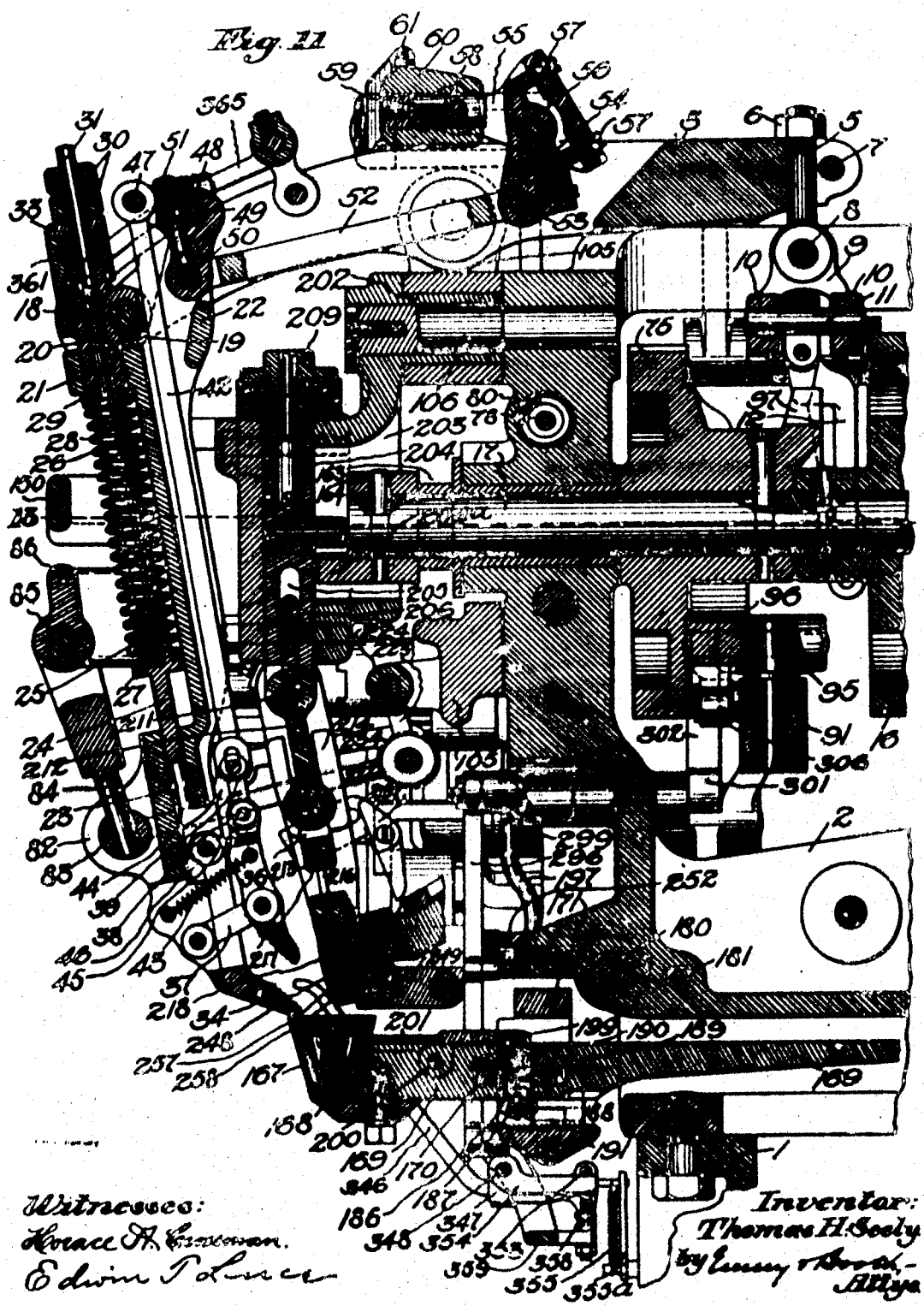

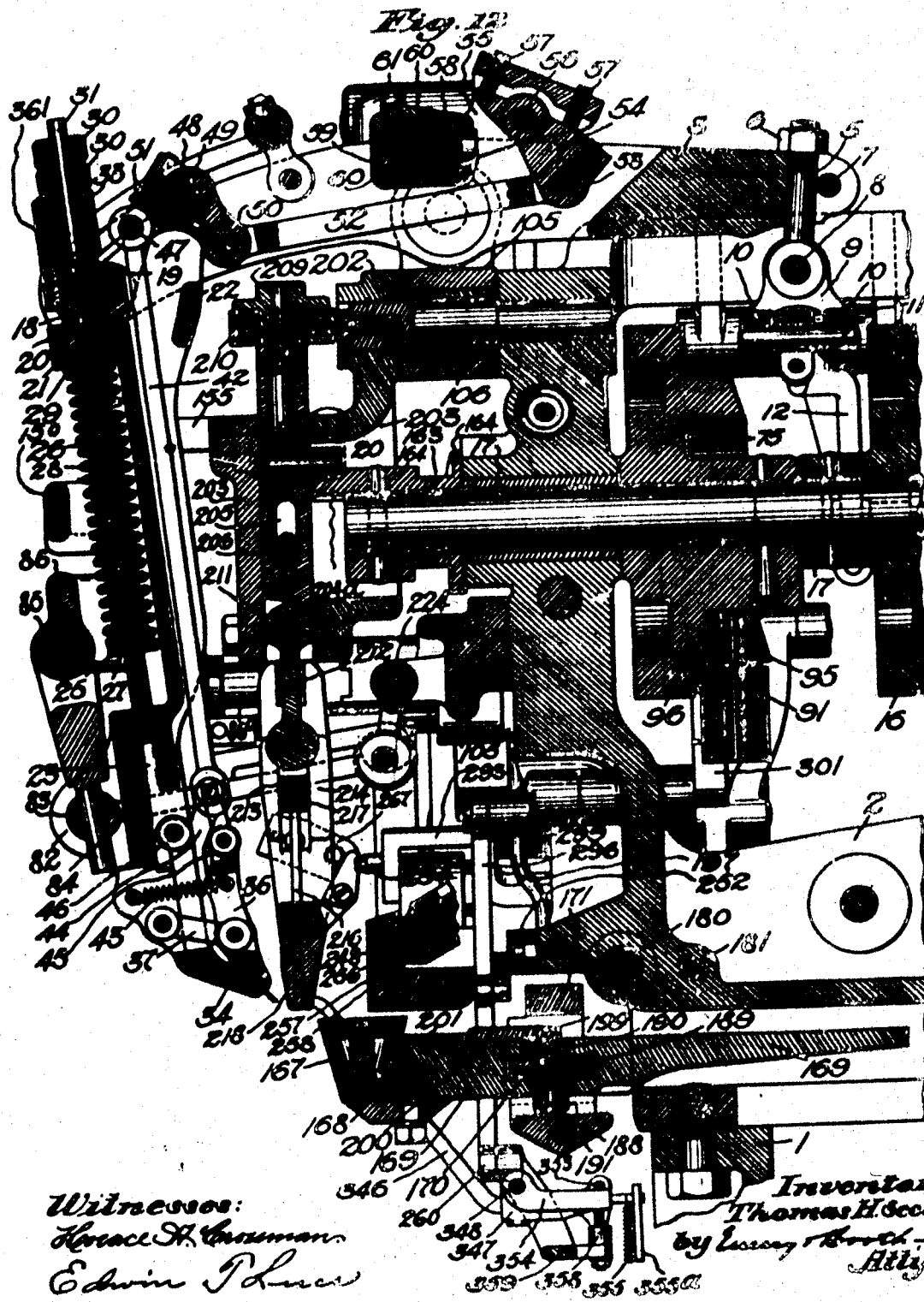

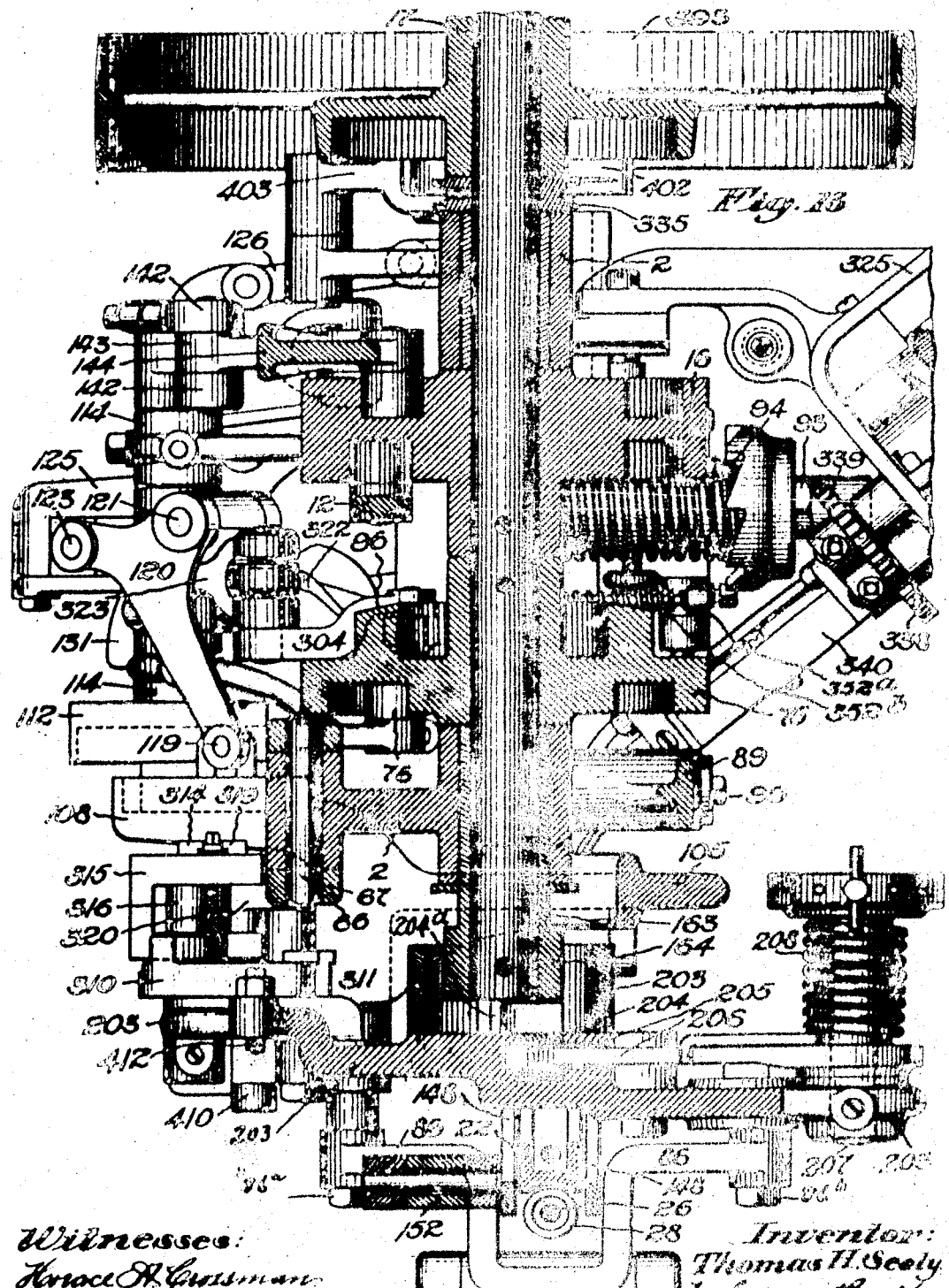

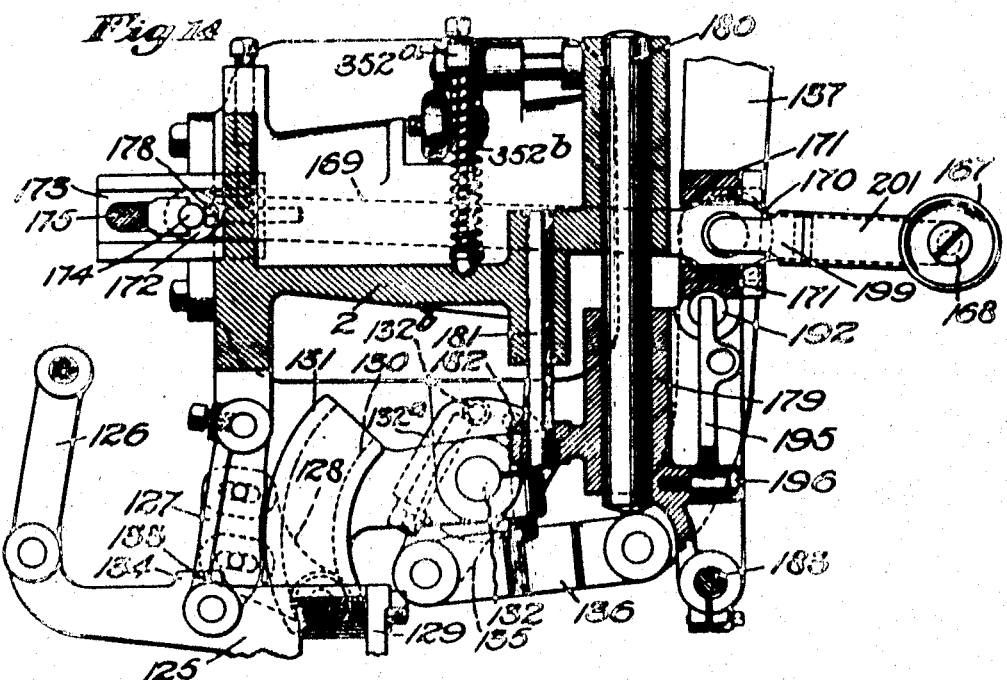
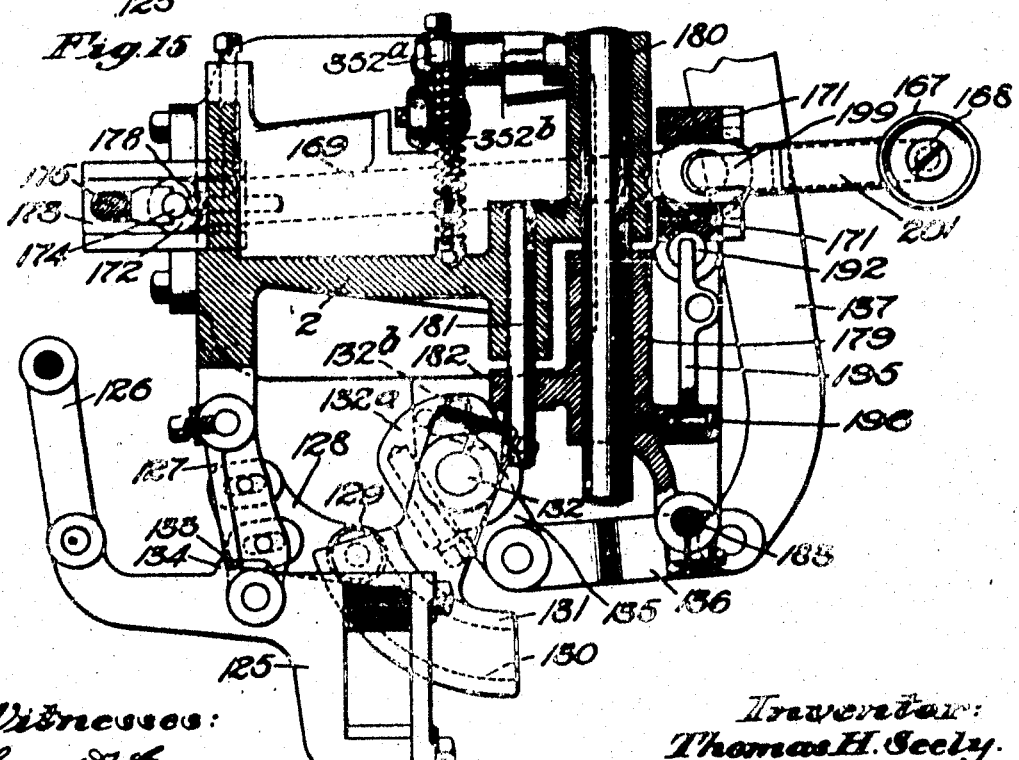

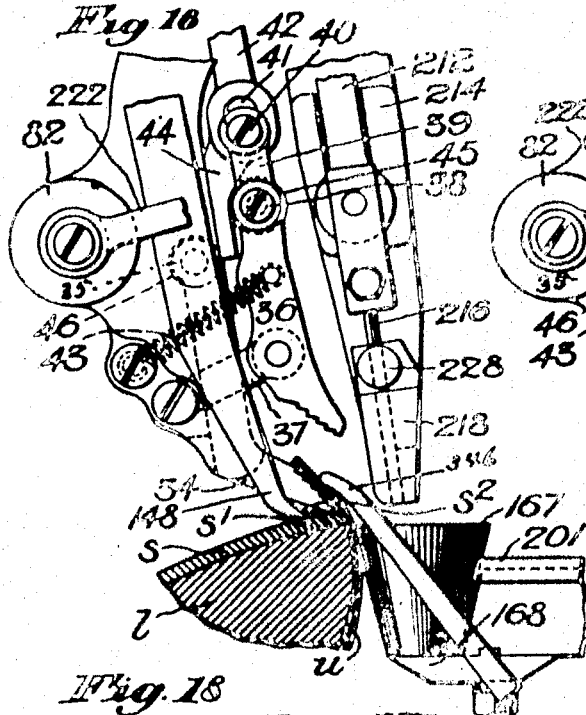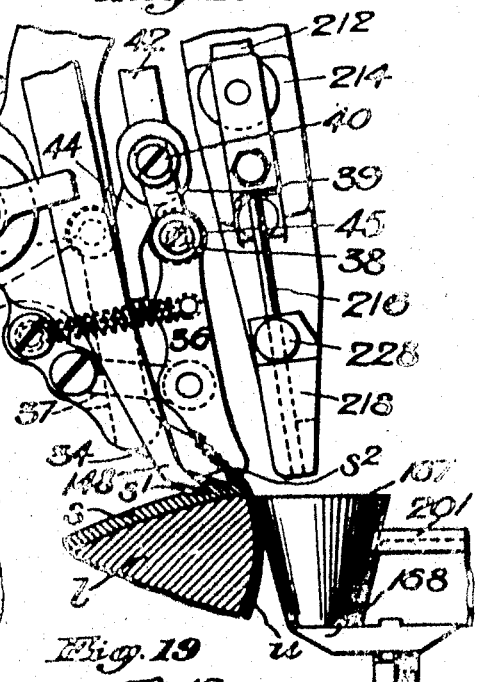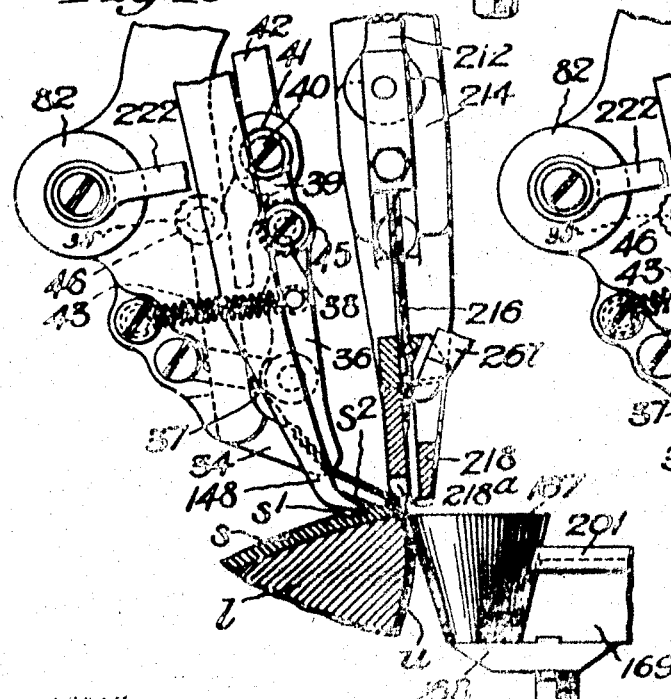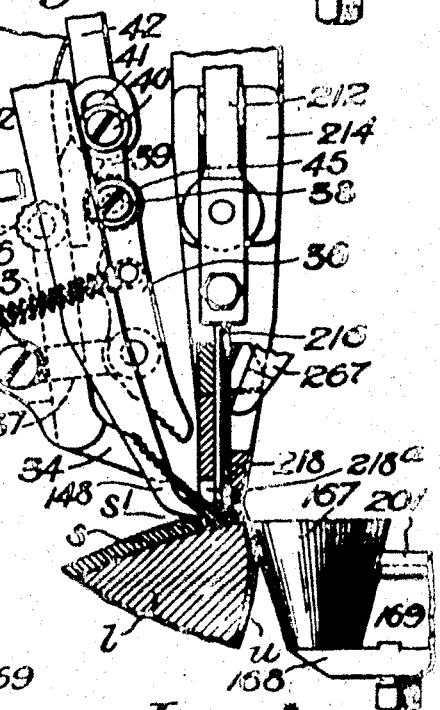

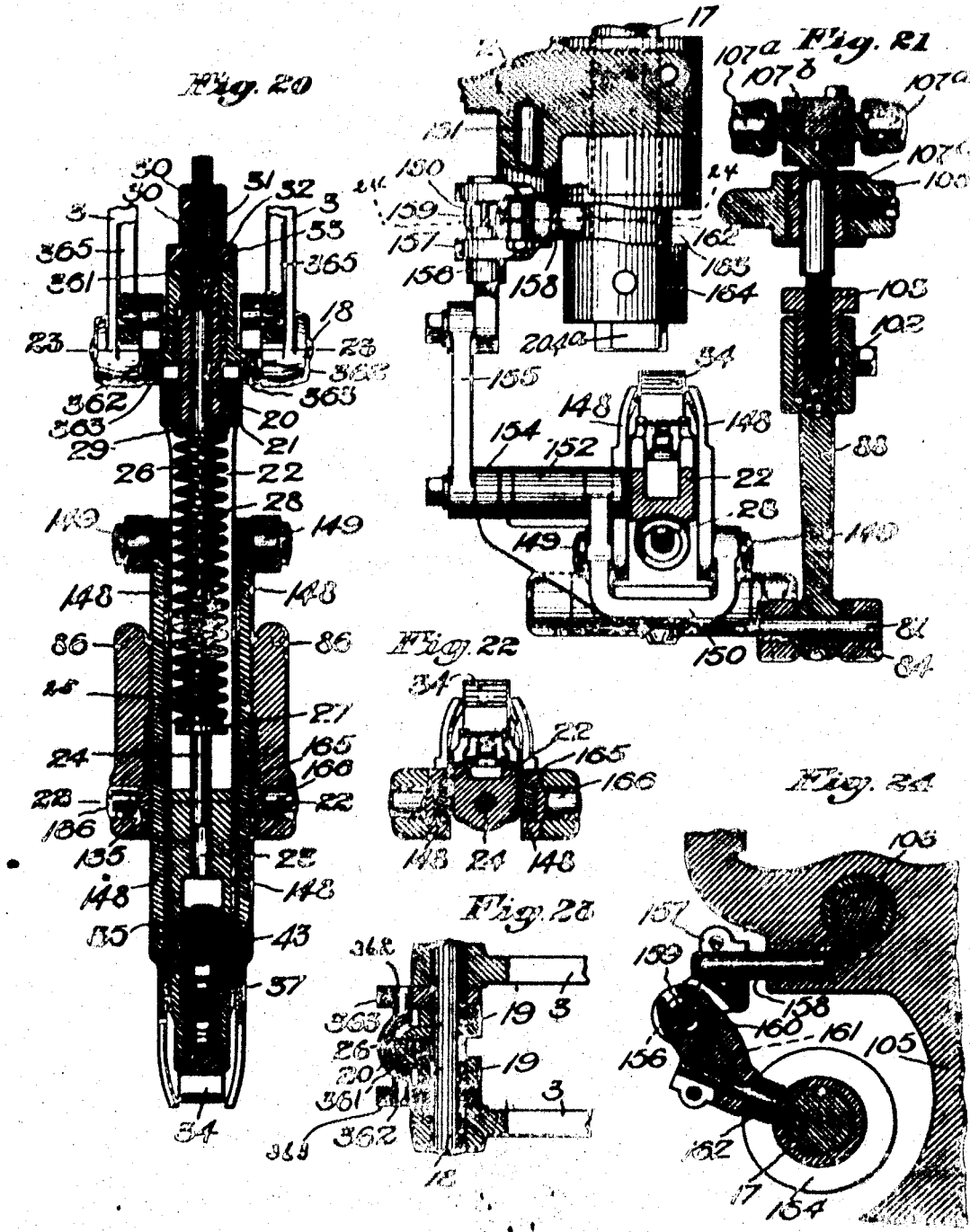

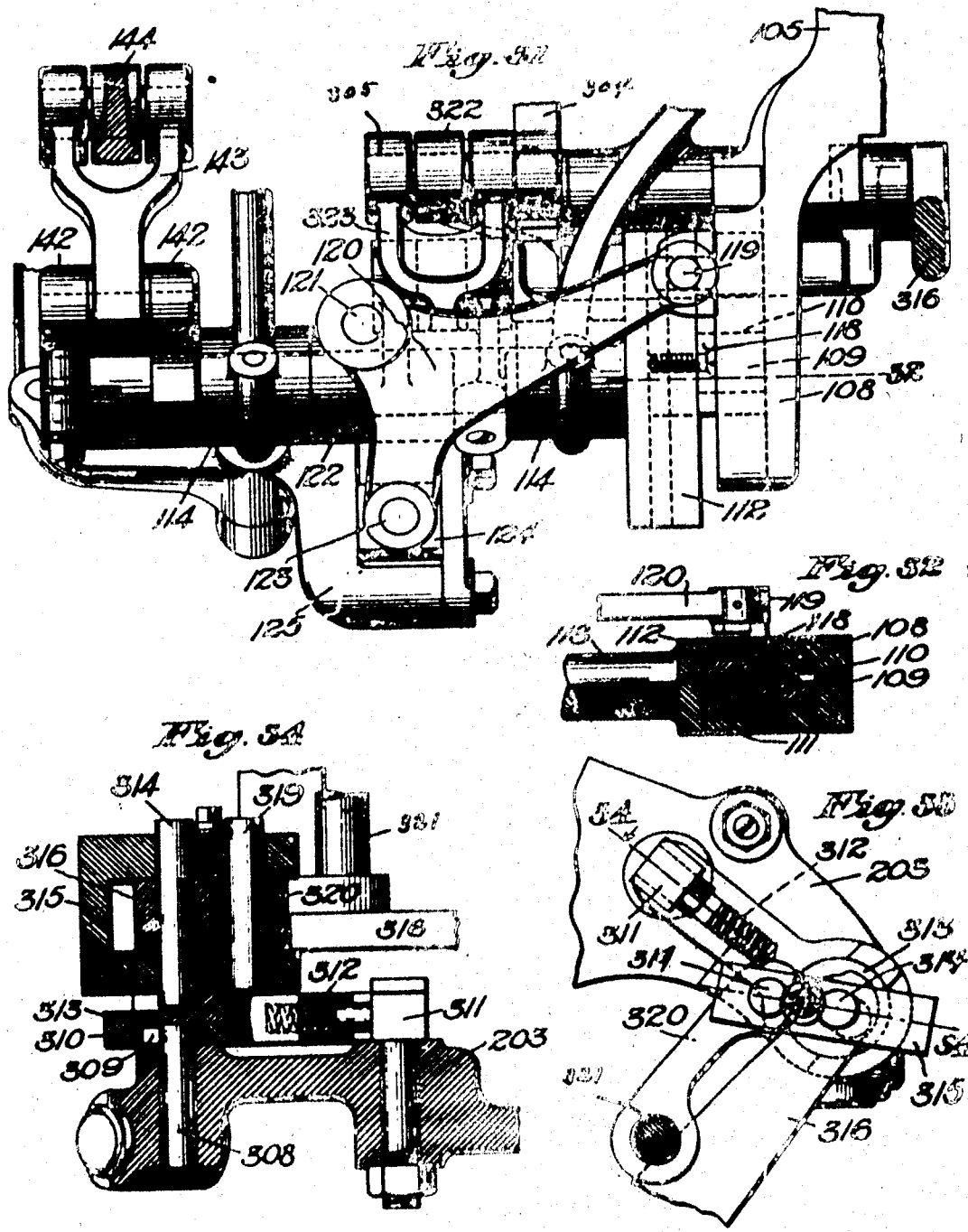

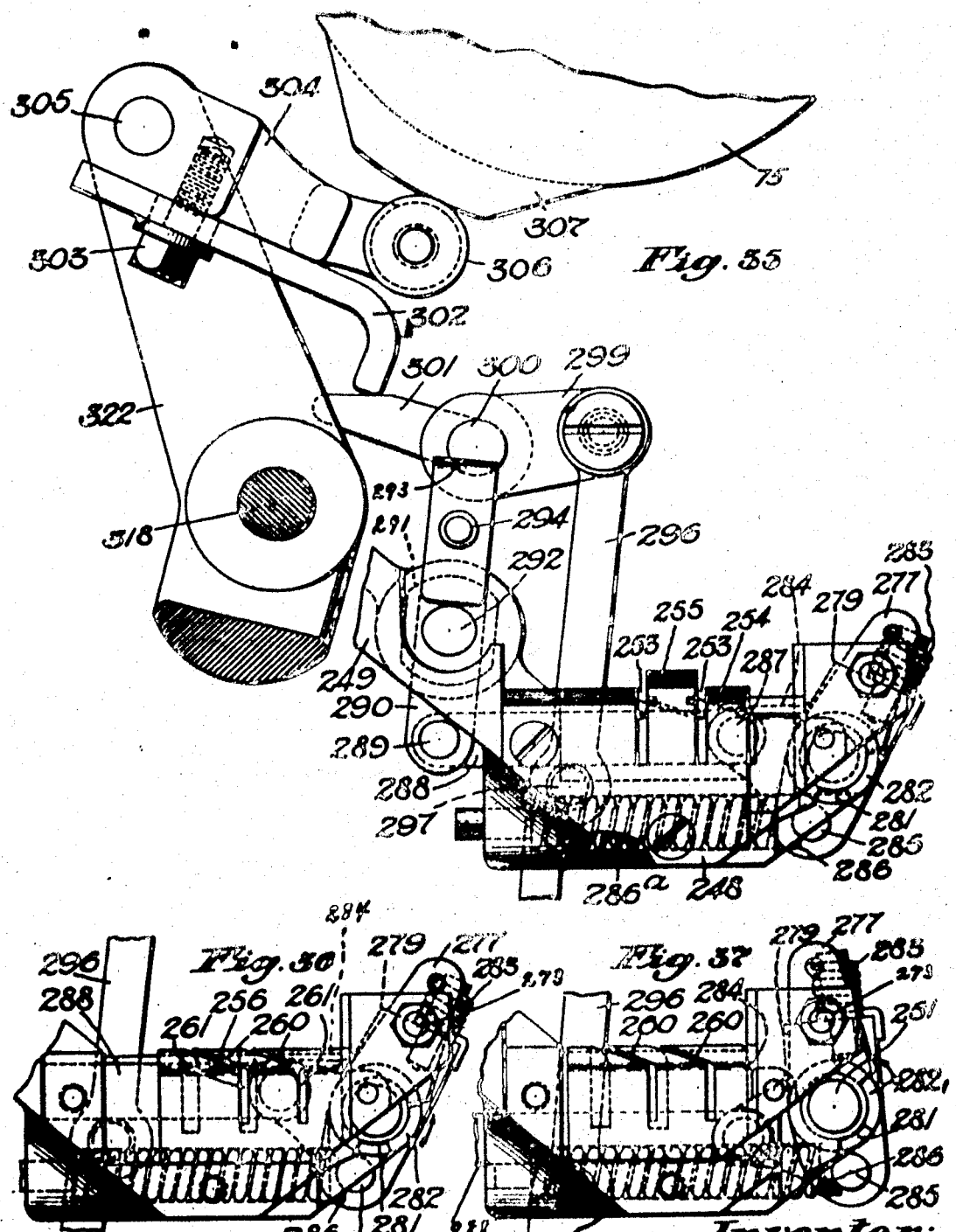

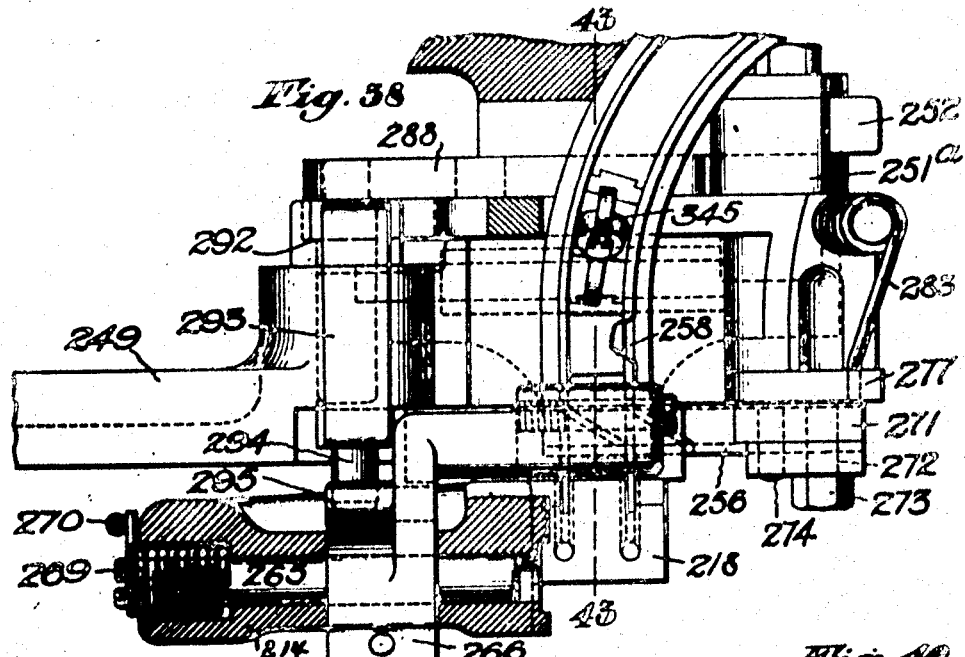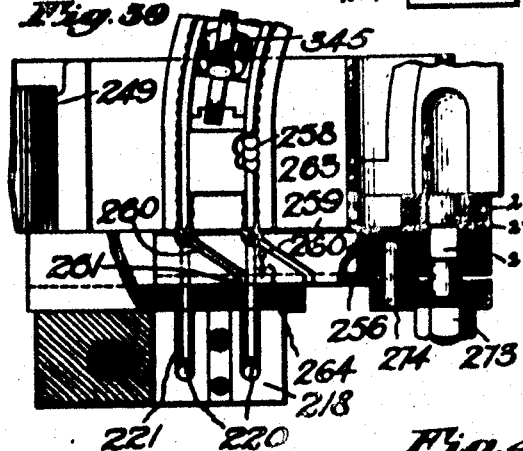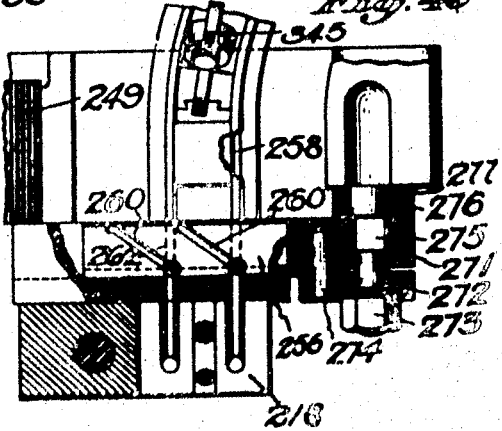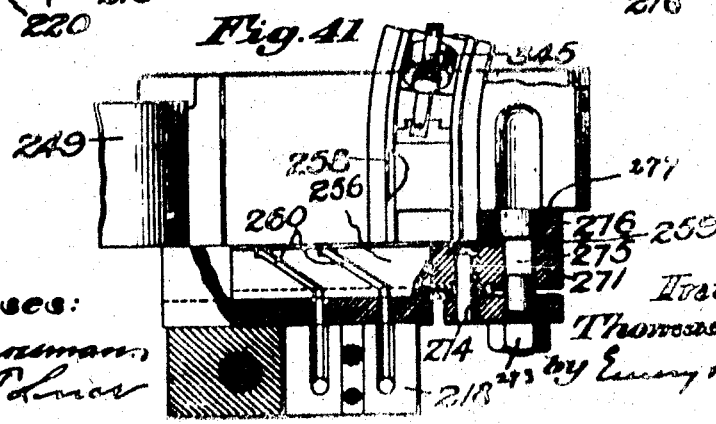

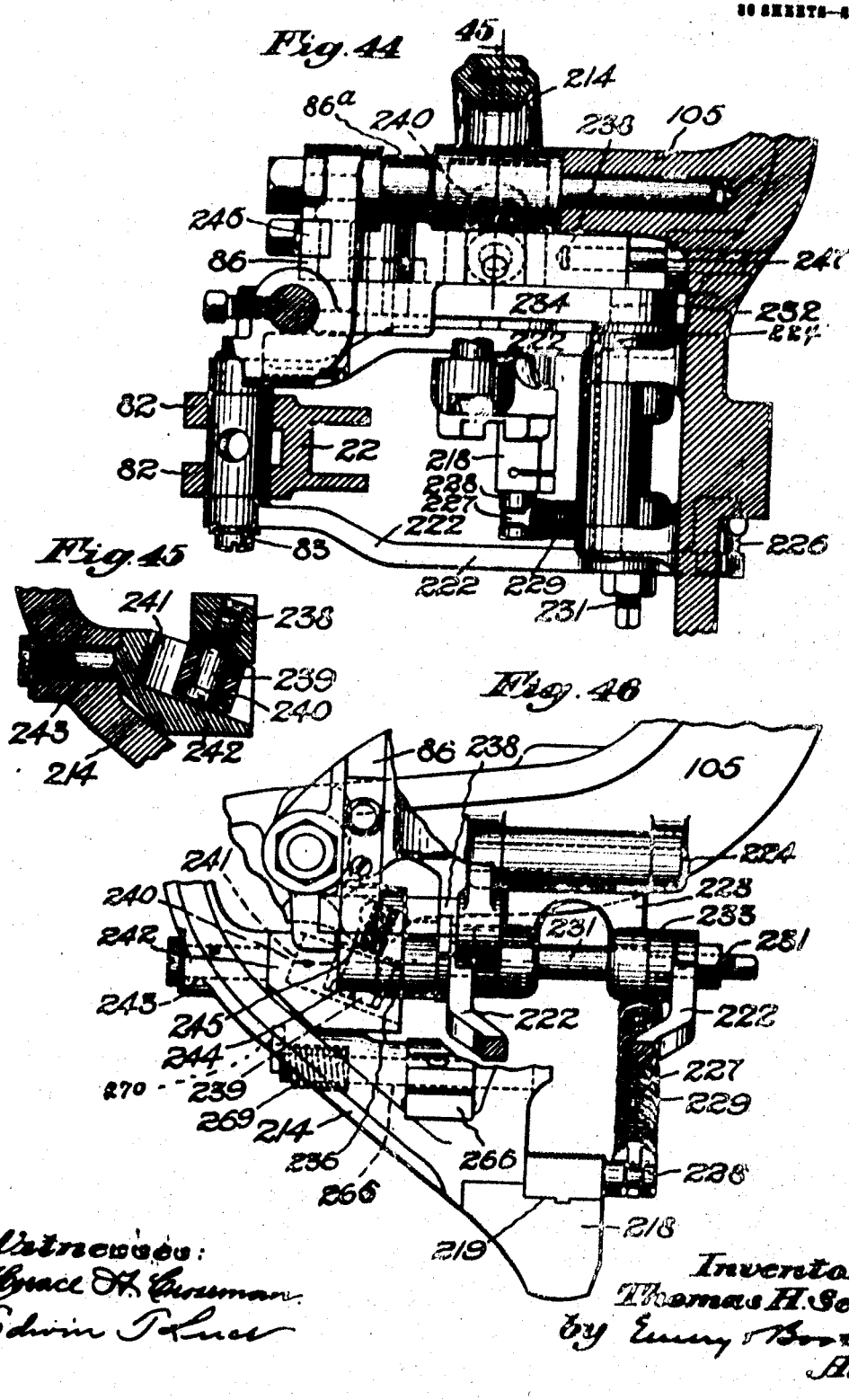

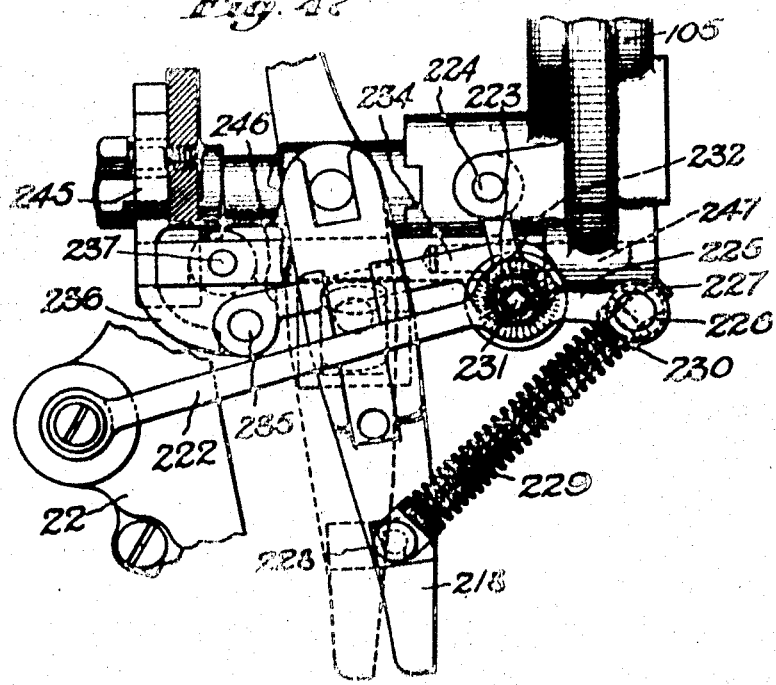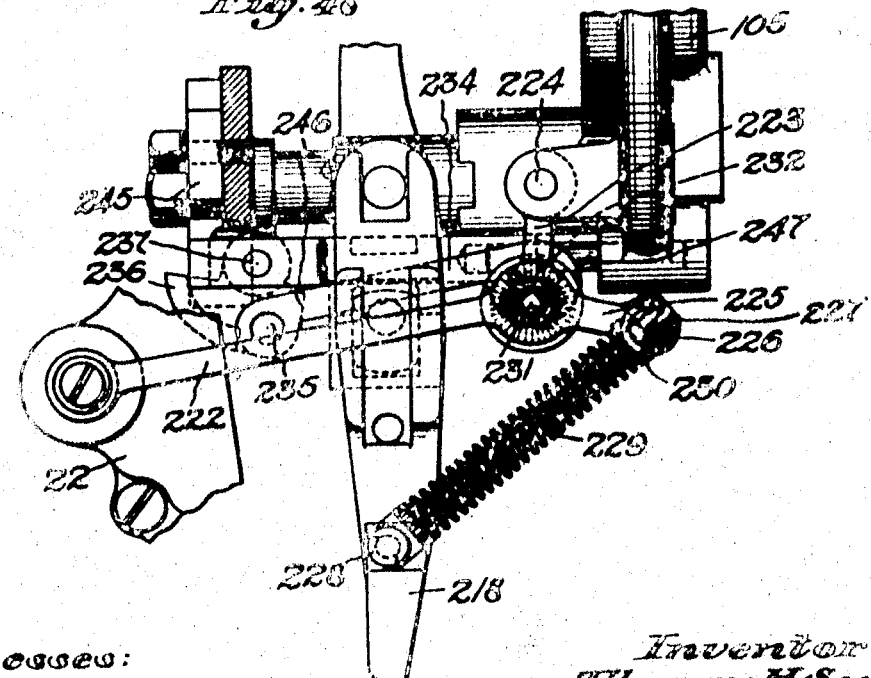

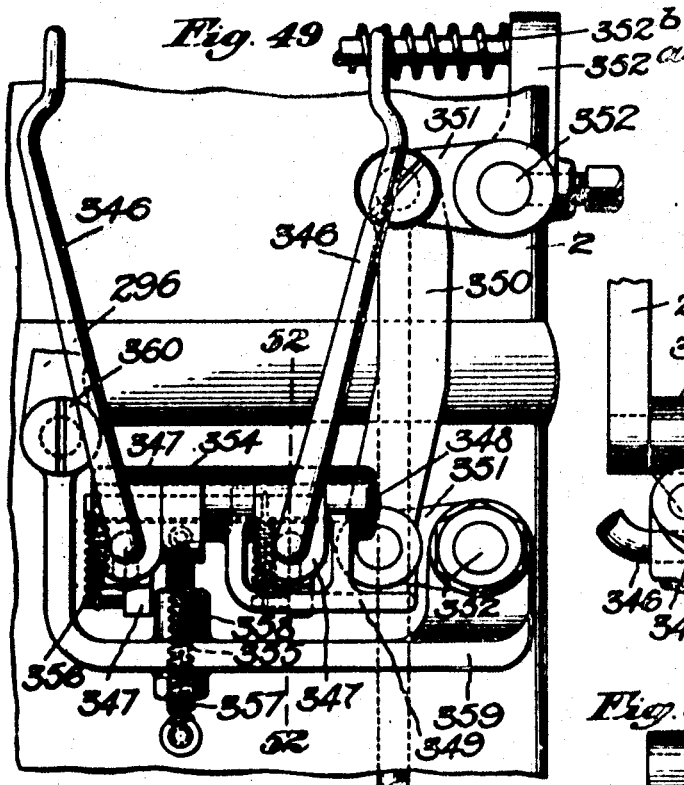

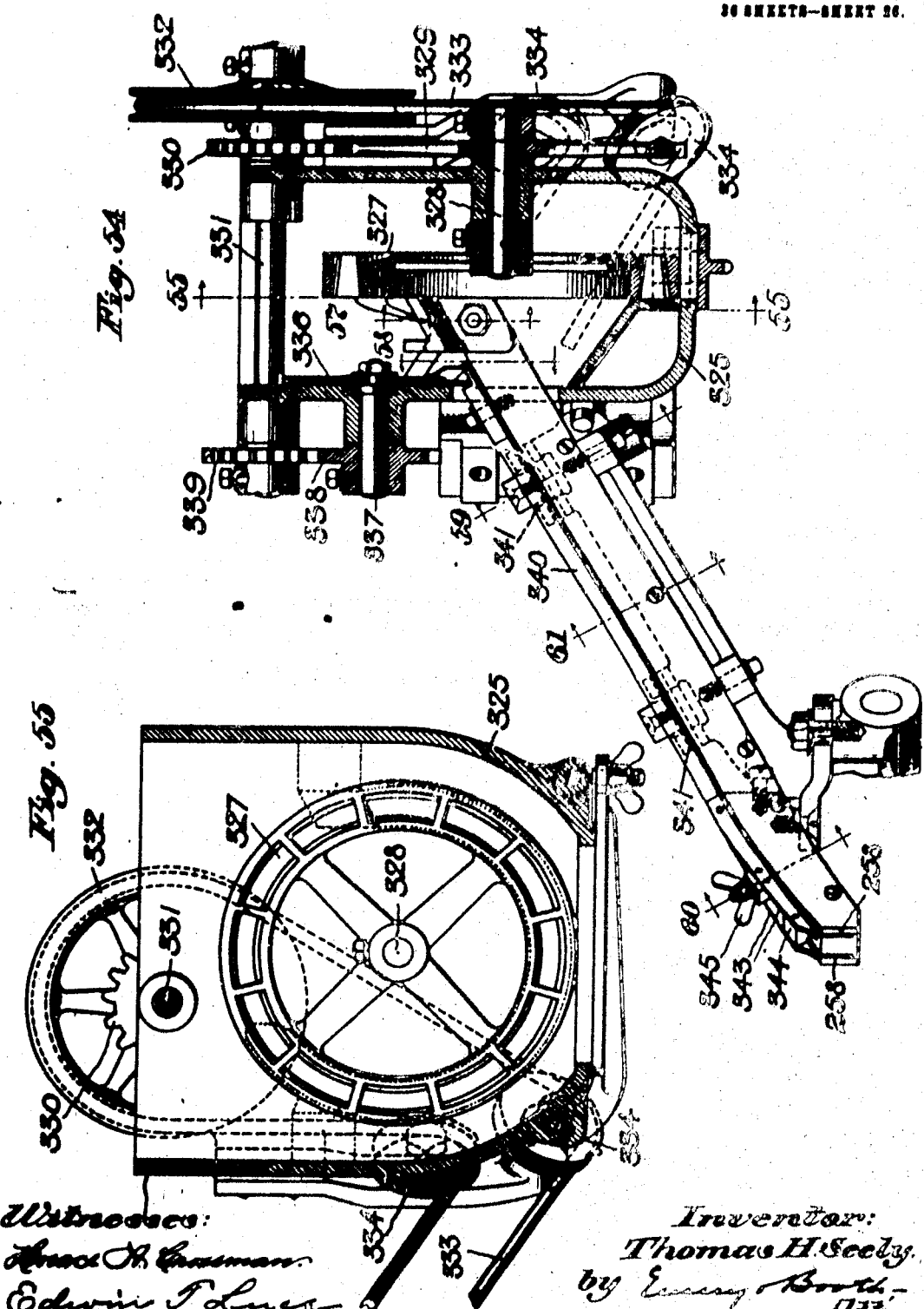

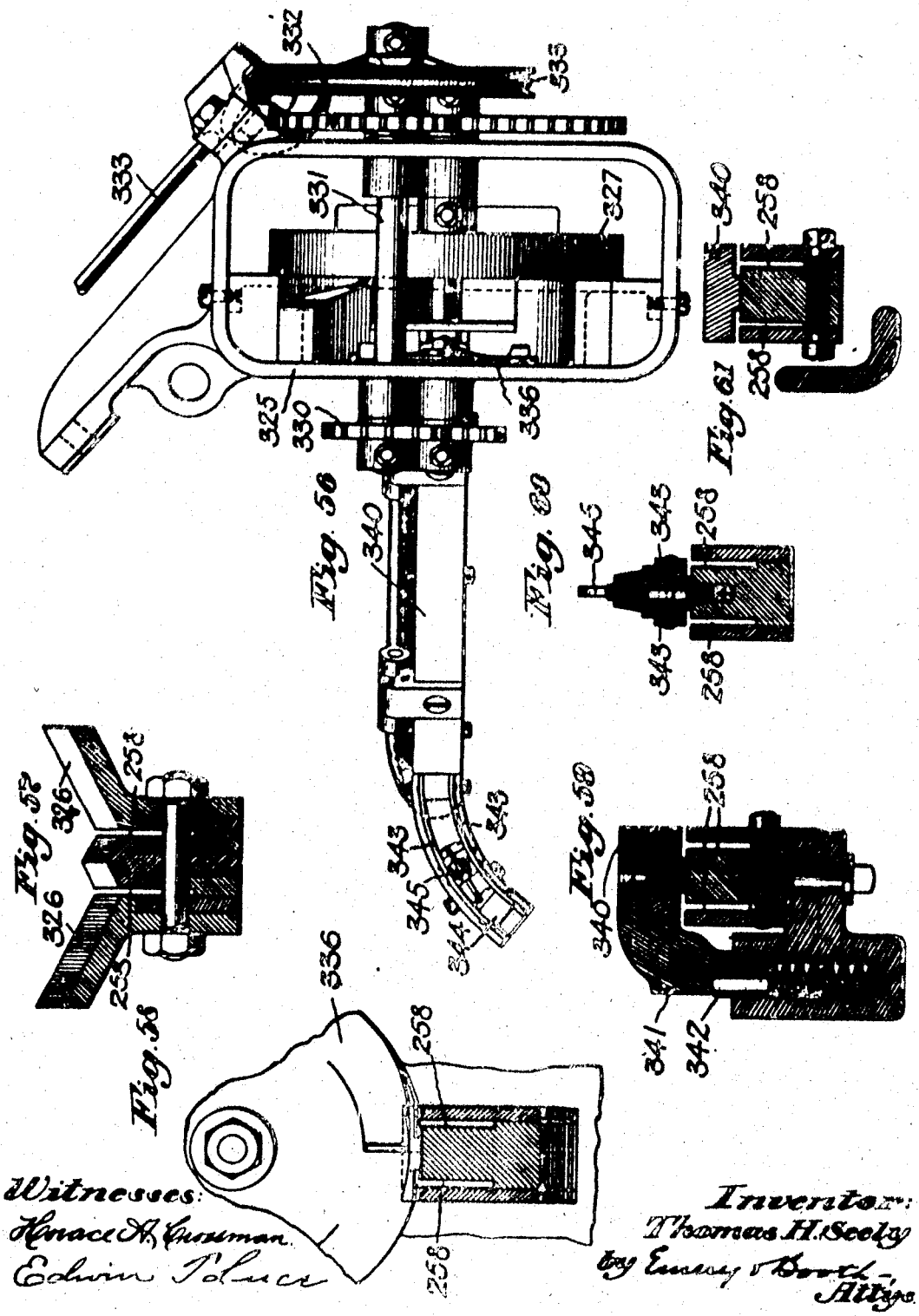

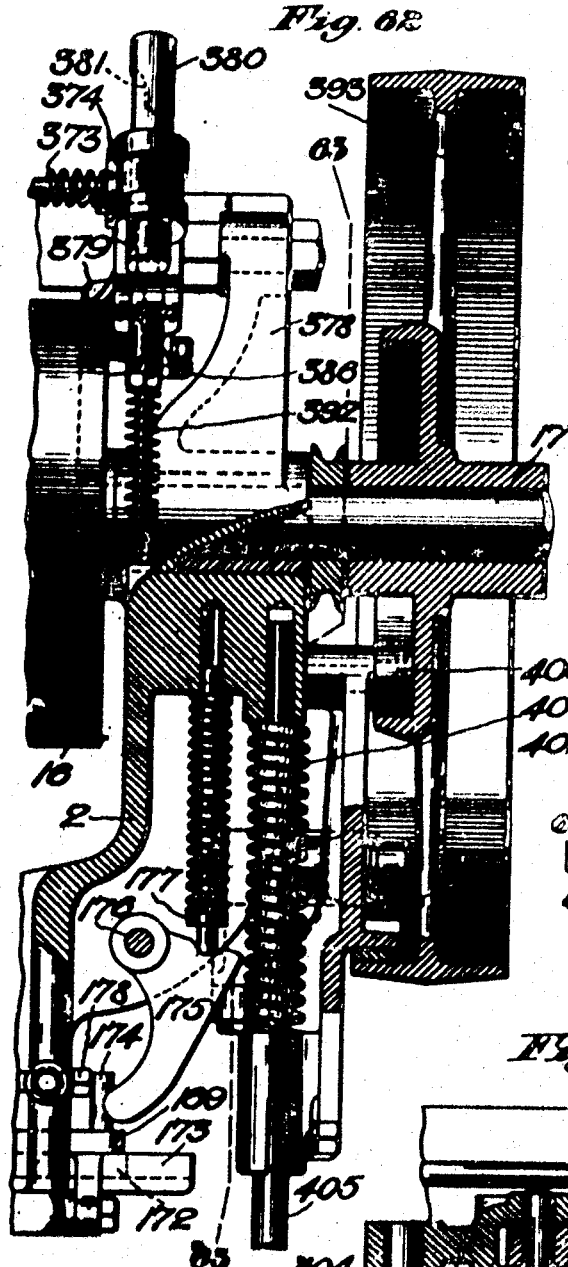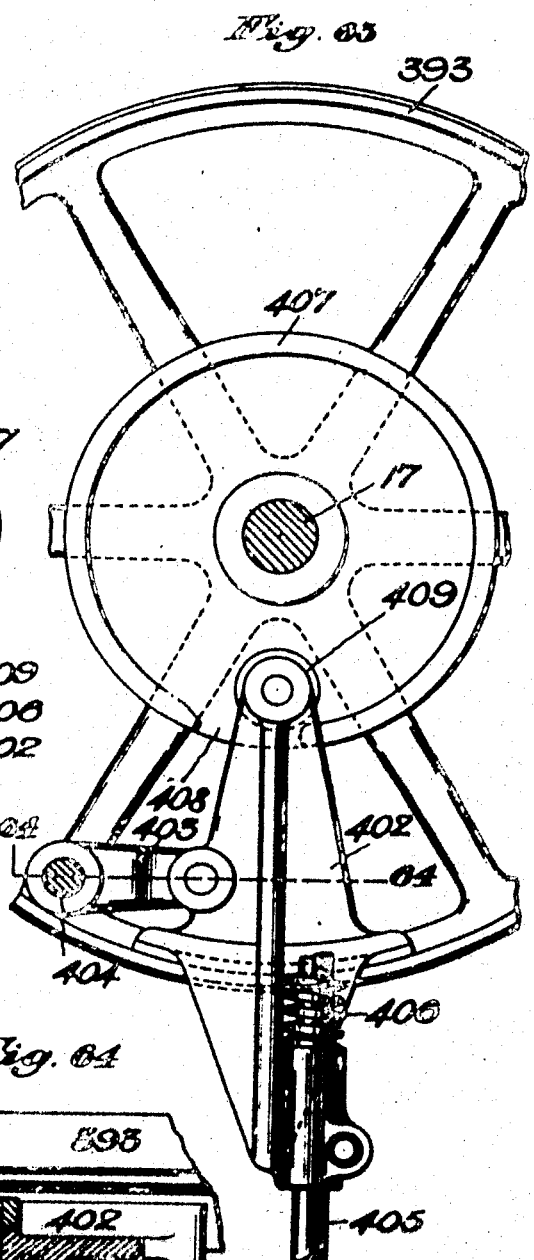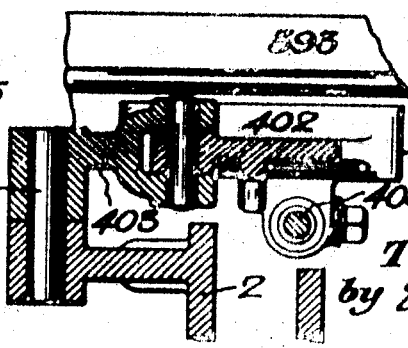

T. H. SEELY
LASTING MACHINE.
APPLICATION FILED MAR. 18, 1907.

945,291.

Patented Jan. 4, 1910.
16 SHEETS—SHEET 10.

Witnesses:
Horace W. Chapman
Edwin T. Luce

Inventor.
Thomas H. Seely
by Emery & Booth
Attys

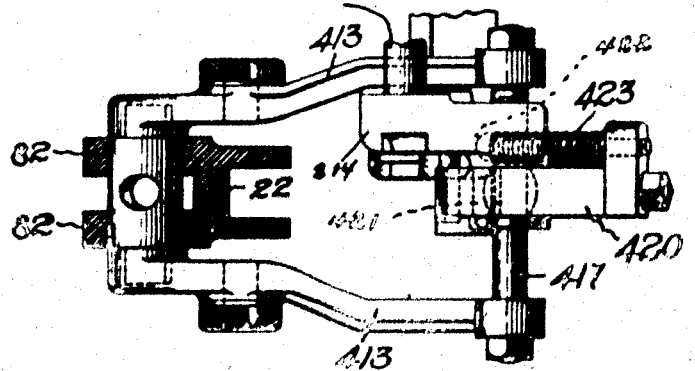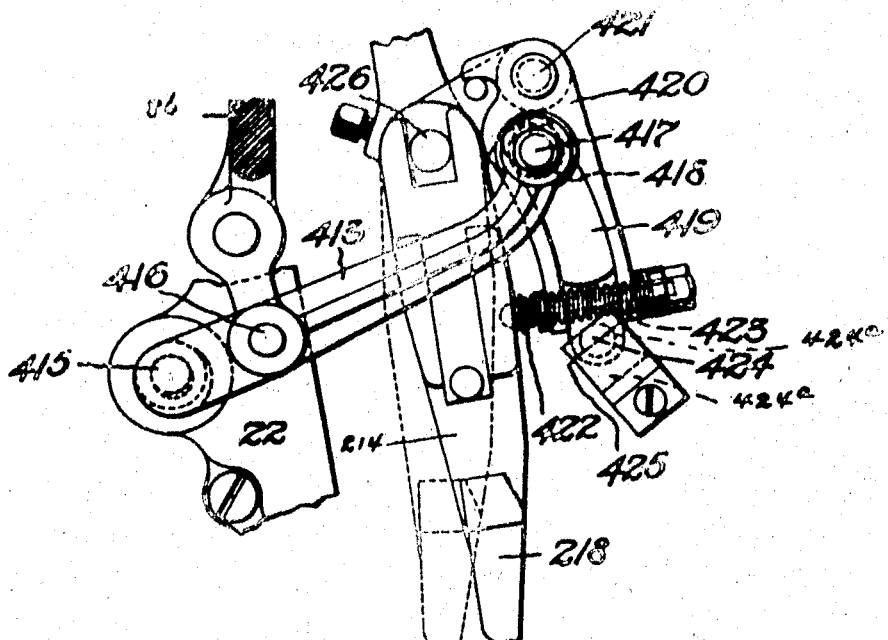

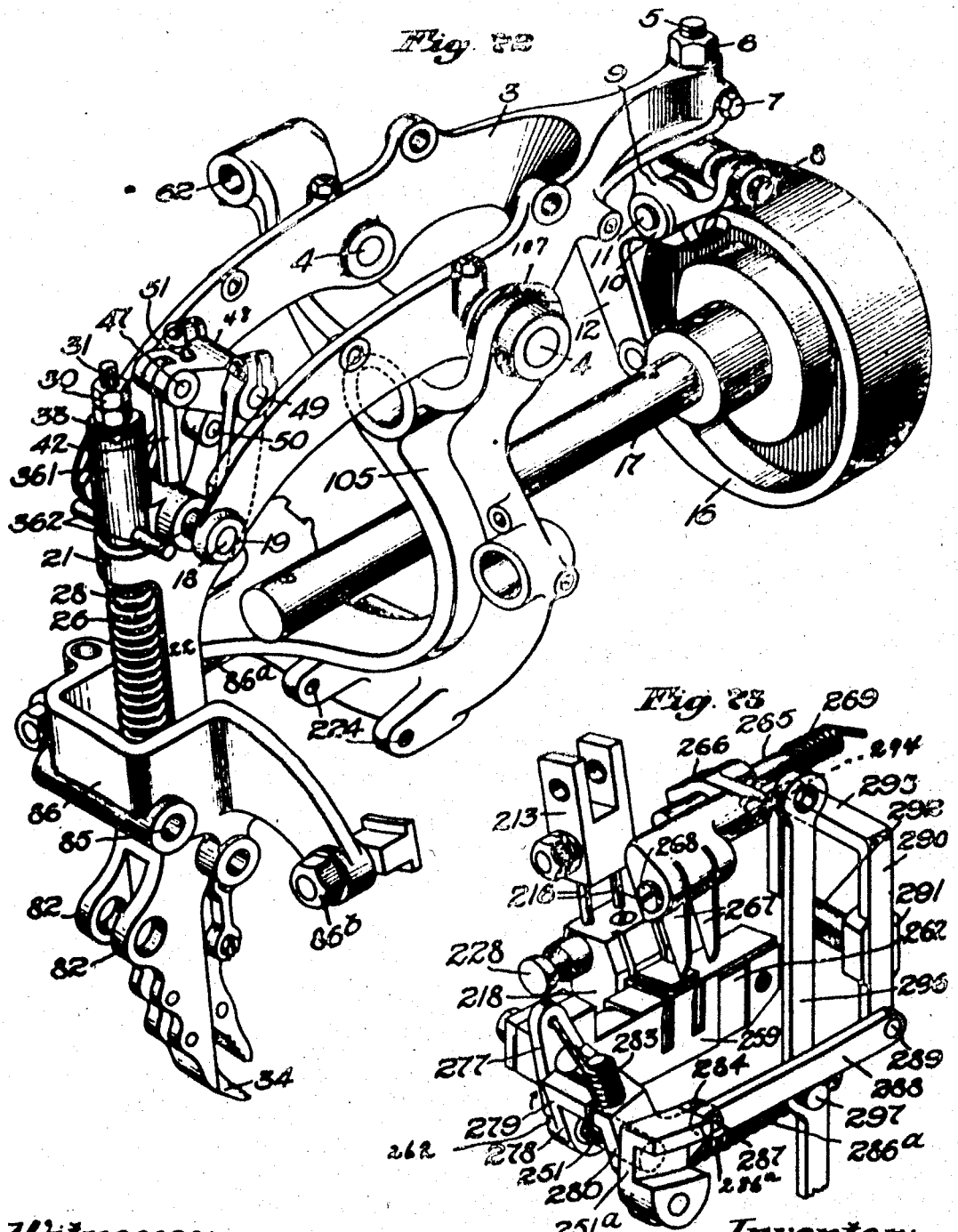

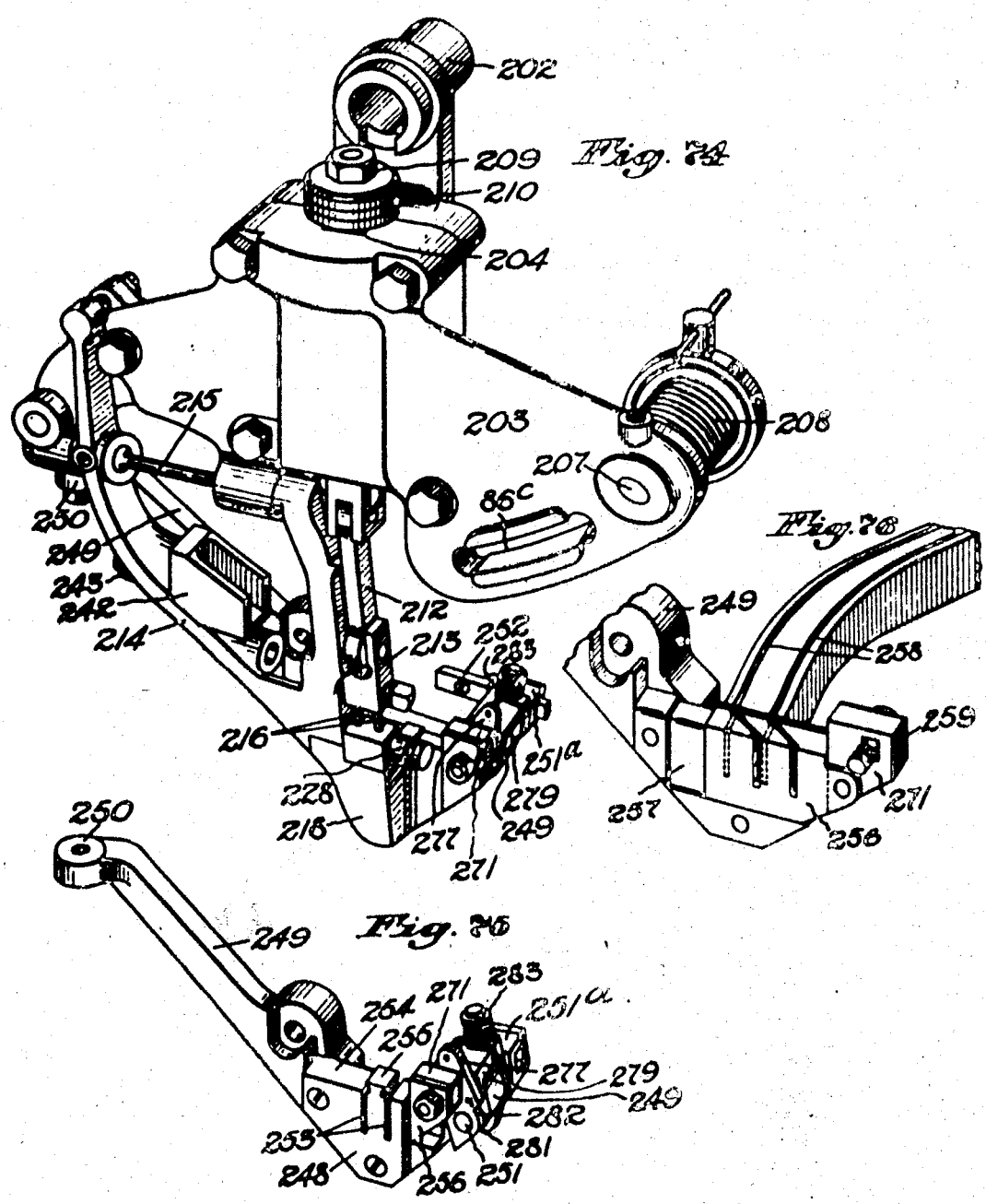

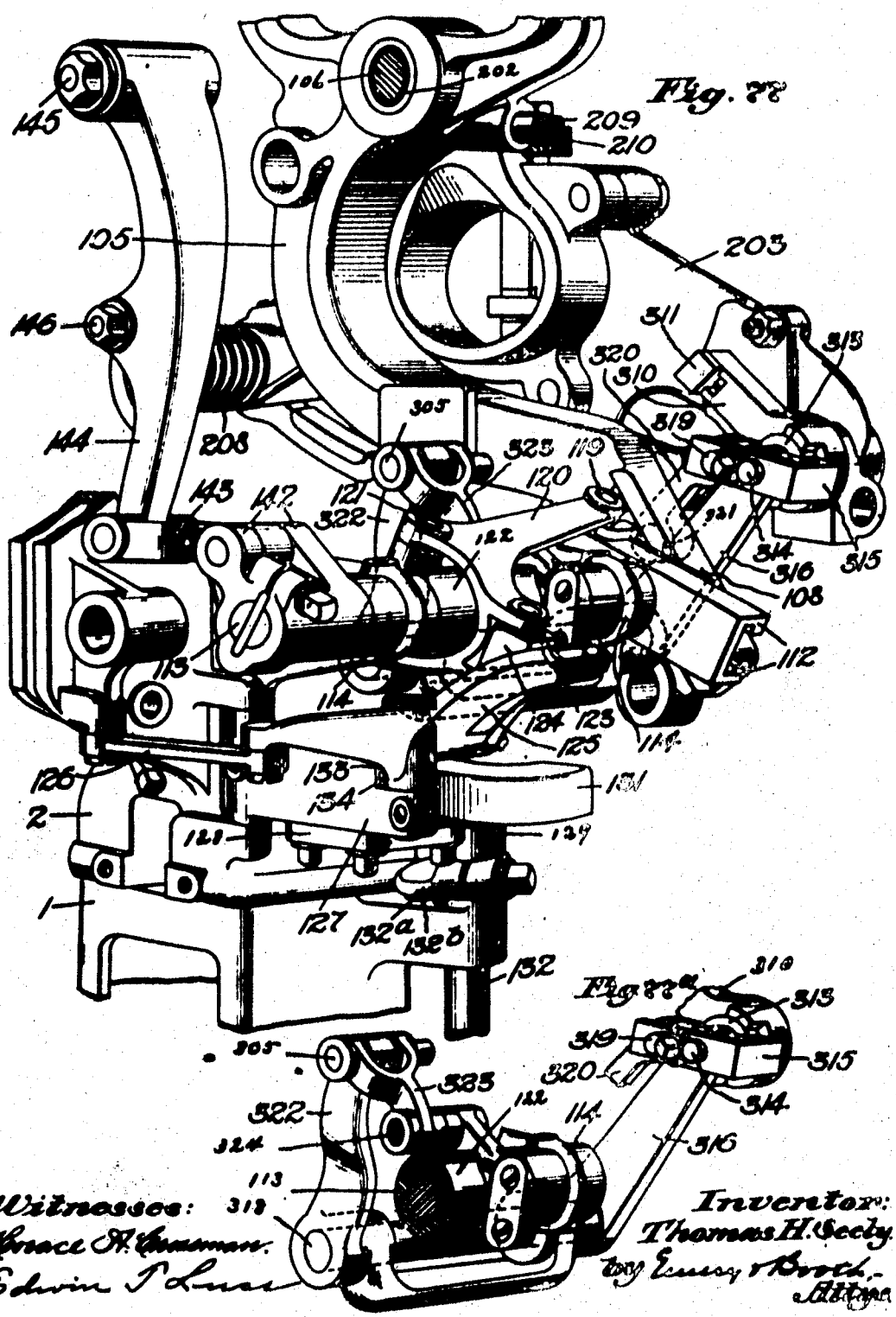

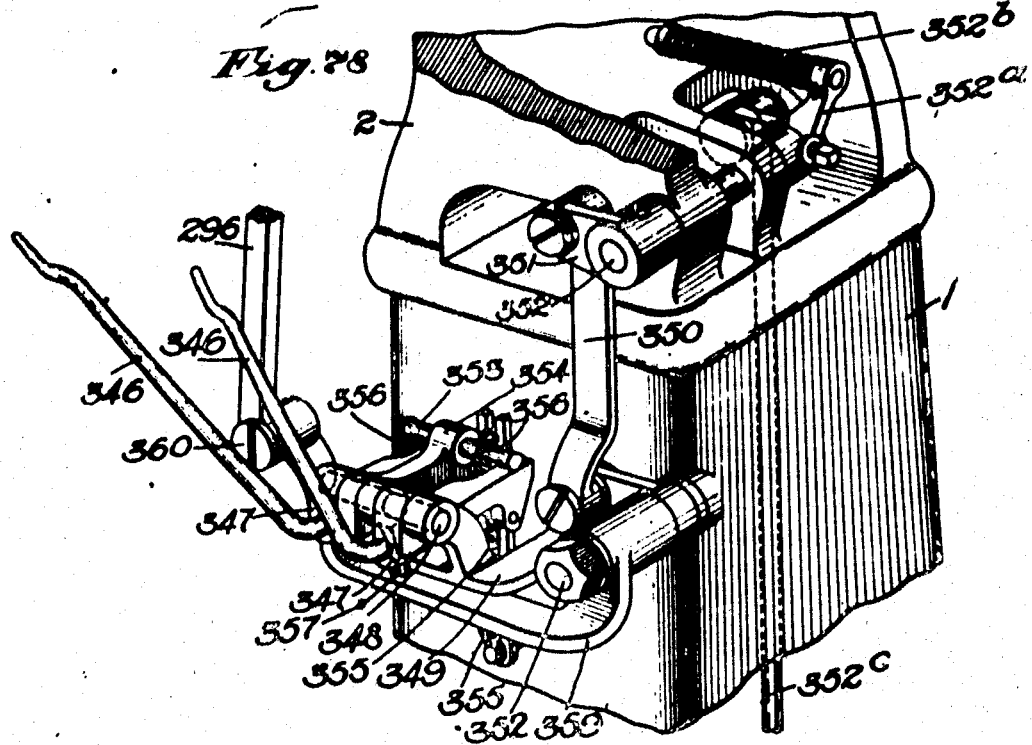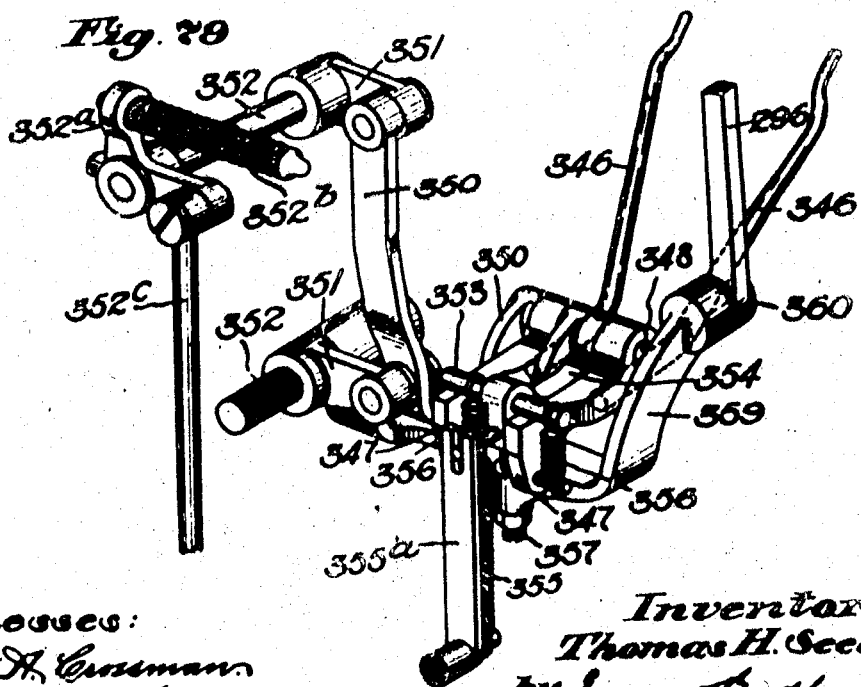

T. H. SEELY.
LASTING MACHINE.
APPLICATION FILED MAR. 12, 1907.
945,291.
Patented Jan. 4, 1910.
36 SHEETS—SHEET 30.
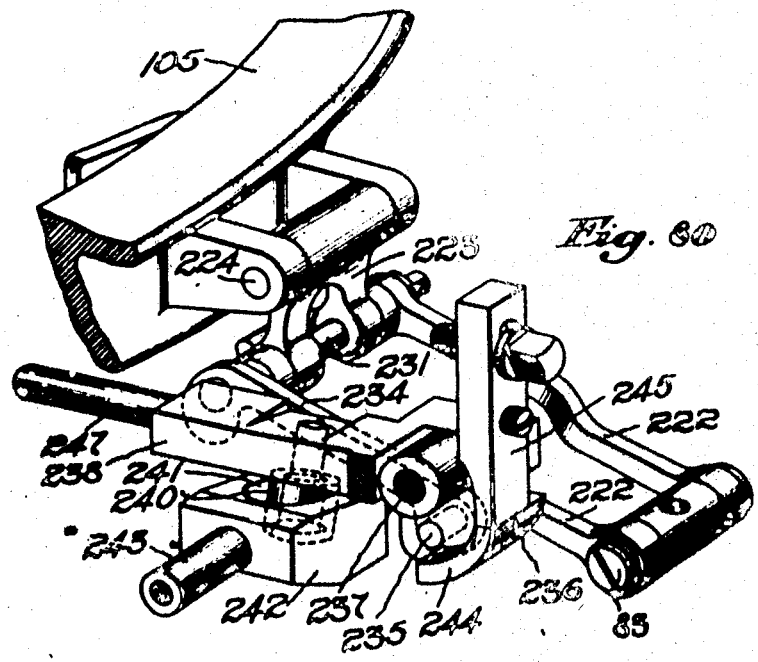
Fig. 60
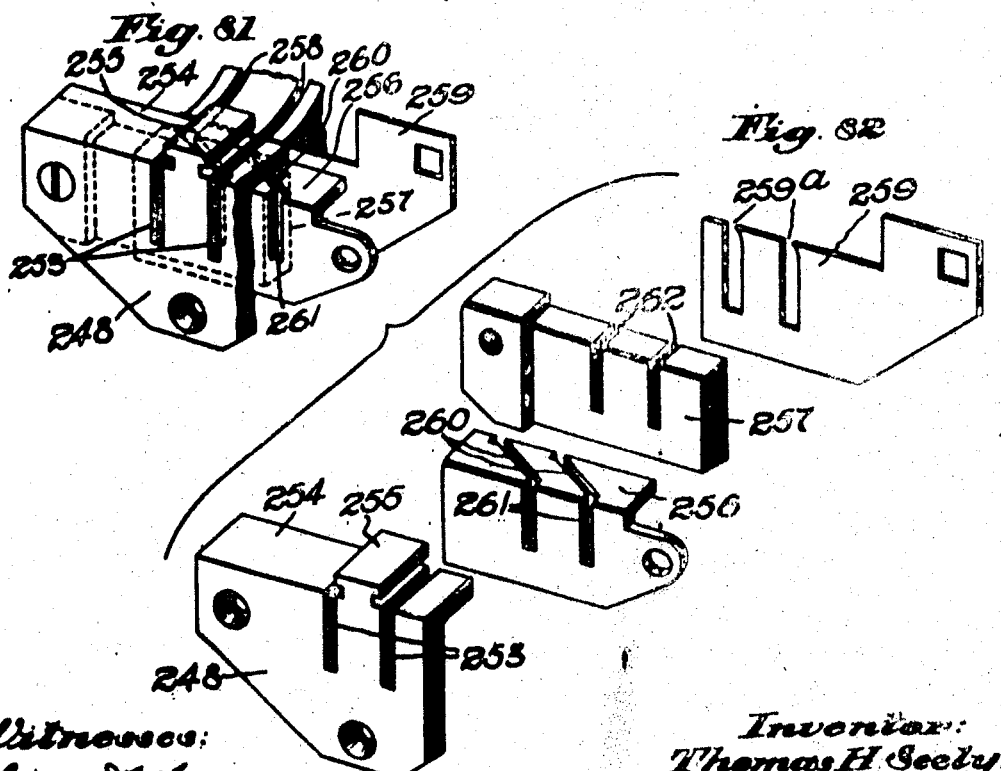
Fig. 81
Fig. 82
Witnesses:
Horace H. Grossman
Edwin P. Luce
Inventor:
Thomas H. Seely.
by Emery Booth
Attys.

UNITED STATES PATENT OFFICE.

THOMAS H. SEELY, OF BOSTON, MASSACHUSETTS, ASSIGNOR, BY MESNE ASSIGNMENTS, TO THOMAS G. PLANT, OF BOSTON, MASSACHUSETTS.

LASTING-MACHINE.

945,291.

Specification of Letters Patent.  Patented Jan. 4, 1910.

Application filed March 12, 1907. Serial No. 302,010.

*To all whom it may concern:*

Be it known that I, THOMAS H. SEELY, a citizen of the United States, and a resident of Boston, in the county of Suffolk and State of Massachusetts, have invented an Improvement in Lasting-Machines, of which the following description, in connection with the accompanying drawings, is a specification, like characters on the drawings representing like parts.

This invention aims to improve lasting machines of the type employing pincers to seize and draw the materials that are to be lasted into desired position where they are tacked or otherwise secured.

The various features of my invention will be best understood from a description of one embodiment thereof selected to illustrate the same, it being understood, however, that my invention is not limited to such selected embodiment.

Figure 42:
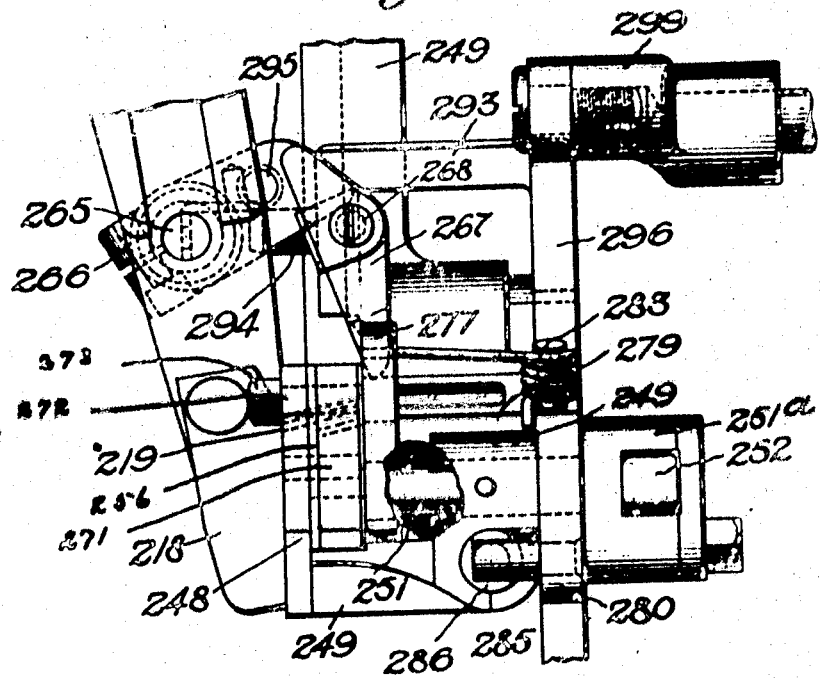
Figure 43:
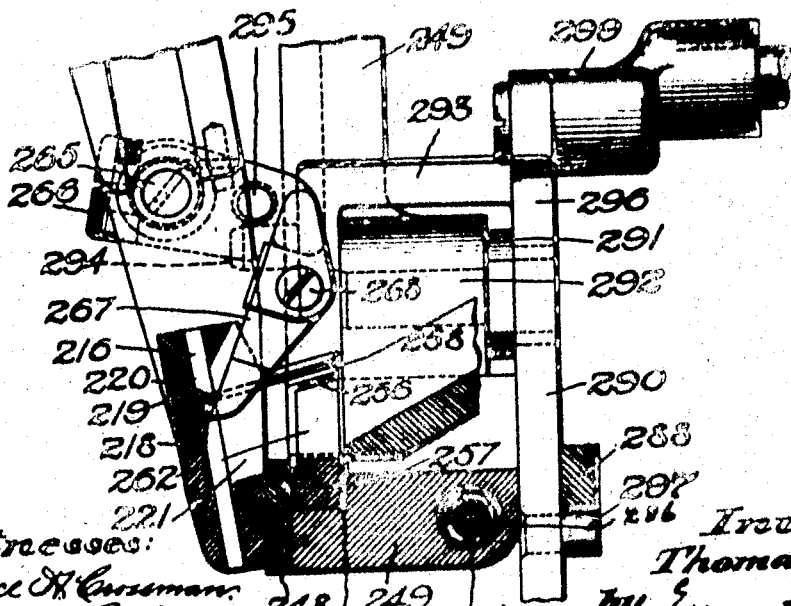
Figure 66:
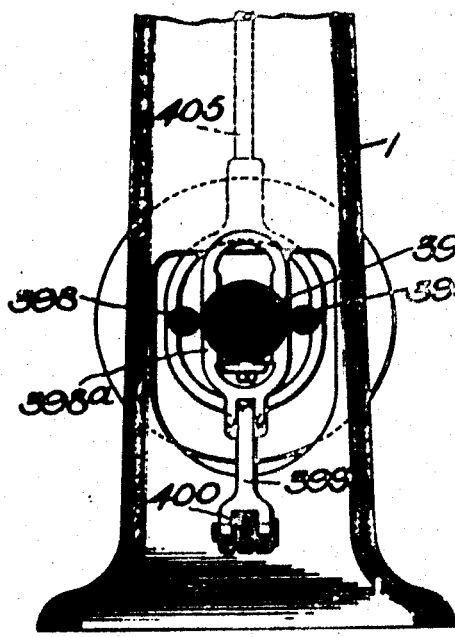
Figure 65:
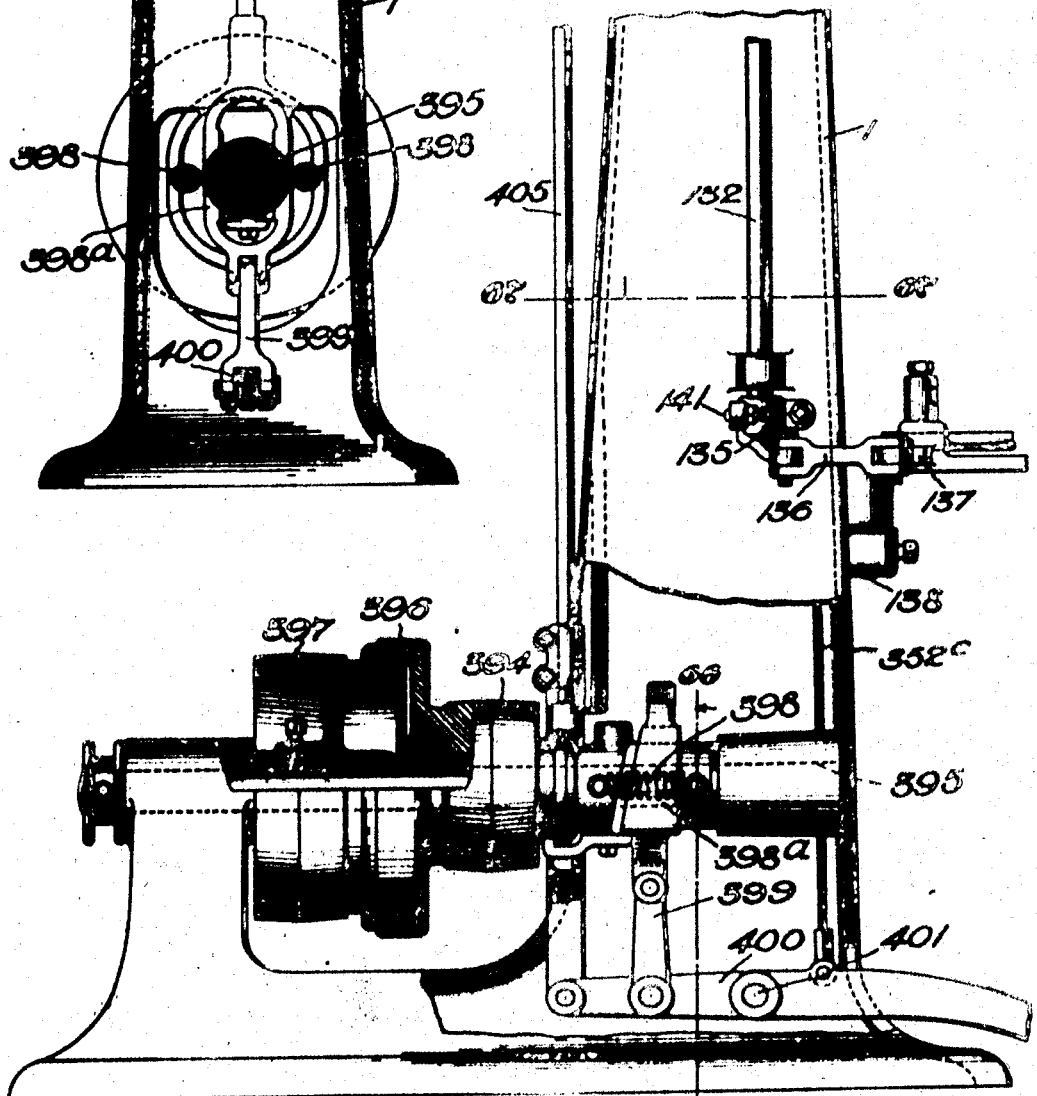
Figure 67:
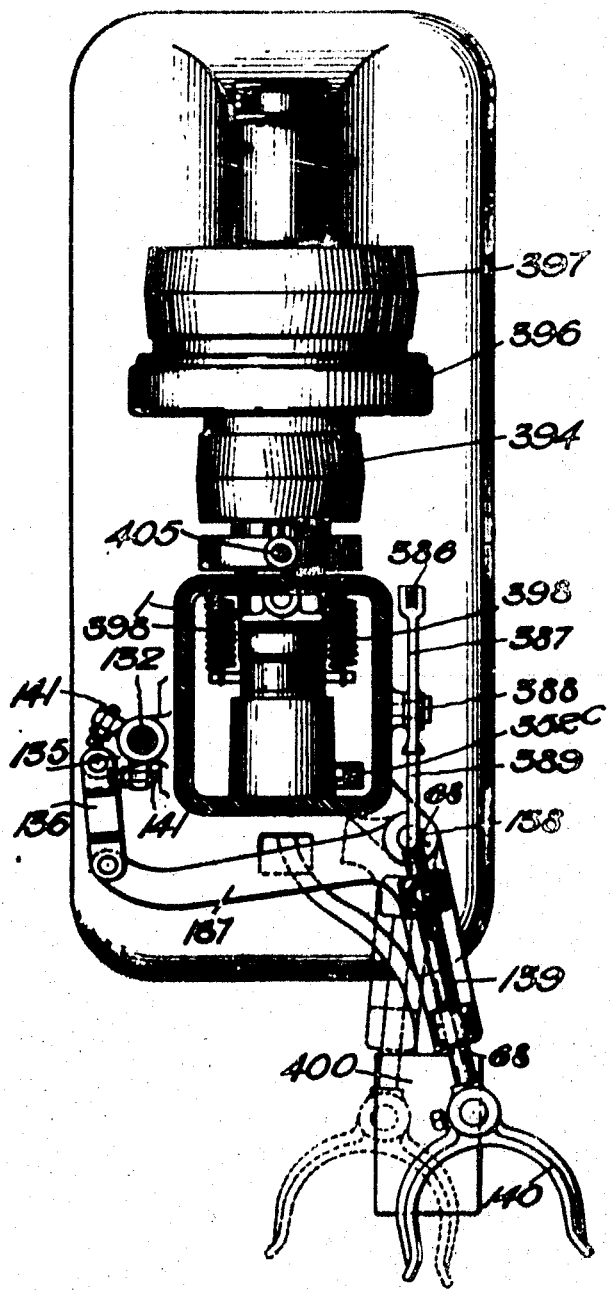
Figure 68:
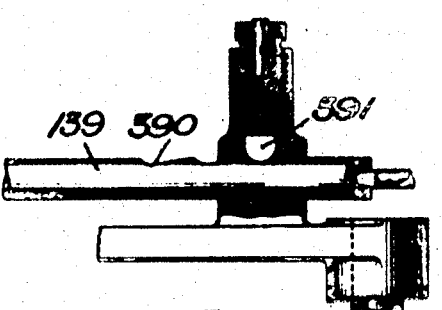
Figure 69:
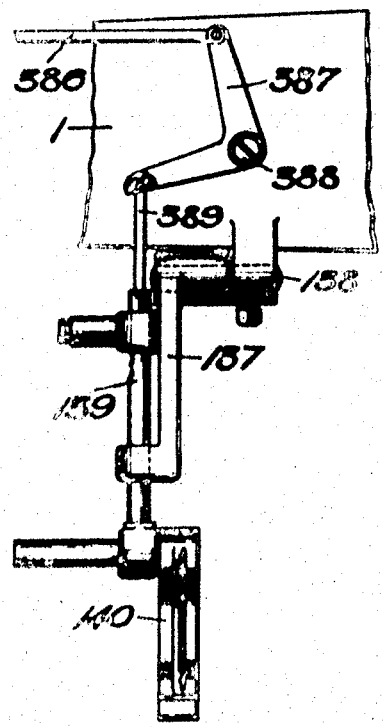

In the drawings accompanying this description: Figure 1 is a left hand side elevation of a machine selected to illustrate my invention; Fig. 2, a similar elevation on an enlarged scale of the principal parts of the machine; Fig. 3, an opposite, or right hand, side elevation of the principal parts of the machine; Fig. 3ª, a perspective detail, to be referred to; Fig. 4, a front elevation of said machine; Fig. 5, a plan view of the same machine; Fig. 6, a vertical cross section on the irregular dotted line 6—6, Fig. 3, looking to the right; Fig. 7, a vertical cross section on the irregular dotted line 7—7, Fig. 3, looking to the right; Fig. 8, a vertical cross section on the irregular dotted line 8—8, Fig. 2, looking to the left; Fig. 9, a vertical cross section on the irregular dotted line 9—9, Fig. 1, looking to the right, and on an enlarged scale; Fig. 9ª, a sectional detail on the dotted line 9ª, Fig. 9; Fig. 10, a vertical cross section on the irregular dotted line 10—10, Fig. 9, looking to the left; Fig. 11, a vertical longitudinal section on the dotted line 11—11, Fig. 4, looking to the left, the pincers however being shown in mid-position for clearness; Fig. 12, a view similar to Fig. 11, showing the parts differently positioned; Fig. 13, a horizontal section on the dotted line 13—13, Figs. 4 and 11; Fig. 14, a horizontal section on the irregular dotted line 14—14, Fig. 3; Fig. 15, a similar section with the parts differently positioned; Figs. 16, 17, 18 and 19, details illustrating the preferred operation of the pincers and fastener inserting means; Fig. 20, a vertical longitudinal section through the pincer carrying and actuating means, the section being taken on the dotted line 20—20, Fig. 3; Fig. 21, a horizontal sectional detail on the dotted line 21—21, Fig. 3; Fig. 22, a cross sectional detail on the dotted line 22—22, Fig. 20; Fig. 23, a cross sectional detail on the dotted line 23—23, Figs. 20 and 3; Fig. 24, a vertical cross sectional detail on the irregular dotted line 24—24, Fig. 21; Figs. 25 to 30, inclusive, views illustrating the means for imparting side movements to the pincers and tacker; Fig. 31, a detail, looking downward at the left, Fig. 4, illustrating a portion of the mechanism for imparting side movement to the pincers; Fig. 32, a sectional detail, looking upward, on the dotted line 32—32, Fig. 31; Fig. 33, a detail from the rear, showing the positioning member 315 and its connections, to be referred to; Fig. 34, a sectional detail on the irregular dotted line 34—34, Fig. 33; Fig. 35, an enlarged detail in front view, showing the tack separator and its operating means; Fig. 36, a similar detail view, with parts removed to show more clearly the separator proper; Fig. 37, a view similar to Fig. 36, with the parts differently positioned; Fig. 38, a horizontal detail illustrating the connection and arrangement of the lower end of the tack raceway, together with the separator and its operating means; Figs. 39, 40 and 41, details in plan view illustrating the movements of the separator; Fig. 42, a detail in side elevation, showing the separator, the lower end of the tacker and coöperating tack controlling parts; Fig. 43, a sectional detail on the dotted line 43, Fig. 38; Fig. 44, a detail in plan and partial section, looking downward upon the tacker operating means, the view being approximately a horizontal section on the dotted line 44, Fig. 3; Fig. 45, a sectional detail on the dotted line 45, Fig. 44; Fig. 46, a front elevation of the parts shown in Fig. 44, this view being as from the left, Fig. 44; Figs. 47 and 48 are details illustrating the movements of the tacker; Fig. 49, a front elevation, from the left Fig. 3, showing the means for deflecting the stock preparatory to engagement thereof by the pincers, this view being on an enlarged scale; Fig. 50, a right hand elevation of the parts shown in Fig. 49, with the deflecting fingers broken off; Fig. 51, a plan view of the parts shown in Fig. 49, the fingers being broken off; Fig. 52, a sectional detail on the dotted line 52, Fig. 49; Fig. 53, a sectional detail on the dotted line 53, Fig. 51, looking rearward; Fig. 54, a vertical sectional view, in partial elevation through the tack pot, this view showing in elevation the raceway to conduct the tacks to the separator; Fig. 55, a vertical section on the dotted line 55—55, Fig. 54, looking in the direction of the arrow; Fig. 56, a plan view of the parts shown in Fig. 54; Fig. 57, a cross sectional detail on the dotted line 57, Fig. 54, looking in the direction of the arrow; Fig. 58, a cross sectional detail on the dotted line 58, Fig. 54, looking in the direction of the arrow; Fig. 59, a cross sectional detail on the dotted line 59, Fig. 54, looking in the direction of the arrow; Fig. 60, a cross sectional detail on the dotted line 60, Fig. 54, looking in the direction of the arrow; Fig. 61, a cross sectional detail on the dotted line 61, Fig. 54, looking in the direction of the arrow; Fig. 62, a vertical, longitudinal, sectional detail through the starting and stopping mechanism for the machine; Fig. 63, a vertical section on the irregular dotted line 63—63, Fig. 62, looking to the right or rear; Fig. 64, a horizontal sectional detail on the dotted line 64, Fig. 63; Fig. 65, a view in elevation, partial section, showing the lower portion of the column with the belt and transmitting pulleys, and the means for controlling the starting of the machine; Fig. 66, a vertical cross section on the dotted line 66, Fig. 65, looking to the left; Fig. 67, a horizontal section on the dotted line 67, Fig. 65, looking downward; Fig. 68, a sectional detail on the dotted line 68, Fig. 67; Fig. 69, a view looking from the right at the knee operated parts of Fig. 67; Figs. 70 and 71, details in horizontal and side elevation, respectively, illustrating a modified connection between the pincer carrier and the tacker. Fig. 72, a perspective view showing the overhead up-draw lever, its operating means, pincers and pincer carrier suspended therefrom, and the shaped carrier in which the said lever is mounted and by which it and the suspended carriers are transversely moved; Fig. 73, a perspective detail, looking at the rear of the tacker, when in tack receiving position, this view showing also the separator and its associated parts for delivering the tacks to the tacker; Fig. 74, a perspective view showing the tacker carrier and the tacker mounted therein, together with the separator carried at the lower end of the tacker; Fig. 75, a perspective view of the diagonal separator-carrying-arm 249, the separator actuating parts being shown thereon differently positioned from Fig. 74; Fig. 76, a perspective detail showing the separator and the raceways leading thereto; Fig. 77, a perspective detail, looking from the left hand side of the machine toward the rear side of the tacker carrier, showing the positioning member and its actuating devices; Fig. 78, a perspective detail, showing the means for supporting and shifting the positioning member; Fig. 79, a perspective detail showing the deflecting fingers and supporting means therefor, viewed from the front; Fig. 79, a perspective detail of said deflecting fingers and the actuating means therefor, viewed from the rear; Fig. 80, a perspective detail, looking from the left front of the machine, partially broken away, and showing principally the parts illustrated in Figs. 47 and 48; Fig. 81, a perspective detail, partially broken away, showing the separator support, the separator, the face plate and gate assembled; and Fig. 82, a view showing the said parts separated laterally one from another.

In the accompanying drawings, the bolder faced characters designate the several figures and the section lines, the lighter faced numerals designating the several parts of the machine.

In the particular embodiment of my invention selected for illustration herein and shown in the drawings, the lasting pincers depend from an overhead up-draw lever, fulcrumed upon the frame and actuated at its rear end by a cam, to cause it to have an up and down, oscillatory movement to enable it to lift the pincers suspended from it, thereby to lift the upper. After the upper has been lifted in this manner the said pincers are given a forward or over-draw movement to lay the materials down to or toward the insole upon which they are to be secured. The pincers are provided with means, preferably spring actuated, for closing them at the required times for seizing the materials and, thereafter, for releasing them preparatory to a new seizure. Under certain conditions, in addition to the up-draw and over-draw movements of the pincers, I prefer to provide them with a lateral or side movement, to facilitate the feed of the work.

With the foregoing preliminary explanation in mind, I will now describe in detail the parts for carrying out the movements referred to.

Referring first to Fig. 1, the usual machine column is indicated at 1, mounted upon which is the head frame 2, suitably shaped and constructed to receive and support the various working parts of the machine. Mounted above the frame is the up-draw lever 3, the same being bifurcated, as best shown in Figs. 5 and 72, and provided intermediate its ends with oppositely extended and properly supported fulcrum pins 4.

These fulcrum pins, as will appear from Fig. 72, are not mounted directly in the machine frame but in an S shaped carrier mounted in said frame, and adapted to be moved to impart or permit a lateral movement to or of said up-draw lever, as will be fully hereinafter set forth. For the purpose of explaining the up-draw and over-draw movements of the pincers, however, the particular mounting for the fulcrum pins 4 may, for the present, be disregarded. This up-draw lever, at its rear end, receives the shank of an eye-bolt 5, hung at its upper end upon a nut 6, seated upon said lever, and by which its position and effective length may be adjusted as desired, said eye-bolt being held clamped in adjusted position by a clamp screw 7 extended transversely through the split rear end of said lever. The lower, eye-end of said bolt receives a transverse pin 8, the opposite ends of which turn and also slide freely in the arms of a yoke 9 (see Fig. 10). This yoke is provided with depending, longitudinally alined arms 10 (see Fig. 11), mounted to slide, as may be necessary, upon a longitudinal pin 11. Said pin 11 (see Fig. 10) is clamped in the split end of the horizontal arm of a bell-crank lever 12, fulcrumed at 13 on the frame. The depending arm of this bell-crank lever is provided with a roller stud 14, which travels in a cam groove 15, in a cam disk 16, fast on the main shaft 17 of the machine. Rotation of said shaft acts through this cam to impart vertical oscillation to the said up-draw lever 3, the limits of oscillation being made variable by adjustment of said eye-bolt.

Referring to Figs. 11, 20, 28 and 72, the forked front end of the up-draw lever is provided with a transverse pin 18. This pin passes loosely through a hub 19 of an upright tubular guide 20, which projects both upward and downward from said hub. The lower end of said tubular guide receives about it a boss 21, on the upper end of the depending pincer carrier 22. This depending pincer carrier is provided near its lower end with a tubular guide way 23, which receives the guiding extension 24 of, and separably connected at 25 to, the hanger rod 26, which rises through the tubular guide 20 referred to. At its lower end said hanger rod extension is provided with a shoulder 27, upon which is seated an up-draw spring 28 which encircles the said hanger rod, and, at its upper end (see Fig. 11 and Fig. 20), supports a washer 29 that in turn supports the pincer carrier. The hanger rod 26 is threaded at its upper end to receive the supporting nuts 30, by which said rod may be raised and lowered to increase or diminish the tension of or upon the spring 28. To restrain the hanger rod from rotation during such adjustment, said rod is grooved longitudinally at 31, to receive a spline 32 on a washer 33, non-rotatably seated upon the upper end of said tubular bearing 20. The spring 28 thus furnishes a yielding support for the pincer carrier 22 whereby oscillation of the up-draw lever 3 to lift its forward end, at the left Fig. 11, will through the tubular guide 20, lift the said hanger rod 26, and this rod in turn, through the interposition of the spring 28, will also but yieldingly, lift the pincer carrier and its pincers. At its lower end (see Figs. 11 and 20), the pincer carrier 22 is bifurcated to receive the shank of the lower pincer jaw 34, the said shank being itself bifurcated and further secured to and between the arms of said carrier by a transverse pin 35. The movable pincer jaw is indicated at 36 (see Fig. 11), the same being mounted near its lower end upon a link 37 jointed thereto and to the pincer carrier 22, said link, extending between the arms of the bifurcated shank of the fixed pincer jaw as best shown in Fig. 20. At its upper end (see Fig. 11), said movable pincer jaw 36 is provided with a transverse pin 38, to which are jointed the lower ends of a pair of links 39 (Figs. 16 to 19), the upper ends of which support between them, a transverse pin 40, preferably provided with a sleeve (not shown) extended through a slot 41, in the lower end of the pincer closing rod 42. It is evident that vertical reciprocation of this closing rod will cause the movable pincer jaw 36 to be swung toward and from its coöperating fixed jaw 34, the link 37 bringing the two jaws together as the said rod is depressed and separating them as the said rod is elevated. The movable jaw is acted upon by a spring 43, connected with the pincer carrier, which draws the upper end of the movable jaw normally inward or to the left Fig. 11, thereby insuring a predetermined path of movement to the lower, engaging end of said movable jaw. While these devices may be relied upon to produce an approximate closing of the jaws, it is desirable to provide means for imparting a firmer closing movement to the jaws than would be possible by a reliance solely upon such devices. To that end, the lower end of the pincer closing rod 42 is provided with a cam extension 44 (Fig. 11 and Fig. 16), which reaches down between the upper end of the movable jaw and the adjacent face of the pincer carrier. The upper end of the movable jaw is bifurcated to receive an anti-friction roller 45, which travels upon the face of said cam extension, the latter at its opposite or front side being supported by a roller 46, loosely mounted between the arms of the bifurcated shank of the fixed pincer jaw 34 and upon the transverse pin 35, by which said arms are hung from the pincer carrier. As is obvious to those skilled in the art the ends of the spring 43 are so positioned on the pincer carrier 22 and the movable jaw 36 (that, were the jaw 36 not held from downward movement by the pincer closing rod 42, the force exerted by said spring would move the jaw 36 downward about the outer pivot of link 37 and toward the lower jaw 34. If the pincer closing rod 42 be depressed it will permit the movable jaw 36 to be drawn downward by the spring 43, and the action of said spring in holding the roll 45 tightly against the wedge block 44 will prevent any change in the relative positions of roll 45 and block 44 maintaining the pin 40, during this downward movement, in the lower end of the slot 41. The wedge block 44 thus acts in effect as a shoulder to aid and supplement the action of the spring 43 in drawing the jaw 36 toward its coöperating jaw 34, the link 37 directing the movable jaw toward the fixed jaw. When the movable jaw meets and is arrested by any substance or materials inserted between it and the opposing jaw, for engagement thereby, continued or further depression of the closing rod 42 will cause its cam extension 44 to be projected between the roller carrying upper end of the movable jaw and the opposing roller 46 on the pincer carrier (as shown in Fig. 17) to serve as a wedge to force the upper end of the movable jaw positively inward or to the right (Fig. 12), thereby jamming the lower, engaging end of the movable jaw firmly upon the materials held between it and the opposing fixed jaw. The mechanism thus permits a speedy approximate closing movement to the jaws, followed by a wedging and powerful final closing movement.

Referring again to Fig. 11 and Fig. 72, to operate the pincer closing rod 42, its upper end is jointed to a pin 47, carried in the forked end of the horizontal arm of a bell-crank lever 48, fulcrumed at 49 upon a transverse pin carried in the split and clamped upper ends of two supporting arms, rising from and constituting parts of the pincer carrier 22. The depending arm of the bell-crank 48 carries a transverse pin 50, clamped therein by a screw 51, the laterally projecting ends of said pin being loosely jointed to the front end of a link 52, which lies longitudinally between the arms of the bifurcated front end of the up-draw lever 3. Longitudinal reciprocation of this link 52 will rock the bell-crank 48 and cause vertical reciprocation of the pincer closing rod 42. The link 52, at its rear end (Fig. 11), is jointed at 53 to the depending arm of an adjustable bell-crank lever, composed of the two members 54 and 55, one of which is forked to straddle the other, the two being fulcrumed upon a common pin 56, the projecting ends of which are loosely journaled in bearings on the arms of the bifurcated up-draw lever 3. The two arms of this bell-crank lever are adjustable to vary the spread thereof, and, to this end, the arm 55 is shaped to carry the two adjusting screws 57, which act upon the arm 54 at opposite sides of the fulcrum point so that, by means of said screws, the relative positions or spread of the two arms of the bell-crank may be varied at will for purposes of adjustment. The horizontal arm 55 of said bell-crank is forked (Fig. 5) and carries loosely, at its forward end, the ends of a transverse pin 58, shown best in Fig. 8. This transverse pin is rigidly held between its ends in a longitudinal pin 59 (Figs. 8 and 11), adapted to slide and turn freely in a boss 60, on the end of the horizontal arm of a bell-crank lever 61 (Fig. 7), fulcrumed at 62 in the "S" carrier hereinbefore referred to. Referring now to Fig. 8, the depending arm of said bell-crank lever 61 is connected at its lower end by a pair of short links 63 with a short lever 64, fulcrumed at 65 in the upper arm of a lever 66, itself fulcrumed at 67 in the machine frame. The short lever 64 just above referred to, at a point below its fulcrum, is pocketed to receive the end of a slide-pin 68, surrounded by a spring 69, seated at its inner end against a collar on said pin and at its outer end against an adjusting nut or screw 70, threaded in said lever 66 and held in adjusted position by a clamping screw 71. The spring 69 tends constantly to turn the short lever 64 about its fulcrum, to throw the upper end thereof to the left and through the train of mechanism just described effect a closing of the pincer jaws. To control this movement, one side of the hub of said lever 64 is extended toward the rear of the machine, to the left, Fig. 2, where it is again formed to embrace the end of its fulcrum pin 65, and is there provided with a depending arm 72 (shown in full lines, Fig. 2, and in dotted lines, Fig. 8) said arm being provided with a roller stud 73 (Fig. 2) which travels in contact with a peripheral cam 74, on a cam disk 75 fast on the main shaft 17 of the machine. The spring 69, above referred to, tends always to maintain said roller stud 73 in operative contact with its said cam, and the lever 66, which, as stated, carries all the parts just described, is itself provided at its lower end (Fig. 8) with a roller stud 76 which travels in a path cam 77 in the front face of the said cam disk 75. The peripheral cam 74 and face cam 77 are so timed relatively that rotation of the main shaft will, at the proper moment, turn the lever 66, thereby, through the short connecting links 63, to turn the bell-crank lever 61 which, in turn, through the connections just described, will depress the pincer closing rod 42 to produce the approximate closing of the pincer jaws, one toward or upon the other. During this main and approximate closing movement of the jaws, the short lever 64 is so controlled by the peripheral cam 74 that it moves with the main lever 66, all the time holding its spring 69 under high compression, the whole moving as one structure.

Preferably just before the pincer jaws close upon the materials standing between them or, expressed in general terms, when the said jaws have been brought one toward the other to a position where they are separated by approximately one-eighth of an inch, the peripheral cam 74 drops its roller stud 73 toward the axis of rotation of its cam and thereby permits the tensioned spring 69 to expand. This causes the short lever 64 to be turned upon its fulcrum 65, on and relatively to the main lever 66, thereby to impart an additional movement to the pincer closing means to cause the movable pincer jaw to be wedged firmly toward the opposing fixed jaw, to grip the materials firmly between the said jaws. The purpose of this double or two step closing movement is this: It is desirable to employ a spring for closing the pincer jaws upon the materials preparatory to drawing the same upward and over the insole, but if a single spring only were employed, such spring would exert its highest power at the beginning of the closing movement and its lowest power at or near the end thereof or at the moment of seizure, when the power should be greatest. Since the separation or opening between the jaws must be considerable to permit the materials to be lasted to be readily inserted between the same, it is clear that a considerable movement is required for closing the movable jaw upon or into gripping relation to the fixed jaw. Any single spring, therefore, that might be employed for the purpose would require either to be so heavy as to make it impracticable to operate, or, if made of a strength that would be practicable, it would so far weaken itself before the limit of movement had been reached that the final seizure would be ineffective. This, however, is obviated by the arrangement above described, for the final closure or seizure of the materials is performed by the spring 69 (Fig. 8), which is maintained by the peripheral cam 74 under its high tension and without any expenditure of its power during the main and approximate closing of the jaws under the control of the face cam 77. After the said face cam has permitted the jaws to be brought into approximate seizing relation, the peripheral cam 74 frees the final closing spring 69 and permits the latter, by a slight but powerful movement of the short lever 64, to finally close the jaws upon and to seize the embraced materials. I thus obtain all the benefits of a spring closure of the jaws without any of the objections thereto such as have been above referred to. When the jaws are again to be opened, to release the materials, the peripheral cam preferably first operates to compress or tension the final closing spring 69, thus withdrawing the wedge from beneath the upper end of the movable pincer jaw, after which the main or face cam 77 moves the tensioned spring bodily backward to its original position, thereby lifting the jaw to its fully opened position for reception of the materials to be lasted.

In the above description, for brevity and convenience, I have referred to the main cam 77 as producing the approximate closing of the pincers, but preferably the said cam merely permits or determines such movement, the movement itself being produced by a spring in order that the entire closing movement, both approximate and final, shall be spring actuated. This will be clear from Fig. 8 wherein the main frame, immediately above the main shaft 17, is shown provided with a transverse recess for a horizontal spring 78, seated at one end against the closed end of said recess and at its opposite end against a shoulder 79 on a slide rod 80 that rests at its outer end against the lever 66 at some point above the fulcrum thereof. The outer end of the slide rod 80, where it rests upon the said lever 66, is forked or yoked for proper engagement with the correspondingly yoked or recessed end of the lever with which it engages. This spring 78, by pressing outwardly upon the said lever 66 above its fulcrum, acts to throw the lower, roller carrying end of the lever normally inward against the inner face of the path cam 77, so that the said inner cam face becomes the determining face for the movement described, the roller stud, its lever and connected parts being actually impelled or moved to follow said cam solely by the action of said spring 78. Thus, when so used, the spring 78 becomes an approximate closing spring for the pincers and the spring 69 the final closing spring therefor. If the spring 78 were omitted the final closing spring 69, by its own action, would probably be sufficient to hold the roller stud 76 against the inner determining face of the cam 77, but I prefer to employ the additional closing spring 78.

Referring to Fig. 8, it will be noticed that the outer wall of the cam 77 is cut away or recessed at the left, as illustrated at 81, in order that at the moment of producing the approximate closing of the pincer jaws the spring 78 may be the sole approximate actuator therefor. When, however, the jaws have been fully closed, I prefer again to restore the outer cam face 77 in order that the roller stud 76 may thereafter be positively confined in its inactive position.

I have now described the means for closing the jaws to seize the material, also the means for vertically oscillating the up-draw lever 3, to cause the closed jaws with the materials seized between them, to be lifted to up-draw the materials about the last presented to the machine. It is important that the connections for closing the jaws be arranged, for example as herein illustrated, so that the oscillation of the up-draw lever in lifting the materials will not disturb the grip of the jaws upon the embraced materials and also, so that the up-draw lever may be freely adjusted to vary its movement without disturbing the operation of the pincer closing means. It is equally important that operation of the pincer closing means shall not introduce any disturbance into the operation of the up-draw means. It will be noticed, in the mechanism shown, that the pincer closing connections leading from the fulcrum of the up-draw lever to the front end thereof are wholly within the said lever, and, that they operate longitudinally rather than in a transversely rotatable direction, I having found the longitudinal and central action herein disclosed to produce the best results.

The materials having been seized and lifted by the mechanism described, it is now necessary to move the pincers forward or to the left (Fig. 11), to over-draw the materials and to lay the same upon or toward the face of the insole. In producing this over-draw movement it is desirable that the up-draw mechanism recede or relax somewhat to permit the material as it is carried inward over the insole to be laid downward upon or toward the face of such insole. Referring still to Fig. 11, the pincer carrier 22, near its lower end and at its front side, is provided with two forwardly extended ears 82, in which is loosely journaled the transverse pin 83, provided intermediate its ends with a nearly vertical aperture to receive the cylindrical end of an actuator 84, fulcrumed at 85 in a transverse yoke 86 (see Fig. 72). This actuator 84 is forked at its end, in order that it may be hung upon the two ends of the said fulcrum pin 85 as best shown in the front elevation (Fig. 4). One of the arms at the forked end of said actuator, viz. that at the right (Fig. 4), is shown extended above said fulcrum and is itself forked at its upper end to receive loosely therein a pin 87, fast in the end of a connecting rod 88 (Figs. 3 and 21) which extends rearward to a lever 89, fulcrumed at 90 on the frame. This lever 89, at its lower end, is connected by a link 91 with the free end of a spring lever 92, fulcrumed at 93 on the frame. A powerful coil spring 94 surrounds said fulcrum 93 and acts at its end upon the said lever 92, suitable means being provided for adjusting the tension of said spring to any desired degree. The spring 94 tends to throw its arm 92 to the left (Fig.
3) and thereby through the lever 89 and the actuator 84, to throw the lower end of the pincer carrier correspondingly to the left to impart over-draw movement to the closed pincers, as illustrated in Fig. 18. This over-draw movement being spring actuated, will of course, be arrested by the materials when the latter have reached their limit of safe tension, thus avoiding any rupture of the materials such as might result if the over-draw movement were positive. I have also provided a limiting stop to limit this over-draw movement, when the machine is operated idly, such stop comprising a lug 88ª, Fig. 3, on the connecting rod 88, which lug coöperates with an adjustable stop screw 88ᵇ, on the 3 carrier 105. The spring actuated over-draw movement, however, is controlled as to its timing by a cam, which also produces the opposite or return movement to compress or tension the spring 94 preparatory to the next over-draw action thereof. This cam control and return movement is obtained by mounting upon the link 91 (Fig. 3) a roller stud 95 which runs in contact with a face cam 96 on the main shaft 17 of the machine, said face cam being upon the same cam disk 75 that carries the pincer closing cams.

In the machine here described the tacker, which is to follow the over-draw movement of the pincers (see Figs. 18 and 19) to tack the over-drawn materials in position upon the insole, is moved horizontally forward and backward or toward and from the last with and by the pincers, said tacker having no horizontal movement whatsoever, toward and from the last, that is independent of the movements of the pincers. Because the pincer movement is required also to carry the tacker with its added weight, it is doubtful if the spring 94 would unaided operate them quickly enough to permit the machine to be run at as high a speed as I desire. To meet this condition, I have made the cam 96 as a closed or path cam for a short distance, represented by the width of the cam lug 97 (Fig. 10) at the point of initial movement of the roller stud 95. This closed portion of the cam is sufficient to overcome the inertia of the parts comprising the connections leading to and including the pincers and the connected tacker and set them in motion, moving them a short distance, for example approximately one-eighth inch, the actuation being then transferred to and thereafter borne by the spring 94. The positive movement thus obtained is such as to cover all idle or ineffective movements of the pincers and the tacker, and before the latter or either of them have reached a point in their over-draw or horizontal movements where effective work is to be performed, the actuation is transferred to the spring 94, so that the effective movement of the same and each of them is wholly spring actuated.

The return movements of the pincers and the attached tacker are positive throughout because imparted by the uninterrupted cam 96, yet this return movement is required to bring the tacker, which is to be described, into accurate tack receiving position, and, to insure this, it is desirable that the return movement should exceed somewhat that actually necessary for positioning the tacker, to make certain that the tacker is brought always into proper position; and it is expedient here to describe the means for providing this excess movement, while considering the connections that provide therefor, even though the tacker which principally requires it has yet to be described.

The excess movement referred to is obtained by providing a yielding connection between the link 91 (Fig. 3) and the lever 89, as follows: The end of said link 91 is provided with a depending ear (Fig. 3ª) which carries a pin 98 upon which is mounted a bell-crank lever 99, the upper arm of which constitutes the front half of the bearing for the pin 100, connecting said link 91 with the lever 89. The horizontal arm of said bell-crank lever is acted upon by a spring 101, interposed between it and said link 91, and which holds said lever normally in position completing the bearing for said pin 100. When the link 91 is thrust forward to produce over-draw movement of the pincers and tacker there is no possible yield between the link and the lever 89 because the solid end of the link acts as a pusher for the pin 100. Upon return of said link, however, produced by the cam, movement is transmitted to the lever 89 and its connected pincers and tacker, only through the yielding bell-crank lever bearing described, which is sufficient to produce the return movement of all the parts until any one of them is arrested by contact with a coöperating part by excessive resistance imposed thereto, whereupon further return movement of said link 91 acts merely to separate the bearings for the pin 100, and compress the spring 101, without further movement of the lever 89 and its connected parts.

The connecting rod 88, between the lever 89 and the over-draw actuator 84, is made adjustable longitudinally by means best shown in Figs. 3 and 21. Referring to these figures, the said connecting rod comprises the long member to which the numeral 88 is affixed, which is provided at its rear end with a split socket arranged to be closed by a screw 102. This clamp socket receives a thimble 103 provided with a circumferential groove to receive a portion of the clamp screw 102, to determine the longitudinal position of said thimble in said socket. The thimble is threaded internally to receive the threaded shank of the extension member of said connection. By slacking the clamping screw 102, the thimble may be turned to vary the length of the connection and may then be clamped securely in adjusted position by means of the said screw. This connection furnishes means for adjusting the in and out over-draw movement of the pincers.

For simplicity of description, I have so far referred to the up-draw lever and other connections and parts as if mounted directly upon the frame, in order to make clear the up-draw and over-draw movements together with the mechanism for closing and opening the pincer jaws. As previously stated, however, in some instances it will be found desirable to impart to the pincers, while at work, a side or transverse movement to facilitate feeding the work and also to increase the output of the machine by causing it to feed while pulling, and I will now describe the means for providing this side movement.

Referring to Figs. 7 and 72, I have provided an S shaped hanger or carrier, marked 105, the same being fulcrumed upon a longitudinal pin 106 on the frame, to permit it to swing transversely of the machine, and the up-draw lever 8 is fulcrumed between a pair of ears 107 on this S carrier. The yoke 83 (Fig. 72) previously referred to as embracing the pincer carrier, and in which said pincer carrier works, is also connected at its left hand end to this S carrier by a stud 86ª (Fig. 2), so that any transverse swinging movement imparted to the S carrier will cause a corresponding movement to be imparted to the up-draw lever and pincer carrier mounted thereon. Since the pincer actuator 84 and its connecting rod 88 thus have a transverse or swinging movement, while the lever 89 for operating the said connecting rod does not, being mounted off the frame, it is necessary to provide a connection between the connecting rod and its said lever that will permit such relative swinging movement. This connection is best illustrated in Figs. 3 and 21, wherein the upper end of said lever 89 is forked to receive a pair of complemental, trunnion-supported heads 107ª, separated at their inner adjacent ends to leave a slot, perpendicular to a radius of the center 106 about which the S carrier and the pincers swing. This slot receives the two-part, flanged head 107ª (Fig. 21) at the end of the connecting rod 88, whereby oscillation of the lever 89 will, through the said flanged head, transmit motion endwise to the said connecting rod while permitting the latter to have a swinging movement about the said axis of oscillation 106 by and with the S carrier and parts mounted thereon. The end of the connecting rod 88, adjacent the said flanged block, is made cylindrical (as best shown in Fig. 21) and guided in a bearing block 107°, mounted in the said S carrier, whereby the latter affords proper support to the said connecting rod, to cause the same to swing with it while permitting the said rod to slide freely endwise therethrough.

Following the S carrier to its lower end, the same is provided with a diagonal slot or housing 108 (shown in dotted lines at the left of Fig. 7 and from the rear in Fig. 77), the direction of which is radial to the axis of the carrier fulcrum 106. This housing is shown in detail in Figs. 31 and 32 and receives the sliding block 109. This slide block 109 is mounted loosely upon a longitudinal pivot shank 110 of an opposed slide block 111, T shaped in cross section (see Fig. 82), and mounted to slide freely in a T shaped guideway in the oscillatory head 112, of a longitudinal shaft 113 mounted in two bearings 114 on the machine frame. Oscillation of the said shaft 113 starting in a contra-clockwise direction (viewing Fig. 7) will, through its head 112, and the pivotally connected blocks referred to, impart a corresponding oscillatory movement to the S carrier 105. Assuming the oscillations of the shaft and head 112 to be always uniform from a given starting position, it is evident that the oscillations imparted thereby to the S carrier will be in one direction, or to the left, if the slide blocks be moved into position above or within the axis of oscillation (as shown in Figs. 7 and 31), and will be in an opposite direction, or to the right, if said slide blocks be slid across to the opposite or outer side of said axis. The extent of oscillatory movement imparted to the S carrier will depend, of course, upon the distance to which the pin 110 connecting said slide blocks is carried beyond the axis of oscillation. The extent of oscillation imparted to the S carrier may therefore be varied at will in either direction by varying the radial distance of the connected slide blocks from the axis of oscillation and, when the pin connecting them is alined with the axis of oscillation, no movement whatever will be imparted to the S carrier from said oscillatory shaft. For determining the positions of said pivotally connected slide blocks and the resultant direction and extent of transverse movement imparted to the S carrier and its pincers I have provided the following mechanism.

Referring first to Fig. 32, between the two slide blocks 109, 111 is a plate 118, preferably secured rigidly to the slide block 111, said plate projecting laterally from between the two block housings, it being provided at one side thereof with a longitudinal recess to receive a stud 119 (Fig. 31, also Fig. 77) on the long arm of a bell-crank lever 120, fulcrumed at 121 on a hub 122 fast on the oscillatory shaft 113. Oscillation of the shaft, therefore, oscillates not only the housing 112 and its slide block but also the bell-crank lever 120, so that the slide blocks, in any position of oscillation, may be shifted from one to the opposite side of the axis of oscillation to impart desired direction and extent of movement to the S carrier.

The short arm of the bell-crank lever 120 (Fig. 77) is made double or yoke shaped, to embrace its supporting hub 122 and to engage both ends of the fulcrum pin 121. Said short arm is also provided with a pair of ears to receive a pin 123, upon which and between its ends is mounted the slide block 124. This slide block is received in a suitable housing 125 (Figs. 10, 14, 15, 31 and 77), mounted upon two parallel links 126, 127, connecting the same with the frame, and which permit said housing to have a right and left movement (Figs. 14 and 15), parallel with the axis of said oscillatory shaft 113 which movement, when communicated to the short arm of the bell-crank lever 120 (Figs. 31 and 77), turns the latter on its fulcrum so that its long arm will swing transversely to vary the position of the slide blocks connected therewith, and the direction and extent of oscillation of the S carrier. One of the parallel links, herein that numbered 127, has adjustably secured to its underside an angle piece 128, upon which is mounted a roller stud 129 (Figs. 15 and 77), that enters a segmental slot 130 on a reversing arm 131, adjustably mounted on the upper end of a vertical shifting shaft 132, mounted on the column 1. By turning this shaft 132 in one or the other direction, its cam 130 operates, through the roller stud 129, to swing the parallel links and move the housing 125 in one or the other direction, as described, to turn the bell-crank lever 120 and adjust the side throw of the S carrier, as may be desired. Oscillation of the horizontal shaft 113, and the bell-crank lever 120 mounted upon it does not cause loss of engagement of said bell-crank lever with the link supported housing 125 (Figs. 10 and 77) because of the block 124 that slides in said housing 125. As is obvious such connection maintains continual effective engagement between the bell-crank and housing notwithstanding oscillatory movement of the shaft 113.

Referring to Figs. 14, 15, and 77 the parallel link 127 has an ear 133 which overlies a narrow table 134 on the housing 125 to assist in maintaining the latter in its proper position or level. Fig. 15 shows the reversing arm 131 turned into position to move the housing 125 forward or to the right, thereby to turn the bell-crank lever 120 into the position Figs. 31 and 77, to carry the slide blocks 109, 111 above or within the axis of oscillation of the S carrier, to cause the S carrier and its pincers to be moved into starting position at the right of mid-position of the pincers. Fig. 14, however, shows the said reversing arm 131 turned to move the housing 125 to the left, in which position it would swing the bell-crank lever 120 (Figs. 31 and 77) to its opposite position, thereby to carry the said slide blocks below or outside the axis of oscillation, and move the said S carrier and its pincers into starting position at the left of mid-position of the pincers. From starting position at either side of the mid-position or center, the transverse oscillation of the S carrier will in every case—as the machine here shown is organized—be to the opposite side of said mid-position, such oscillations occurring during the times in which the pincers are actively at work. Thus said pincers, while performing their work, may be caused to move from left to right or from right to left, as the operative desires.

The vertical shaft 132 (Figs. 14 and 15) may be turned by any convenient means, preferably at the will of the operative. In the present instance (see Fig. 67) said vertical shaft is provided at its lower end with an arm 135 connected by a link 136 with a bell-crank lever 137, fulcrumed at 138 on the front corner of the column. The other arm of said bell-crank 137 is provided with a radially sliding rod 139, to be hereinafter referred to, and which is provided at its outer or front end with a knee yoke 140 conveniently positioned to receive the operative's knee, by which said yoke may be swung from side to side as desired, to control, as above stated the side movements imparted to the pincers. If the said knee lever be swung to the left the pincers will also be moved into starting position at the left of their mid-position and if said knee lever is swung to the right the pincers will also be moved into starting position at the right of their mid-position, and the distance of such starting position from mid-position and the extent of travel in either direction therefrom depend upon the extent to which said knee lever is swung in such direction. Limiting stops are provided (see Fig. 67) in the form of screws 141 to limit the movements of the knee lever in opposite directions.

Referring to Figs. 4 and 15, said shaft 132 is provided above its topmost bearing with an adjustable centering segment 132ª, cooperating with which is a spring pressed pin 132ᵇ, which tends to lock said segment, and with it the cam 130, in central position thereby to aid the operative in placing slide blocks 109, 111, in mid-position when no side movement is desired for the pincers and tacker.

I have referred to the oscillatory shaft 113 (Fig. 31) and I will now describe the means for oscillating it. This means comprises a yoked arm 142 (Figs. 31 and 77) fast on the rear end of said shaft. Said arm 142 is shown connected by a link 143 with the lower arm of a lever 144, depending from a fulcrum 145 on the frame 2 (see also Fig. 9), and provided intermediate its length with a roller stud 146. This roller stud travels in a cam groove 147 on the rear side of a cam disk 16 fast on the main shaft, and previously stated to contain the cam groove 15 for operating the up-draw lever 3. The fulcrum 145 of said depending lever 144 (Fig. 9) is made eccentric to its carrying shaft, which is the stud shaft 13 already referred to as carrying the bell-crank 12 (Figs. 5 and 10), whereby rotation of said shaft 13 may adjust the lever fulcrum 145 to enable the mechanism to be conveniently adjusted and timed when the machine is assembled.

When a shoe is presented to a lasting machine for lasting, the insole is tacked or laid upon the bottom of the last and the upper and its linings are pulled loosely over and about the last, substantially as represented in Figs. 16 to 19, inclusive, wherein the last is indicated at $l$, the insole at $s$ and the upper, its linings, reinforces etc. at $u$. It is clear, therefore, that some means should be provided to hold the insole down in position to resist the up-draw and over-draw of the upper when seized and pulled upon by the pincers. This means, in the present instance of my invention, comprises a pair of sole rests 148. These rests, at their lower ends (see Fig. 20), are shaped to swing inward close beside the under pincer jaw and, as best shown in Figs. 16 to 19, are preferably pointed or shaped to permit them to enter and travel along in the channel $s'$ of the insole and beneath the channel lip $s^2$. They thus serve as a support to prevent the work lifting under the up-draw action and to prevent it from moving toward the operative under the over-draw action. These sole rests (Fig. 20) extend upward along the sides of the pincer carrier and between the latter and the guiding sides of the yoke 86, hereinbefore referred to, so that they have a right and left side motion with the said yoke and pincers. At their upper ends said sole rests are hung by trunnion screws 149 (Fig. 21) in a yoke shaped arm 150. This yoke constitutes one arm of a bell-crank lever, fulcrumed upon the transverse horizontal pivot 151 (Figs. 3 and 4), carried in a head 152 (Fig. 4), surmounting a shank 153 which is vertically adjustable in the yoke 86, that swings the pincers sidewise. The upright arm 154 of said bell-crank lever (Figs. 4 and 21) is connected by a link 155 with a horizontal plunger 156. This plunger slides in the ears of a bracket 157 (Fig. 4), which is split and clamped upon a transverse horizontal pin 158, mounted in the S carrier 106. The plunger 156 is made adjustable as to its length by screwing its actuating end into the body of the plunger as best shown in Figs. 2 and 21.

Referring to Figs. 2 and 24, the plunger 156, near its middle and between the ears of the bracket 157, is reduced to a neck 159, the flattened sides of which are perpendicular to a radius of the center 106 about which the S carrier and pincers swing and which are embraced by the forked head 160 of a horizontal, longitudinally sliding plunger 161 (Fig. 21) mounted to slide in the frame. The forked plunger head 160, referred to (Fig. 24), is provided with a roller stud 162 that travels in a peripheral cam groove 163 (Fig. 21), of a cam disk 164, fast on the main shaft 17 of the machine. Rotation of the main shaft operates, through this cam, to reciprocate the plunger head 160 in a direction parallel to said shaft, which reciprocation is transmitted to the plunger 156, thence by the link 155 to the bell-crank lever 154—150, thereby to impart lifting and depressing movements to the sole rests 148. This lifting and depressing movement is to free the said rests from the insole, to permit of their movement to assume new positions relative to said sole between successive feeds of the work. Because the lower, active ends of said sole rests are preferably pointed, the better to enter the sole channel or to engage the sole, it will be evident that they may be freed from the sole and again engaged therewith more freely if given an in and out movement in addition to the vertical movement described. To this end (Figs. 20 and 22), said sole rests when moved vertically are caused to slide through a pair of slotted heads 165, formed at the inner ends of trunnion pins 166, journaled in ears depending from the pincer moving yoke 86. Since these trunnion pins are fixed as to position, it is clear that the slight in and out movement imparted to the upper ends of the sole rests, by the short bell-crank lever 150 in lifting said sole rests, will cause the lower ends of the said rests to swing slightly out and in, this outward movement from the sole channel occurring simultaneously with the lifting movement therefrom, and, conversely, the inward movement into the said channel occurring simultaneously with their depression into engagement with the sole. This movement of the sole rests is variable by adjustment of the plunger 156 (Fig. 21). All these movements occur without interfering with the side movement of the pincers and sole rests, the forked plunger head 160 (Fig. 24) by its sliding engagement with the neck 159 permitting the split bracket 157 and its connected parts that are mounted on the S carrier to have free swinging or side movement without losing effective engagement with the cam operated roller stud 162 which controls the sole rest movements.

To assist in holding the work firmly in position, as well as to furnish a support to resist the inward thrust of the sole rests 148, it is desirable to employ a back gage or rest which I have herein provided in the shape of an inverted frusto-conical roller 167 (Fig. 11). This back rest is loosely mounted upon a vertical pivot 168, fast on an in and out and laterally movable slide 169. This slide, a short distance behind the back rest roller 167, is slotted from side to side to receive a horizontal roller 170 which (Figs. 14 and 15) stands between the side walls of a yoke 171, and permits said slide to be freely moved inward and outward to approach and recede from the work, yet at all times is capable of side movement by said yoke. At its extreme rear end (at the left Figs. 14 and 15), said slide 169 is provided with a second anti-friction roller 172, adapted to slide freely inward and outward, in a runway 173 provided therefor in a portion of the machine head (see the rear view, Fig. 9). The pin on which the last mentioned roller 172 is mounted is provided with a vertical extension 174 (Fig. 62) acted upon at its rear side by the long arm of a bell-crank lever 175, fulcrumed at 176 on the machine frame. This bell-crank lever is acted upon by a spring pressed rod 177, that tends constantly to turn the said bell-crank to push the said extension 174 and its back rest slide constantly forward, toward the work, movement in this direction, when not resisted by the work, being limited by a stop screw 178 (Figs. 14 and 62). It is desirable that this slide rest be oscillated sidewise in one or the other direction following the side movements of the pincers, so that the work, held firmly between the frusto-conical roller and the sole rests 148, may be fed into its new position while the materials are being pulled upon by the pincers.

In machines of this type, as heretofore generally made, it has been common to provide the pincers with an in and out movement only, to over-draw the materials and, after the pincers have been released from the materials and returned to their normal positions, the work was fed along the required distance by hand, the pincers seizing the materials in the new position and again over-drawing the same. The feed of a machine so organized is, of course, limited to the speed with which the operative is able to move the work along, step by step, between successive pulls of the pincers. In the present instance, by causing the work with the supports that hold the same to be moved along in the direction of feed during the period in which the pincers are pulling upon the materials, the work feed is completed by the time the pincers have completed their pulling movements and release the materials. It is clear, then, that the mechanically operated pincers can be returned to normal position, for reëngagement with the work already fed, much more quickly than the operative, in prior machines, has been able to feed the work forward by hand, between successive engagements of the pincers. By feeding the materials, therefore, while the pull is in progress, the speed of the machine is very appreciably increased.

In stating that prior machines have usually been organized to provide merely for an in and out pull, leaving the work to be fed by hand between successive pulls, I am not unmindful of the fact that such machines have been provided with means for imparting to the pincers a side reach to assist in plaiting the materials around the toe and heel of a shoe. In such instances, however, the side reach of the pincers is not accompanied by a corresponding side movement of the back rest, the work being left stationary during such side reach and pull, so that, in such machines there is no necessary progress of the work in the direction of feed simultaneously with the pulling of the pincers, and the same amount of time is lost between pulls in feeding the work by hand as is lost where the pincer has an in and out movement only, with no side action whatsoever.

Side movement is herein imparted to the back rest through the yoke 171 (Figs. 14 and 15) referred to, and it will be observed that the distance between the roller 170 which engages this yoke and the rear or fulcrum roller 172 is constant, irrespective of the in and out position of the slide rest, determined by the work, so that a given side movement imparted to said yoke will always move the back rest laterally through the same distance, whatever be the in or out position of the back rest relative to said yoke.

Referring now to Figs. 14 and 15, the yoke 171 is provided with a laterally extended arm 179 (Fig. 8) which is mounted to slide on a transverse, horizontal supporting pin 180, mounted in the frame 2. Immediately behind the support 180 is a supplemental supporting pin 181, mounted also in the frame and upon the outer end of which slides a lug 182 carried by the inner side of the said arm 179.

Referring now to Fig. 7, the laterally extended arm 179 has its end provided with a split clamp socket to receive an upright, slightly inclined, pin 183, which passes loosely through a cylindrical block 184, journaled in a housing 185 on the S carrier 105. Transverse oscillation of the S carrier, whether to the left or to the right, as described, will thus produce a corresponding transverse movement of the arm 179, its yoke and the back rest referred to, this transverse movement of the back rest being, of course, always in the same direction as the movements of the S carrier and corresponding in extent thereto. A slight loss in extent of motion imparted to the arm 179 from the S carrier is provided by the means shown because the yoke 171 of said arm engages the back rest somewhat in the rear of its active, front face and would, therefore, if not counteracted by such loss, amplify the movements somewhat at the contacting front face.

The back rest 167 is normally pressed forward by its spring and the bell-crank 175 (Fig. 62), so that in positioning his work in the machine, the operative is obliged to push the said back rest inward after which the work is turned upward to receive the sole rests described. The spring, of course, tends constantly to press the back rest and the work forward, but I do not wish to rely solely upon the back rest spring for holding the work firmly between the back rest and the sole rests; I prefer to lock the back rest positively in position, so that the work when once seized will be rigidly held although it may be moved freely sidewise in either direction. To this end (Fig. 11), the pivot for the leading back-slide roller 170 is made as a tubular pin 186, provided at its lower end with a ratchet tooth 187. Within this pin is a second ratchet toothed and headed pin 188, pressed normally to its seat by a spring 189 seated against a screw 190, tapped into the surrounding pin. The ratchet teeth of the pins 186 and 188 are spaced apart a distance equal to one-half the distance apart of the teeth of the ratchet block with which they coöperate thus allowing only half the amount of loose play given by the use of a single tooth. Standing beneath these two ratchet teeth is a ratchet toothed block 191 which (Fig. 8) is secured to a foot on the lower end of a vertically movable plunger 192, mounted to slide in a suitable socket in the yoke arm 179. This plunger is made tubular, to receive a spring 193 seated at its upper end against the closed end of the plunger and at its lower end upon a finger 194 which is carried by the yoke arm 179 and enters through a slot in the side of the said plunger. The said spring is therefore concealed, yet acts constantly to lift the said plunger and its attached ratchet block 191 toward the ratchet teeth 187, 188 on the back slide. This spring actuated lifting and locking movement is controlled (see Fig. 8) by an overlying small lever 195, fulcrumed at 196 on the said arm 179 and resting at its free end upon the closed upper end of said plunger. This lever 195, in turn, is acted upon by a connecting rod 197 which (see dotted lines, Fig. 7) reaches upward to a point adjacent the main shaft of the machine, where it is jointed to the end of an arm 198, fixedly secured to the bell-crank lever 66, which operates the pincer closing means, described. By this mechanism, whenever the said bell-crank lever 66 is moved to close the pincers upon and to seize the materials to be lasted the same movement of said lever will, by lifting the rod 197, permit the spring 198 (Fig. 8) to lift the ratchet block 191 (Fig. 11) into engagement with one or the other of the ratchet teeth on the pins 186 and 188 above it, thereby to lock the back rest rigidly in position, holding the shoe between its leading end and the sole rests, during which time the sole rests, back rest, work and pincers are moved transversely to feed the work, all without effort upon the part of the operative. Movement of the said bell-crank lever 66 to release the pincers acts also to depress the spring controlled lift block plunger to disengage the lock and leave the back slide free to return to assume a new spring controlled position relative to a new point on the work.

One desirable feature of the mechanism just described is this: The operative always finds a spring pressed or yielding back support for his work, to aid him in holding the same in position while passing it through the machine, and this back support becomes rigid at the time or times when a firm seizure or grip is necessary the better to resist the pulling action of the pincers, as well as to resist the action of the fastening or tacking means to be described, all of which promotes rapid work upon the machine.

Referring still to Fig. 11, overlying the toothed fulcrum pin 186 is a finger 199, fulcrumed at 200 on the slide 169. Interposed between the fulcrum end of this finger and the frusto-conical roller 167 is a sliding locking plate 201. When the ratchet toothed block 191 is lifted to lock the back slide with position the locking tooth 187 or 188 with which it engages, is given a slight lifting movement, which lifts the overlying finger 199 and throws the locking slide 201 forward into frictional or biting engagement with the roller 167, thereby to lock said roller against rotation simultaneously with its locking against repression. The roller when so locked becomes of material assistance in feeding the work, being more useful in this respect than would be possible if it were left free to rotate upon its own axis.

Having now described the means for seizing the materials, lifting and over-drawing the same, also the means for holding the work between the sole rests and back rest and for feeding the whole sidewise in one or the other direction, I will now describe the means for securing the lasted materials in position, such means preferably comprising a tacker mechanism or tacker for driving loose tacks. This tacker stands normally back, out of the way, and is brought forward as the materials are carried over the last, or immediately thereafter, such tacker advancing to drive the tack immediately behind the pincers, which are caused to relinquish their hold upon the materials just before the tack is driven or at about the time of such driving. Since the pincers act to pull upon the materials simultaneously with the feeding of the work to one side it is, of course, desirable for the greatest speed that the tacker should advance and drive its tack or tacks also while the work is being fed forward, consequently, the tacker herein is provided with means for causing it to move to one side so far as may be necessary for the driving of its tack or tacks in desired position, in order that no time may be lost in the cycle of the machine in waiting for the tacks to be driven. In advancing the tacker into driving position, however, I desire to avoid the complication and delay that would result from advancing it independently of the pincers and I have, therefore, provided means such that the pincer carrier, in advancing to over-draw the materials, will by its over-drawing movement draw the tacker forward into tack driving position so that the movements of the tacker are preferably wholly dependent upon and produced by the pincer carrier, or the pincer movements, and are never independent thereof. I prefer to drive the tacks two at a time, one at each corner or side of the pincers, thereby to speed the machine and to render the work more certain because of the driving of two tacks to hold each pull instead of relying upon one, as is more common. When the tacker retreats to its rearmost position, it is brought into register with the tack supplying raceway or raceways, to receive its tack or tacks, the said tacker then moving to one side in one or the other direction, as may be necessary, and advancing to enable it to drive its tack or tacks into the work in the position to which the work has been fed.

Referring now still to Fig. 11, there is interposed between the 8 carrier fulcrum hub and its fulcrum stud 106, a sleeve-like bearing 202, formed upon and projecting rearward from the tacker carrier 203 (see Figs. 4, 18 and 74). This tacker carrier may therefore swing transversely about the same axis as the pincer carrier 22 and is conveniently used to support the right hand end 86ᵇ of the yoke 86 (Figs. 4 and 6) which yoke, at its opposite or left hand end, has been described as directly connected at 86ᵃ to said pincer carrier. While the pincer carrier and its yoke 86 and the tacker carrier swing about the same axis, the pincer carrier and yoke have the longer swinging movement, and to provide for this, the connection at 86ᵇ, between the right hand end of the yoke 86 (Fig. 4) and the tacker carrier, is by a block on the pin 86ᵇ, and working in a slot 86ᵃ in the tacker carrier, thus providing the required support while at the same time permitting the necessary relative movement. This tacker carrier 203 referred to (shown in perspective in Fig. 74) is formed in two separable parts, to provide a vertical guideway for the rectangular, vertically reciprocable driver bar 204 (shown also in Fig. 13). This driver bar is acted upon at its rear side and lifted, at each rotation of the main shaft, by a segmental lift cam 204ᵃ on the front end of the cam disk 164 (see Figs. 11, 12 and 13). This driver bar is also slotted transversely and vertically as at 205 (Fig. 11), to receive the end of the inwardly extended driver arm 206 (shown in Fig. 13 and also in Fig. 6), which arm at the right hand side of the machine is fulcrumed loosely upon a stud 207, on an arm of the tacker carrier 203 (Fig. 74) referred to. Surrounding the hub of this driver arm is a driver spring 208, adjustably held at its inner end and extended at its front end to overlie the said driver arm and furnish means, when the said driver bar has been lifted by said cam 204ᵃ, and the latter turned from under it, for depressing said driver bar quickly and with sufficient force to drive one or more fasteners or tacks into the work. By arranging the driver arm to reach through the side of the driver bar as herein, instead of having it arranged to act through a strut upon the top of the driver bar, great economy of space is had. The driving blow imparted by this spring actuated arm is cushioned by a cap 209, secured to and at the top of the driver bar, beneath which are arranged one or more leather or other cushion washers 210 which seat upon the top of the driver carrier 203.

To the lower end of the driver bar 204 is jointed at 211 a link 212 (Figs. 6, 11, 12, and 74), in turn jointed at its lower end to a swinging driver bar 213, mounted to slide in a suitable guide at one side in the swinging tack block hanger 214. This tack block hanger (see Figs. 6 and 74) is shaped somewhat like a distorted V, having its central leg substantially vertical and its left hand leg reaching off to one side, the two legs being hinged at or near their upper ends upon a transverse horizontal pivot pin 215, held at its ends in the transversely swinging tacker carrier 203 referred to. The tack block carrier is thus given the transverse movement of the tacker carrier 203 and, in addition, it may also be swung outward and inward about its hinge 215 from its rearmost tack receiving position into a forward tack driving position, close behind the overdrawn pincers described; and in any position of this swinging tack block, the driver bar is operable, under the action of its spring referred to, to drive a tack or tacks out from the bottom of the tacker. In the present instance, two tack drivers 216 are employed, they being clamped in the lower end of the swinging driver bar 213 by a clamp screw 217. These drivers reciprocate in suitable driver passages formed in the tack block 218 (best shown in Figs. 11, 42, 43 and 74).

Referring to Figs. 43 and 46, the tack block 218 is shown as formed in two parts, divided horizontally at 219 to facilitate the formation of two flat, tack head passages 220 leading from the rear side of the tack block forward to the driver passages, each of these tack head passages being provided with a depending tack passage 221 to receive the shank of a tack, the head of which rests and travels in the flat, head receiving passage 220.

To swing the tacker from its rearmost position (Figs. 11, 42, 43 and 16) into its forward, tack driving position (Fig. 19), the transverse pin through which the overdraw pincer movement is imparted, and indicated at 83 (Figs. 4 and 11), is extended in opposite directions (see Fig. 4), and loosely connected with the oppositely extended ends of said pin (see Fig. 3) are the forward ends of a pair of links 222. These links extend rearward and are hung at their inner ends upon a suspension hanger 223, fulcrumed at 224, between two ears upon the S pincer carrier 105 (see Figs. 11 and 72). One of these links, namely, that at the right and shown in Fig. 3, is provided with an extension 225 which (see Figs. 47 and 48) is provided with an inwardly extended stud 226, perforated to receive one end of an actuator rod 227, extended diagonally downward and forward and seated at its front end upon a pin 228 projected laterally from one side of the tacker block 218. Surrounding this rod 227 is a coil spring 229, seated at its lower end upon the head of said rod, where it seats upon the said pin 228, and, at its upper end, upon a washer 230, loose upon said rod and having its convexed face resting against a coöperating face on the perforated pin 226. By this construction any forward, overdraw movement of the pincer carrier will act, through the link 222 and its extension 225, to communicate corresponding forward motion to the tacker head 218, but only through the medium of said spring 229. This same right hand or extension link 222 is connected with the hanger 223 referred to by a pin 231 (see Fig. 46) which pin is extended transversely of the machine, through said hanger and is provided at its opposite, inner end, beyond the inner link 222, with an eccentric end 232 (Fig. 44). This pin is held in one or another rotatively adjusted position by radial serrations on the inner face of the outer, extension link 222 (Fig. 46), and corresponding serrations on the opposing face of a washer 233, mounted on said pin between said link and the adjacent bearing of the hanger 223, said washer having a flat sided opening to fit upon a flat sided portion of the pin, to retain it against rotation thereon. A jam nut upon the outer end of the said pin furnishes means by which the pin may be rigidly secured to the said link 222 in any desired rotative position, thereby to retain any adjustment of the opposite eccentric end thereof.

Referring to Figs. 44, 47 and also to Fig. 80, the inner, eccentric end of the pin 232 receives one end of a pusher 234, which, at its forward end, is jointed at 235 to the lower end of a segmental throw-out plate 236, hung at 237 on a slide bar 238, mounted for in and out sliding movement in suitable bearings in the side moving pincer yoke 86. This slide bar (see Figs. 45 and 46) is provided at its inner side with a depending, slightly outwardly inclined stud 239, carrying a roller 240 that enters a pocket 241 in a head 242 on the end of a swivel stud 243, mounted in the V shaped tacker hanger 214 (see Fig. 74). By this means any endwise movement of the slide bar 238 is communicated to the tacker hanger 214 to cause the latter to be swung forward and backward, toward and away from the last. The axis of the roller carrying stud 239 is made oblique as shown, in order that it may be substantially radial to the center of side swing of the pincers and other sidewise moving parts.

The throw-out segment 236 (see Figs. 46 and 80) is provided with a laterally extended, segmental flange 244, the end of which underlies an adjustable block 245, on the said yoke 86. When the pincer carrier (Fig. 47) is swung forward, to cause the pincers to over-draw the materials, the said carrier operates through the links 222, the eccentric ended pin 231, the pusher 234 and the throw-out segment 236, to push the slide 238 also forward, the throw-out segment being prevented from turning about its own axis by contact of the upper end of its flange 244 with the under side of the block 245, and this forward movement of the said slide bar, through the roller stud 240 (Fig. 45), produces a corresponding forward swinging movement of the tacker hanger 214. After the said slide bar and tacker hanger have been moved a short distance, however, the end of the segmental flange 244 referred to, passes from under the block 245 and, being no longer restrained from turning about its own axis, will be turned about its own axis by any subsequent pushing movement of the pusher 234 and will, therefore, communicate no further movement to the slide 238 nor to the tacker hanger referred to. Immediately, however, the segmental throw-out thus operates to throw out the positive connections for swinging the tacker hanger, the entire pull upon the links 222 is communicated through the link extension 225 (Fig. 47) and the spring 229 to the lower end of the tacker hanger, that is, to the tacker block, so that during the remainder of the forward movement of said links the tacker hanger is advanced by a yielding or spring connection, capable of yielding or giving way should the lower end of the tacker block encounter any undue resistance such as would, if not provided for, cause breakage of some of the parts or damage to the stock with which it might come in contact. The mechanism above described thus produces by positive connections the initial advancing movement of the tacker hanger and parts carried by it and, in connection with the cam construction 97 already described for producing a positive initial forward movement of the pincer carrier 22 which moves the tacker, makes possible the speedy overcoming of the inertia of all the connected parts, and a resultant quick forward movement with great certainty that will permit the machine to be operated at a high speed. Immediately, however, the pincer carrier and tacker hanger with their connected parts are gotten under way, that is, after the inertia has been overcome, the positive cam surfaces that started the pincer carrier 22 are drawn away and said carrier advanced thereafter only by its spring 94, as stated, and, substantially simultaneously therewith, the positive connection between the pincer carrier 22 and the tacker hanger 214 is thrown out and the spring connection 229 between the same brought into use. Thus, while the parts are positively started, they are effectively moved only by springs so as to permit the utmost elasticity of movement and yield should any obstruction be encountered by them or either of them.

The tacker hanger moving spring 229 (Fig. 47) is, of course, always under sufficient tension to move the tacker hanger and its parts whenever the burden of moving the same is transferred to it, yet it is of such tension as to yield in the presence of a resistance that would do damage. To prevent this normal tension of the spring 229 from throwing the tacker forward, independently of its actuator, from tack receiving position, the throw-out segment 236 is provided with a heel 246 (see dotted lines, Figs. 47 and 48) which rests normally against the under side of the slide bar 238, and prevents the said segment improperly turning in a reverse direction. The point at which the positive connection between the pincer carrier and the tacker hanger is thrown out is, of course, variable by out and in adjustment of the said block 245. The slide bar 238, at its rear end (at the right in dotted lines, Fig. 47) is guided by a pin extension 247, which slides in the carrier 105.

Turning now again to Fig. 43, when the tacker is in its rearmost tack receiving position, its rear face is in abutting contact with a face plate 248, secured to the front face of a diagonal arm 249 (see Figs. 6, 74 and 75), which reaches upward to the left and is secured at its upper end, at 250, to the under side of the tacker carrier 203. Being thus secured to the said tacker carrier at its upper end, it is supported at its lower end so as to have a sidewise swinging movement with said tacker carrier by providing said lower end (see Figs. 42 and 74) with a rearwardly extending pin 251, the head 251$^a$ of which has a segmental guideway to receive and slide freely upon the segmental finger 252 which (see Figs. 8 and 74) projects to the right from the lower portion of the machine head. This face plate 248 (see Figs. 35 and 75 and 82) is provided with two vertical slots 253, through which the tacks are fed to the tack receiving slots in the tacker head 218. At its upper edge the said face plate 248 is provided with a rearwardly and upwardly inclined table 254 (Figs. 81 and 82), upon which, at either side the slots 253, the tack heads rest and down which they gravitate. Between the said slots the said upwardly inclined table is provided with a central cap 255 (Figs. 75 and 82), that overlie at its edges the heads of the tacks adjacent thereto to hold them upon the inclined table beneath.

Referring now to Figs. 76, 81 and 82, behind the face plate 248 and beneath its upwardly inclined table 254 is a flanged plate or separator 256, provided with a vertical front portion and a rearwardly and upwardly inclined flange portion, said separator being mounted to slide upon a separator support 257 secured to the lower end of said diagonal arm 249. In the rear of said separator support 257, and between said support and the adjacent ends of the tack raceways 258, slides a vertical plate or gate 259, to enter behind the lowermost tack of the series preparatory to the removal of said lowermost tack by the separator, said gate also acting to close the lower ends of the raceways when the lowermost tacks therefrom have been picked off by the separator for delivery to the tacker.

Referring now to Figs. 35 to 41, and 81, the separator 256 has its rearwardly inclined flange provided with two oblique slots 260, which terminate at the front of the separator in vertical slots 261. The separator support upon which it slides is provided with vertical front to back slots 262 which register in alinement with the vertical slots 253 in the face plate 248, at the opposite or front side of the separator.

Assuming the separator to be in its extreme position at the right (as shown in Figs. 38 and 39), the lowermost tacks in the two raceways 258 will gravitate through the passages 263 provided therefor in the gate 259, and will occupy positions as shown in Fig. 39, with their lower or point ends in the slots of the separator support and with their upper ends in the alined slots of the face plate table, between which points, i. e., between their upper and lower ends, said tacks are engaged by the walls of the oblique separator slots 260. If, now, the separator be moved to the left (Fig. 40) between and relative to the face plate and separator support, the two tacks standing as described, being restrained from corresponding movement to the left by the walls of the slots above and below the separator, will, under the action of the oblique walls of the separator slots, be pushed toward the tacker in the direction of the arrow 264 (Fig. 39), until they reach the positions indicated in Fig. 40, at or near the front face of the separator and immediately behind the face plate, in contact with which the tacker rests. In the meantime, the gate 259 has been moved simultaneously and in the same direction with the separator, to cause its points 259$^a$ to enter between the two lowermost tacks that gravitated into the separator and the line of tacks standing in the rear, in the raceways, so as to hold the latter back until two more tacks are desired to be picked therefrom. Were it not for this gate, the points of the tacks, left in the raceways and that depend below the thin edge of the separator flange, might project forward and be bruised by or interfere with the side movement of the separator support. The separator is not relied upon, with certainty, to advance the tacks beyond the positions indicated in Fig. 40, and I having provided means to take the tacks from the position (Fig. 40) and advance them across the face plate table and along the slots of the tacker head 218, into position against the drivers in the driver passages, or into the driver passages if the drivers be sufficiently elevated therein. To this end I have provided means best shown in Figs. 42, 43 and 73. The tacker hanger 214, near its lower end but at a point somewhat above the tacker head 218, is provided at one side, herein at the left, with separated bearings for the horizontal shaft 265 (Fig. 46), to which is fixed intermediate its ends a finger carrier 266. This finger carrier extends inward, as best shown in Figs. 38 and 73, and then to one side into position behind the tacker proper. Its end is there provided with two parallel slots, to receive the like fingers 267, which may if desired be formed as parts of a single U shaped member, struck up from sheet metal. This member, with its fingers inserted in the said slots, is there secured by a clamping screw 268.

Referring again to Fig. 38, the short finger shaft 265 is slotted diametrically at its end to receive the inner, inturned end of a coil spring 269, the outer end of which underlies the inclined face of the tacker hanger, being there held in position by a pin 270 in the hanger. This spring tends constantly to turn the finger carrier to cause the lower, tapered ends of the fingers to swing forward toward the tack block 218, traveling in the tack slots in the face plate 248, to push the tacks from the positions to which they have been moved by the separator, along said slots and against the sides of the rising tack drivers 216, and, then, as soon as said drivers have risen sufficiently, to push said tacks into the driver passages, where they are held by the fingers until the drivers in their descent drive the tacks down through and out at the lower end of the tacker, said fingers yielding to one side, to permit the drivers to pass. These fingers are withdrawn to permit a new pair of tacks to be positioned in front of the same by mechanism connected with the separator operating mechanism, both of which mechanisms I will now describe.

Referring to Figs. 39 to 41, and 81, the separator 256, at its outer end is secured to the face of a separator head 271 and is held in position thereon by a cap 272, clamped in position by a bolt and nut 273, and held additionally by a dowel pin 274. The clamping bolt referred to has a squared shank portion 275 at its inner end, to prevent it turning in said separator head and, at its inner end, is provided with a cylindrical head 276, by which the gate 259 is drawn and clamped against the rear side of the separator head. The cylindrical bolt head 276 is engaged by the upper end of a short lever 277 (see Figs. 35, 37 and 78), which lever is fulcrumed at its lower end (see Fig. 42) upon the pin 251, hereinbefore referred to as having the head that supports the lower end of the diagonal arm 249. Surrounding the hub of this lever 277 (Fig. 78), is one leg 278 of a yoke 279, the other leg 280 of which is loosely mounted upon said pin 251 between the arm 249 and the pin head, so that said yoke and the said lever turn about one and the same axis upon the pin 251.

Referring now to Figs. 38, 37 and 75, the hub of the lever 277 is provided with a segmental opening 281, in which plays a segmental lug 282 on the adjacent leg of the said yoke 279, so that while it is possible to move the said lever by and from the said yoke there is a lost motion between the two. Mounted upon this yoke (see Figs. 42 and 78) is a coiled spring 283, one end of which bears upon the yoke, the other end reaching across to and entering an aperture in the upper end of the lever 277, the said spring maintaining the said lever and its yoke normally in the relative positions shown in Figs. 35 and 36, with the yoke lug 282 in contact with the upper wall of the lever opening 281. From these views it will be evident that the yoke, if turned in the direction of the arrows thereon, will push positively before it the lever 277 and will thereby cause the separator to be moved to the left as illustrated in Figs. 39 and 40 to pick off the lowermost tacks in the two raceways and advance the same into positions to be taken and further moved forward by the fingers 267. Return movement of the yoke, however, in a direction opposite the arrow (Fig. 37) will act only through the spring 283 to return the separator to its original tack receiving position. The return movement is thus made yielding so that if there be any obstruction to its movement by reason of an imperfectly formed or positioned tack, the separator may yield thereto and do no damage to the connected parts. The opposite or feeding movement is also made yielding by means presently to be described and for a similar purpose.

Referring now to Figs. 35 and 37 and Fig. 42, the inner arm of the yoke 279 just referred to is provided with a depending and inwardly extended, triangularly shaped plate 264, (Fig. 78) the lower portion of which is provided with a stud 285 that is seated at its inner side upon a spring supported rest 286, the spring being indicated at 286ª. The inwardly extended portion of said triangular plate (Fig. 78) is connected by a stud 287 with a beam 288 (shown also in full lines in section, Fig. 43). At its left hand end (Fig. 35), this beam is connected at 289 with a vertically movable yoke arm 290. This arm slides in a groove in the head 291 of a freely rotatable stud 292, which furnishes a fulcrum about which said arm may be swung sidewise yet through which it may be lifted at will. At its upper end the said arm 290 is provided with a forwardly extended yoke 293 (Figs. 36, 42, 43 and 78), the front arm of which (Fig. 35) depends into position substantially coincident with the axis of said stud 292, said depending front arm being provided with a forwardly extended stud 294, which underlies a transverse pin 295 (Figs. 38, 42 and 43) on the finger carrier 236. If, therefore, the said arm 290 and its overhanging yoke 293 be lifted it will cause the finger carrier also to be lifted, to cause the fingers to be swung inward into their positions indicated in Fig. 42. Depression of said yoked arm permits the said fingers, under the action of their spring referred to, to be swung forward into their tack delivering positions (Fig. 43). This lifting of the yoke arm 290 is accomplished by means illustrated in Figs. 35 and 73 and comprising a substantially vertical link 296, provided below the beam 288 with an underlying stud 297 such that when said link is lifted it will lift the said beam bodily by its middle. The finger controlling spring 269 being weaker than the spring 286ᴬ supporting the lower end of the yoke 279, when the said beam is thus lifted by its middle, its end (Fig. 35) which is connected with the finger controling yoke arm, will first respond and by its upward movement will lift said yoked arm and thereby the finger carrier 266 to turn back the fingers to receive the new tacks. When the said finger carrier has been turned backward to its limit determined by contact of the under side of the finger carrier with a stop surface 298 (Fig. 6) on the tacker hanger, the entire lifting movement of the said link 296 is thereafter transferred to the opposite end of said beam 288, being the nearer end Fig. 73, which is now lifted. When the right hand end of the beam is thus lifted, it turns the triangular plate 284 (Fig. 73) together with its yoke 279 about its axis on the stud 251, thereby through the spring 283 connecting the said yoke with the lever 277, imparting corresponding turning movement to the said lever, to draw the separator and gate to the left (Fig. 73), to receive a new set of tacks from the tack raceways. This turning of the yoke 279 causes the lower end of the triangular plate 284 upon which the stud 285 is mounted to be swung to the right (Fig. 73) to compress the spring 286ᴬ that supports the seat 286. Both the finger spring 269 and the separator spring 286ᴬ are now under tension. When, now, the link 296 is permitted to drop, the separator end of the sustained beam 288 first drops because the spring 286ᴬ controlling the separator actuating yoke at that end of the beam, exceeds in strength the finger operating spring 269, consequently the separator and its gate will be first returned to the right (Fig. 73 and left, Fig. 37), to pick off a pair of tacks from the adjacent raceways and feed them forward to the positions indicated in Fig. 40. When the separator has reached the limit of its feeding movement in this direction, the opposite or finger end of the sustained beam is permitted to respond and descend, bringing down with it the yoked arm 200 and the stud that supports the finger carrier, permitting the finger spring to swing the fingers inward in the tack slots, their lower ends engaging the heads of the tacks in the positions Fig. 40, and pushing them along in the tack slots of the tacker to and against the rising drivers therein. It will be observed that the movement of the separator to the right (Fig. 73), which picks off and feeds the tacks, is furnished by the spring 286ᴬ, which permits the separator to be arrested should it encounter any obstruction, for example a mutilated tack, which will not feed readily or properly. Thus, as previously stated, the separator is yieldingly actuated in both directions, insuring complete safety of operation.

To lift and depress the link 296 (Fig. 73) which operates the separator and tack feeding fingers, the said link (see Fig. 35) is suspended at its upper end from an arm 299, fulcrumed at 300 on the frame. This arm is provided with a rearwardly extended tail portion 301 which underlies the down turned end of a plate 302, adjustably attached at 303, to the under side of a lever 304. This lever, fulcrumed at 305, is provided with a roller stud 306, acted upon by a cam 307, on the periphery of the cam disk 75, hereinbefore referred to as operating the pincer closing mechanism. At each rotation of the main shaft said cam, by depressing the lever 304, causes the link 296 to be lifted, first to withdraw the tack fingers 267 and then to return the separator 256 to tack receiving position. Later in the rotation of said shaft, said arm 304 is lifted under the action of the finger and separator springs, which depress the link 296 as stated and permit first the separator and then the fingers to receive separating and tack feeding movements.

Having now described the means for moving the tacker outward and inward relative to the last and the means for delivering the tacks thereto and for driving said tacks, and, having also shown that the tacker is mounted in a swinging carrier to permit it to swing transversely for the purpose of following up the side travel of the pincers and driving the tacks in proper position behind the pincers wherever the latter may be, I will now describe the means for imparting the transverse swinging movement to the tacker, both for registering it in mid-position with the tack delivering raceways, and for carrying it to and for registering it with and behind the pincers at one or the other side of the center of the machine wherever such pincers' position may be. To accomplish this, in the embodiment of the machine herein illustrated, I have provided connections between the means for actuating the pincers transversely and the tacker carrier such that in moving the pincers into one position (at the start of the transverse movement) the tacker will be moved thereby to register it with the tack raceways to receive tacks and in moving the pincers into another position (at the completion of the transverse movement) the tacker will be moved thereby to register it with the pincers to drive tacks. As herein described the pincers seize the upper and start their transverse movement on one side of the center line of the machine and move across and beyond the center line before releasing the upper preparatory to its being secured. This movement may be from right to left and back or from left to right and back. As the stationary raceways are, as herein described, situated upon the machine center line it is clear that in its transverse movement the tacker does not cross the center line but travels from the center line outward, to the right or left, according to the travel of the pincers, and then back to the center line. The tacker then, does not start its transverse movement until after the pincers have passed through a portion of their transverse movement, this point preferably being at about the time the pincers pass mid-position. Therefore if the tacker is connected to a moving part of the pincer mechanism so as to derive its transverse motion therefrom the connection should be such as to be ineffective to move the tacker during a portion of the travel of the pincers. The parts should be of course so proportioned that the tacker, although moving with the pincers, at one end of its transverse movement is brought into effective register with the raceways to receive tacks and at the other end of its transverse movement is brought into effective register with the pincers to drive tacks, no matter what the amplitude of transverse movement of the pincers may be. The mechanism for moving the tacker, as described, from the pincers and its operation will now be described.

Referring now to Fig. 6, the yoke-like tacker carrier 203 is provided at its extreme left hand end with a longitudinal pin, the end of which is shown at 308, which pin is shown in the sectional detail Fig. 34. At the rear side of said yoke (the upper side in Fig. 34) the projecting end of said pin serves as a guide for a slot 309 in the slidable holder 310 (see Fig. 77), forked at its upper end to span and slide on a rectangular stud 311, mounted in the said yoke. A spring 312 (see Fig. 34), seated at one end in the shank of said holder and at its opposite end upon the said squared stud 311, presses the said holder normally to the left (Figs. 34 and 6 and downwardly and to the right in the perspective Fig. 77), to the limit of said slot 309. The holder 310 is provided at its lower end with a cylindrical recess for the cylindrical centering block 313, recessed at one side to receive the end of a centering pin 314. This centering pin projects from the front side of a "U" shaped positioning member 315, fast on the said pin 314; said positioning member being mounted to slide diametrically across the face of said centering block 313 in a groove formed in the face of said block. Between the arms of said positioning member said centering pin 314 passes loosely through the end of a lever 316 (see also Figs. 25 to 27 inclusive) which lever is fulcrumed at 318 on the frame (see Fig. 77ᵃ). The positioning member 315 (see Figs. 77 and 84) is provided at its inner end with a second pin 319 which (see dotted lines, Fig. 77, also Figs. 25 to 27 inclusive) is connected by a link 320 with a stud 321, fast on the "S" carrier 105 for the pincers and which moves the said pincers transversely.

It is obvious that the side movement of the S carrier is ineffective to move the connected tacker carrier 203 if the pin 314 in the positioning member 315 is in position substantially coincident with the center of the centering block 313 on the tacker carrier, for then any movement of the S carrier and the link 320 is absorbed in simply turning the pin 319 around the pin 314 as a center. During this turning movement the relative location of the tacker carrier and positioning member remains substantially unaltered, that is, with the pin 314 in substantial alinement with the center of the centering block 313 on the tacker carrier and the parts are so proportioned that when said pin and the centering block are so alined the tacker is in tack receiving position at the raceways. If the relative position of the positioning member 315 be changed so as to bring the pin 319 in substantial alinement with the center of the centering block 313 the proportions of the parts are such that the tacker will be brought into tack driving position behind the pincers. It is clear then that owing to such proportioning of the parts, if during the movement of the pincers back to starting position, after having released the upper, the positioning block 315 be moved so as to bring the pin 314 and the centering block 313 into the relative position shown in Figs. 33, 34 and 77 and held there, the tacker will be moved into tack receiving position and will be maintained in such position notwithstanding further movement of the pincers. If, however, during the feeding movement of the pincers the position block 315 be moved to bring the pin 319 and the centering block 313 into substantial alinement, as in Figs. 27 and 30, the tacker will be moved by the pincers into tack driving position adjacent the pincers wherever they may be. To shift or slide this positioning member from its outer to its inner position, and vice versa relative to said centering block, for the purpose of adjusting the alinement of the pins 314 and 319 with relation to the centering block 313, and locating the tacker, first at the raceways to receive its tacks, and then to one or the other side, behind the pincers, where the tacks are to be driven, I have provided the following means.

Referring to Figs. 25 and 77ᵃ, fast on the fulcrum shaft 318 of the lever 316 is a lever 322, connected at its end 305 heretofore referred to by a curved link 323 with a crank pin 324 on the oscillatory head 122 of the pincer oscillating shaft 113, to which head the bell-crank lever 120, which controls the extent and direction of pincer side movement, is pivoted. Oscillation of said shaft 113 and head 122 for swinging the pincers sidewise will therefore operate also to oscillate said lever 322 and with it its rigidly connected lever 316. This will cause the positioning member 315, mounted in the end of said lever 316, to have a regular back and forth movement past the center and sliding in the slot in the face of the centering block 313 (Fig. 34). Thus, first one and then the other end of said positioning member, carrying the pins 314 and 319 is brought opposite the center of said centering block, to cause the tacker to be swung in position first for tack receiving and then for tack driving behind the pincers, wherever they may be.

When the machine is adjusted to cause the pincers while pulling upon the materials to move to the left of the center of the machine, it will, by its connection with the positioning member, move its end thereof also into position to bring the tacker hanger likewise to the left for its tack driving position. When, however, the machine is adjusted to cause the pincer hanger to travel to the right while the pincers are drawing upon the materials it will, by its connection with said positioning member, so position the latter as to throw the tacker hanger also to the right for its tack driving position. Irrespective, however, of the direction in which the pincer hanger may be moving or to which side of the center line of the machine the tacker hanger may be swung for delivery of its tacks, the said tacker hanger will always be brought to one invariable mid-position for receiving its tacks by reason of the final alinement of the pin 314 and the centering block 313 as heretofore described. Since this mid or tack receiving position of the tacker must, of necessity, be invariably accurate in order that the tacks may be properly delivered thereto and, since it might be difficult to construct and adjust the parts, if inflexible throughout, in a manner to insure such accuracy, I have provided the sliding holder 310 for the centering head 313, which, when the centering pin 314 has been brought into perfect alinement with and is arrested by the centering head 313, permits the latter to move slightly on the tacker carrier through any further movement of the centering pin, thus to maintain the alinement of the centering pin and centering block and insure the correct tack receiving position of the tacker even when the parts are not first constructed with absolute accuracy, or in the event of any wear of the parts, such as would otherwise destroy this essential and accurate tack receiving positioning of the parts.

Referring now more particularly to Figs. 25 to 27 I will describe the movements with relation to the tacker of the various parts involved in moving the pincers and tacker from right to left during the machine operation. In setting the machine so that the pincers will have a right to left movement the pin 110 at the center of the blocks 109 and 111 (Fig. 32) has been rown to a position above the rock shaft 113. This position is shown in plan Fig. 31, in perspective Fig. 77 and diagrammatically Fig. 25. The head 112 carrying the block 111 lies in substantially horizontal position (see Figs. 77 and 25). The tacker 218 is at the raceways receiving tacks and the pins 314 and 319 and the centering block 313 are in the relative positions shown in Fig. 34 with pin 314, on the end of lever arm 316, in substantial alinement with the center of the centering block on the tacker carrier 203. It will be seen from Fig. 25 that the pin 324 connecting link 323 with the oscillating head 122 (Fig. 77ª) is at this time below the dead center line extending between the centers of the shaft 113 and the stud 305, and therefore the outer or upper end of the lever arm 316 carrying the pin 314 is not at the highest position to which it is carried by movement of the head 122 through oscillation of the shaft 113. The positioning block 315 at this time, i. e. starting position of the pincers, extends in a direction substantially parallel to the head 112, the link 320 extending from its inner end in a substantially vertical position all as shown in Fig. 25.

On starting the machine the shaft 113 turns first in a contra-clockwise direction which imparts movement to the S carrier 105 moving its free end (at the left Fig. 7) upwardly and thereby starting the pincer carrier on its movement toward the left. Movement of the end of the S carrier upwardly imparts upward movement to the link 320 connecting the S carrier and the positioning block. Such movement of the link 320 does not, however, impart any movement to the tacker carrier 203 as it is absorbed in moving around the pin 314 as a center, which pin is in substantial alinement with the centering block on the tacker carrier, as stated.

During the initial movement of the pincers the pin 314 does however have some movement relative to the pin 308 which is as follows. Oscillation of the shaft 113 will oscillate the head 122 and thus impart an upward movement to the pin 324 in the lower end of link 323. This pin being initially below the dead center line between 113 and 305, as stated, its upward movement will also move the lever arm 322 to the right (Fig. 25) carrying with it the lever arm 316 and its pin 314, the movement of the pin 314 being upward (to the right Fig. 34) until the pin 324 reaches the dead center line and then downward (to the left Fig. 34) after the dead center line has been passed by the pin 324. The upward movement of the pin 314 carries the centering block 313 with it and is taken up by the spring 312 in the holder 310. This movement thus permits what continued swiveling the pin 319 may have on the pin 314 from continued movement of the pincers, to take place without affecting the position of the tacker, which remains at the raceways.

At about the time the pincers pass midposition in their travel from right to left the shaft 113 has turned its head 112 into the position shown in Fig. 26, the link 320 has turned the positioning block 315 into a position substantially parallel to said head, as shown in Fig. 26, and the pin 324 has reached a point on the upper side of the dead center line from 113 to 305 at about the same distance therefrom as it was when in starting position. The pin 314 has thus been again moved into substantial alinement with the pin 308 and the centering block has followed it by expansion of the spring 312 until it has seated itself upon and in alinement with the pin 308. Thus far no transverse movement has been imparted to the tacker. From this point on, however, oscillation of the shaft 113 will move the lever arm 316 in a direction to drag the positioning block 315 downwardly (viewing Fig. 26) through the centering block 313, which is held from further movement in this direction by the pin 308, and move the pin 314 below and away from the centering block. As soon as the pin 314 moves out of alinement with the center of the centering block 313, the continued movement of the pin 319, by the link 320, around the pin 314 imparts at the same time a direct thrust outwardly to the pin 308 (to the left Fig. 26) thereby moving the tacker carrier 203 transversely and to the left about its pivot 106. Thus it is seen that as the positioning member 315 is being moved outwardly through the centering block 313 the tacker is also being moved transversely to its tack driving position behind the pincers. The transverse movement of the tacker continues until the pincers have reached their extreme left hand position at which time, as shown by Fig. 27, the head 112 has been moved to a substantially vertical position, the positioning block 315 has been drawn by movement of the lever arm 316 to a similar position and simultaneously the pin 314 has been drawn away from the pin 308 and through the centering block 313. This movement of the positioning block 315 during the latter portion of the transverse movement of the pincers tends to move the pin 319 into position nearer and nearer to the center of the centering block, or the pin 308, on the tacker carrier, and results from the transverse movement of the pincers which in turn move the tacker transversely by the thrust from the link 320, until finally the pin 319 is brought into substantial alinement with the center of the centering block and, owing to the proportioning of the parts, the tacker is brought into tack driving position behind the pincers.

In returning the pincers to the starting position the movements just described are reversed, the pin 319 first drawing away from its alinement with the centering block 313 and from the pin 308 and the pin 314 again approaching alinement therewith, until, when the pincers reach mid position carrying the tacker with them the pin 314 and the centering block have again become substantially alined and the tacker has been replaced in tack receiving position. Thereafter further movement of the pincers does not communicate movement to the tacker but is absorbed by reverse movement of the pin 319 about the pin 314.

Figure 28:
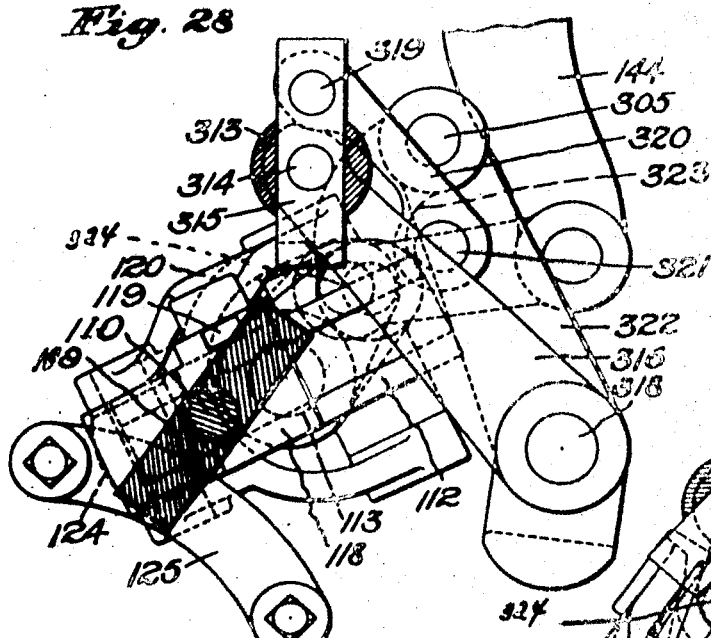
Figure 29:
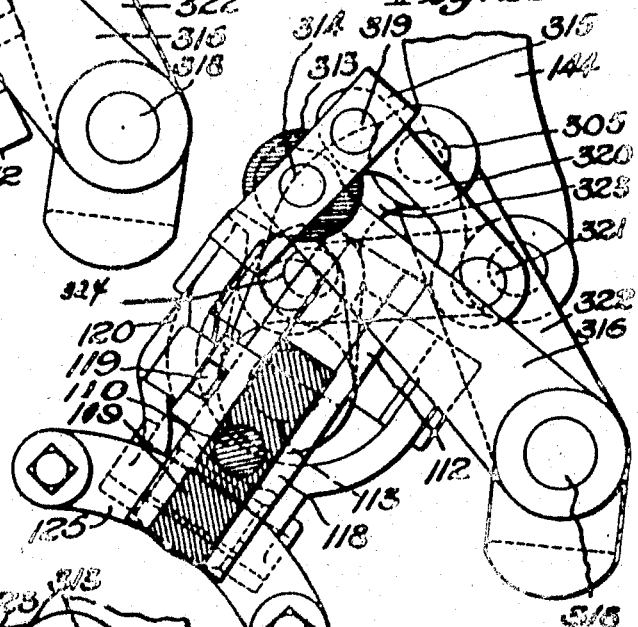
Figure 30:
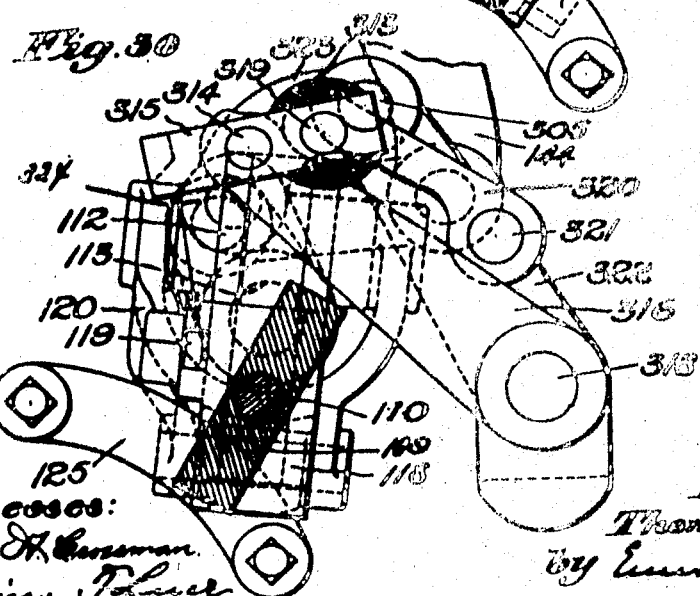

The diagrammatic figures 28 to 30 show the relation of the parts above described when the pin 110, at the center of blocks 109 and 111, has been initially placed below the shaft 113 and a movement from left to right of the pincers is therefore obtained from an oscillation of the shaft first contraclockwise and then back. Similarly to Figs. 25 to 27 the three figures illustrate starting, mid-position, and final position of the pincers.

I will now describe the means for supplying tacks to the raceways 258. Referring to Figs. 38 to 41, inclusive, and also to Fig. 76, said raceways extend backward from the separator, swinging off to one side obliquely, as best shown in Figs. 5, 13 and 54, and rising at a proper angle to and entering the tack pot 325, suitably mounted on the machine head. Within this tack pot said raceways terminate at their upper ends beneath downwardly inclined, shelving tables 326 (Fig. 57), immediately behind which turns the bucket or tack elevating wheel 327, fast on and rotated by a short shaft 328, journaled in the wall of the tack pot. This shaft, at its outer end, has fast upon it a gear wheel 329, driven by a pinion 330 on an overhead shaft 331, journaled in the tack pot walls and provided with a belt pulley 332. The pulley 332 is driven by a belt 333 (Fig. 55), passing over suitable idlers 334, to and operated by a driving pulley 335 (Fig. 1) fast on the main shaft 17 immediately in front of the driving pulley therefor.

Tacks deposited in the bottom of the tack pot, are elevated by the wheel 327, and deposited upon the shelving tables 326, down which they gravitate into the two raceways 258, working gradually down the latter into position directly behind the gate which closes the lower end thereof at all times except when the separator is ready to receive the lowermost tack from each raceway.

To clear the raceway of all improperly placed tacks, I have provided within the tack pot a rotary clearer 336, mounted on a short shaft 337, driven by gear wheels 338 and 339 from said overhead shaft 331. The raceway, throughout the larger part of its length, is provided with a cover 340, hinged at one side as indicated at 341 (dotted lines, Fig. 54, and full lines, Fig. 56), so as to be turned back to uncover both raceways. One of the hinges of said cover is provided with a jack knife spring device 342 (Fig. 59) to hold said cover in either of its extreme, upturned or downturned positions. At their lower ends (Figs. 54, 56 and 60), where the said raceways sweep or curve into position to deliver their tacks to the separator, a separator cover is used, the same as shown comprising separated strips 343, connected by spacer blocks 344, and clamped in position by a thumb screw 345.

To facilitate the entrance of the materials to be lasted, into or between the open jaws of the pincers and, also, to reduce so far as possible the necessary separation or opening of said pincer jaws, I have provided a pair of deflectors which, at the proper times, are moved to bend or flex the upwardly projecting marginal edges of the materials forward, into approximate alinement with the jaw opening, so as readily to enter between the jaws. These deflectors are best shown in Figs. 49 to 53, inclusive, to which reference may now be had.

Referring first to Fig. 3, one of the deflectors is shown at 346, the same standing in position directly behind the pincer jaw opening. Referring to Fig. 4, both deflectors will be seen, one standing at each side the pincers. Since these deflectors do not, in the embodiment of my invention here shown, travel laterally with the pincers, they are spread sufficiently to permit of the maximum pincer movement between them. Referring now to Figs. 49 to 51, and 78 and 79, the said deflectors 346 are mounted at their lower ends in separate holders 347, mounted upon a transverse, horizontal pivot pin 348. This pivot pin turns in the arms of a supporting yoke 349, which extends under each of the deflector carriers and up between the same to furnish an intermediate support for said pivot pin. Said yoke support is also provided with a rearwardly and upwardly extended arm 350 which is supported, top and bottom, in the outer ends of parallel links 351, mounted to swing about centers 352. The uppermost link 351 is fast on a horizontal pivot shaft 352 (see Figs. 78 and 79), fast upon which is a bell-crank lever 352ª, controlled by a spring 352ᵇ. This bell-crank lever 352ª is connected with the starting treadle by a depending rod 352ᶜ, so that when the treadle is elevated to stop the machine the shaft 352 (Fig. 78) and the uppermost link 351 thereon will be elevated, to elevate the arm 350 and its yoke 349, to throw back the deflectors from interference with the work to be removed from or introduced between the pincer jaws. When, however, the starting treadle is depressed to start the machine the said yoke 349 is likewise depressed, to throw the said deflectors forward into active position. When so thrown forward the deflectors should, for the best results, be periodically withdrawn from the materials, to permit of free feeding movement thereof, and again turned outward just prior to each seizure by the pincers. For the best results, these deflectors should not be moved co-incidentally with the opening and closing movements of the pincers jaws, but should be withdrawn immediately after the closing of the jaws and before the latter have been opened, to give sufficient time for the change of position of the materials before the deflectors are again dropped forward preparatory to a new seizure by the pincers. This periodical oscillation of the deflectors from deflecting to non-deflecting position, is accomplished herein by providing the inner, tail ends of the deflector carriers 347 with an overlying pin 353, shown best in Figs. 78 and 79, which pin is carried in the rear end of an arm 354, mounted upon the pivot pin 348 between the two deflector carriers 347. To the inner end of this arm is attached a spring 355 (Fig. 79), which is secured at its lower end to a pin on the machine column. This spring tends to draw downwardly the tail ends of both deflector carriers, thereby to elevate or turn into non-deflecting positions both of said deflectors, such movement being limited by a stop plate 355ª,—shown best in Fig. 79,—in which seats the pin to which the upper end of the spring 355 is connected.

The transverse pin 353 referred to is connected by a pair of depending springs 356 with the tail portions of the finger carriers (as best shown in Fig. 79), so that any lifting of the pin carrying arm 354 will act, through the said springs 356, to lift the inner, tail ends of both deflectors, to cause the active ends of the latter to be dropped forward into deflecting position, this forward movement being yielding so as to permit the said deflectors to yield independently in the presence of any undue resistance to their forward, deflecting movements To produce this elevation of the pin carrying arm 354, I have provided, immediately beneath it, an adjustable lifting screw 357 (Figs. 50 and 79), mounted intermediately in a lifting lever 359 (see Fig. 49), fulcrumed at one end upon the fulcrum screw 352, and at its opposite end connected at 360, to the lower end of the lifting link 296 (see Fig. 35) which lifts the suspended beam 288 that operates the tack moving fingers of the tacker and separator, as described. When said link is lifted to withdraw the fingers and move the separator to receive a new pair of tacks, (which takes place at the end of each cycle of movements of the machine) the same lifting movement of the said link will cause the lever 359 and its screw 357 (Fig. 53) to be lifted to throw the deflectors forward into deflecting position to deflect the materials between the pincer jaws. Thus, in the operation of the machine, the deflectors are periodically thrown forward into deflecting position coincidently with the movements of the tack controlling devices for the reception of tacks from the stationary raceways; and, reversely, the said deflectors are withdrawn from deflecting position by the movements of the tack controlling devices that place the newly received tacks in position in the tacker, to be subsequently driven behind the pincers, which have just pulled over the materials. This mechanism, by placing the deflectors in deflecting position at the close of the cycle of movements of the machine, would leave such deflectors in their forward deflecting position when the machine comes to rest, where they would interfere with the withdrawal and insertion of the work, were it not for the connection of said deflectors as already described with the starting and stopping treadle, whereby the movement of said treadle to stop the machine always causes the withdrawal of the deflectors, irrespective of the position of the periodically moving deflector actuator. When the treadle is moved to start the machine, said deflectors are again thrown forward as described into position where they will be subseqently and periodically controlled by the link 296 which operates the tack controlling devices, all as described.

It will have been observed that the up-draw action of the pincers is wholly through the medium of the spring 28 (Fig. 11). It is frequently desired, when lasting a shoe, to have the tension of this spring varied or variable, because at some points in the shoe it is desirable to pull with a greater tension than would be safe or desirable at other points and also, where the stock is variable in quality or weight, it is frequently desired to vary the tension upon this spring in order to exert a greater or less pull as occasion may require. My present invention comprehends means for varying this pull at any time and to a variable extent and yet without imposing the burden of tensioning the spring upon the operative who controls it, the machine itself furnishing the power for tensioning the spring, always, however, under the direct control of the operative.

The washer 33 (Fig. 20) previously described as interposed between the nuts 31 and the upper end of the tubular guide 20, overlies the hub 361 of a stirrup, the oppositely extended arms 362 of which enter slots in a pair of triangularly shaped hangers 363 (Fig. 3), which are pivoted upon the transverse pin 18, previously described as mounted in the front end of the up-draw lever 3. These hangers 363 are connected at 364 to the front ends of a pair of links 365, jointed at their rear ends to the free end of a transfer rocker arm 366, fulcrumed at 367 on the up-draw lever. This transfer rocker is, in turn, connected by a rearwardly extended link 368 with the upper end of a short lever 369, fulcrumed at 370 also on the up-draw lever. The lower end of this lever is pocketed at its rear side to receive the front end of a pusher 371, adjustable as to its length at 372 and surrounded by a spring 373. Said spring, at its front end, is seated upon the pusher adjusting nut at 372 and, at its rear end (see Figs. 9ª and 62) is seated upon a washer 374. This washer, in turn, is seated against the forked arm of a lever 375 (see Fig. 9, also plan view, Fig. 5), which lever is fulcrumed at 376 upon the end of a pin 377 projecting forward from a bracket 378 (Fig. 62), rising from the rear frame bearing for the main shaft. The opposite or right hand end of said lever 375 (Fig. 9) is provided with a roller stud 379 which travels in contact with a face cam on the rear face of the cam disk 16, hereinbefore referred to.

Referring now to Fig. 9ª, the forked end of said lever 375 receives transversely through it and in a nearly upright position a nearly vertically sliding plunger 380, provided with a pocket having a plural step seat 381, and the end of the pusher 371 projects through the washer 374 into said pocket 381. The inner end of this pusher is guided longitudinally in a surrounding block 382, and is held in the opposite direction between the arms of the forked end of said lever. The plunger 380 may be moved vertically in the end of said lever to bring one or another of the steps, in the bottom of its pocket, opposite the end of said pusher, by any means, preferably manually controlled. In the present instance said plunger is provided at its lower end with a recess to receive an operating finger 383 (see Fig. 9) on a lever 384, fulcrumed at 385 on the lower end of the fulcrum pin of said lever 375. At its outer end said lever is jointed to the upper end of a rod 386 which extends downward (as shown in Fig. 9, also in Fig. 10) to and beside the column to a point about opposite the operative's knee, where said rod (see Figs. 67 and 69) is connected with the horizontal arm of a bell-crank 387, fulcrumed at 388 upon the side of the column. The other arm of said bell-crank is connected by a strut 389 with the inner end of the slide rod 139, upon the outer end of which the knee socket 140, already described, is mounted. Assuming the operative to have his knee in the said knee socket for the purpose of swinging the same to the right or to the left to vary the direction and extent of side movement of the pincers, it will be evident that without interfering with such side movement he may, by a slight forward bend of the knee, push the knee socket and its said slide rod inward, thereby to turn the bell-crank 387 and pull down upon the rod 386, to draw down the pocketed plunger into one or another position to bring one or another of its step surfaces into position opposite the end of the pusher rod 371.

At each revolution of the main shaft (Fig. 9), the cam upon the rear end thereof operates to throw the forked end of the lever 375 intermittingly forward to carry the step pocketed plunger 380 intermittingly forward against the end of the push rod 371. If said plunger has not been depressed then the forward projection of the plunger will produce no movement of the pusher, because in its elevated position said plunger presents a transverse opening to the end of the pusher. According, however, as the said plunger is pulled downward into one or another of its positions it will, when so projected forward, strike the end of the pusher 371 and push it also forward, thereby, through the connections along the top of the up-draw lever 3, already described, to lift the stirrup 362 and the spring supporting rod 26, to increase the tension upon the up-draw spring 28. The spring tension will be increased to varying degrees according to the position of the step plunger 380 referred to, and the burden of thus increasing the spring tension is in no case assumed by the operative but rather indicated by the operative and put into effect by the power of the machine, through the cam at the rear of the disk 16 referred to.

To assist the operative in positioning the plunger 380 at one or another of the various step positions required, I have provided a position indicating device upon the knee lever which is shown in detail in Fig. 68. Referring to this figure, the slide rod 139 is provided with a series of depressions 390, corresponding in spacing to the spacing of the steps in the plunger referred to, and, coöperating with these depressions is a spring actuated plug 391 which, by snapping into the depressions 390, will indicate by feeling, to the operator's knee, when the plunger has been moved into one or another of its positions. The knee socket plunger 139 is returned as soon as the operative releases the pressure upon his knee, by a spring 392 (see Figs. 9 10 and 62), surrounding the pull down rod 386, which spring operates to lift said rod together with its plunger 380 whenever the pressure of the knee is released.

Any desired starting and stopping mechanism may be employed for controlling the operation of the machine. In the present instance (see Figs. 1–5, and 62–65) I have shown the main shaft provided with a fast driving pulley 393, adapted to be belted to a loose pulley 394 on a horizontal countershaft 395 near the base of the machine (see Fig. 65). This loose pulley 394 is provided at its rear face with a conical friction surface 396, coöperating with which is a sliding, friction faced driving pulley 397, fast on said countershaft and driven from any convenient source of power. The loose pulley 394 is free to slide axially on the countershaft and is controlled thereon by a spring 398 and a wedge 393ª, the latter operated by a link 399 from a foot treadle 400, fulcrumed at 401 in the column base. Depression of this treadle causes the wedge to be lifted, to force the loose pulley 394 rearward into frictional driving contact with the fast pulley 397, thereby to communicate rotation to the overhead main shaft and to the machine. Release of said treadle permits the said wedge to drop and the machine to be stopped.

To bring the machine to rest promptly when the power is cut off, I have provided the overhead pulley 393 (Figs. 62 and 63) with a brake 402, mounted for radial movement toward and from the inner braking face of the pulley and supported against lateral movement by a link 403, fulcrumed at 404 on the frame. This brake (see Fig. 62) is adjustably mounted on the upper end of a brake rod 405, mounted to slide freely at its upper end in a suitable socket in the frame bearing of the main shaft. At its lower end (see Fig. 65), said brake rod spans the countershaft 395 and is connected to the extended inner end of the foot treadle. When the foot treadle is depressed to start the machine the brake rod and its brake are raised to free the main shaft. When the foot treadle is released to stop the machine the brake rod 405, impelled by a spring 406 surrounding its upper end (see Fig. 62), is depressed to apply the brake to the pulley 393 and arrest the machine promptly.

To permit of a certain latitude in release of the foot treadle and still bring the machine to a state of rest always at substantially one and the same point, to wit, the end of its cycle of movements, I have provided the overhead belt pulley 393 (see Figs. 62, 63) with a ring-like support 407, provided, at a point in its circumference properly positioned for the stopping of the machine at the end of its cycle, with a gap 408 (Fig. 63) and, overlying this flange is a roller stud 400, carried in the upper end of the brake member 402. With the machine at rest, this roller stud is in or below the gap 408 and with the brake in contact with the pulley. When the brake is lifted to permit starting of the machine, the said roller stud 400 is lifted clear of the ring-like support 407 and, during all periods in the rotation of the shaft, remained supported by or above the said ring 407 to prevent the foot treadle, if released, from moving to stop the machine except at such time as the roller stud 400 is permitted to drop into or through the gap 408. This mechanism is typical merely of a mechanism that may be employed for accomplishing the same result. The driving and stopping arrangement herein shown is also for the purpose merely of enabling the machine to be understood as to its mode of operation. In practice I may drive directly upon the overhead shaft 17, omitting entirely the bottom or countershaft and connections therewith.

The mode of operation of the machine described has been fully explained in connection with the detailed description of the various movements involved therein but, for convenience, I will now state concisely the general operation of the machine as it would be employed in lasting the sides of a boot or shoe.

Good practice dictates that the side lasting of a shoe should begin near the heel and progress toward the toe, whether the lasting be at the outer or at the inner side of the shoe, and to permit of this the machine has been organized, as described, to permit the side motion of the pincers to be from right to left, or from left to right, according to the particular side of the shoe to be operated upon, it being understood that the feed should be in opposite directions for opposite sides of the shoe in order to progress along the shoe in the same direction, to wit, from the heel forward to the toe upon both sides of the shoe. Assuming that the outer side of a right shoe be presented sole uppermost to the machine, for lasting, the operative with his knee in the knee socket swings said knee socket to the right, thereby sliding the pivotally connected blocks 109, 111 (Figs. 7 and 31) into position above the axis of the oscillatory shaft 113. This throw the S carrier for the pincers to the right, carrying with it not only the pincers, to the positions as shown in Fig. 4 and the sole rests close beside the same, but also, through the pin 188 and arm 179, similarly throwing to the right the back slide rest with its roller 167. At this moment, that is, at the moment of starting, or preparatory to starting the machine, the tacker is in mid-position, having been automatically placed there before the machine was stopped, by the shifting of the positioning member 315 (Figs. 25 and 28) into position with the centering pin 314 in line with the centering block 318 on the tacker carrier. The knee shifting of the S carrier to the right operates through the link 320 (Figs. 7 and 25) to turn the positioning member 315 down into a nearly horizontal starting position (Fig. 25), and subsequently when the swing of the pincer carrier has turned it upward into position, Fig. 26, said positioning member will, when slid across the front of the positioning block 318 on the tacker carrier into the position, Fig. 27, throw the tacker carrier into position corresponding to Fig. 26, behind that occupied by the pincers at that time. The operative now positions his shoe against the back slide rest (as indicated in Fig. 16), pushing the latter inward to permit him to insert the upwardly projecting margin of the materials to be lasted between the pincer jaws and to get the sole rests 148 into the channel, whereupon he releases the shoe somewhat and permits the back rest to spring forward and push the shoe also forward to the sole rests. He now depresses the starting treadle to operate the machine. This first causes the deflectors 346 to fall forward to deflect the materials forward into approximate alinement with the gripping face of the lower pincer jaw and similarly sets in motion the machine.

As the main shaft begins its rotation, it begins to turn the lever 66 (Fig. 7) to close the pincer jaws one upon the other, but before this closure is completed the short lever 198 connected with said lever 66 is lifted to release the back rest locking spring 193 (Fig. 8) and permit the ratchet toothed locking block 191 (Fig. 11) to rise and lock the back gage in position holding the shoe. Immediately thereafter, and still before the pincer jaws have been closed, the small cam 163 (see Fig. 21) on the front end of the main shaft operates through the connections there shown to depress the sole rests 148 to seat them firmly in the bottom of the channel, thereby to grip the work firmly between them and the back rest. The machine is also preferably so timed that the side movement of the pincers, together with the side movement of the sole rests 148 and back slide rest 167, will begin and will be actually under way, all moving as a unit together with the work held between them, before or as the pincers seize upon the work. The up-draw movement of the pincers begins immediately following the seizure of the work and, for the best results, though not necessarily, should be completed by the time the pincers, work, etc., have traveled to the left to about mid-position, that is, to position opposite the vertical median line of the machine. During this first half of the side travel of the pincers the tack separator 256 (Figs. 35 to 42, inclusive) remains for a substantial period in its tack receiving position (indicated by Fig. 39) to furnish as much time as possible for the lowermost tacks in the two raceways to gravitate forward into position in the separator slots. By the time the pincers and the work have gotten well under way in their side travel, the tack separator may be moved to feed the two tacks received by it, forward and downward into position to be taken by the fingers 267 (Figs. 42, 43) which latter continue the tack movements, delivering them against the sides of the rising tack drivers which had scarcely left their lowermost tack driving positions when the machine was started. The rising movement of these drivers, in frictional contact with the heads of the tacks that are crowded against the same, tends to pull the points of the tacks inward so that the said points snap into the driver passages the moment the drivers have risen sufficiently. At about this time, that is, as the pincers in their side travel reach or pass mid-position, after or somewhat before completion of the up-draw movement, the over-draw movement may begin. At about this time, also, the oscillation of the shaft 118 has carried the link 328 (Fig. 25) far enough over the dead center line to begin to draw the positioning member 315 outward and downward (Fig. 25), thereby carrying the centering pin 314 away from the center of the centering block 313 which positioned the tacker to receive its tacks, and sliding the positioning member through the slotted face of said block, to bring the center of the pin 319, connected with the pincer carrier, up to a position coinciding with or approximating the center of said centering block (Fig. 27), thereby causing the tacker on which said centering block is mounted to be swung about its fulcrum into position corresponding to that of the pincer carrier which has moved it. This operates to carry the tacker to one side, namely, to the left, following the continued movement of the pincers to the left until they both finally come to rest in positions at the left of the vertical median line of the machine corresponding to the original position of the pincers at the right thereof.

It has been stated that the over-draw movement of the pincers began at about the time the pincers in their side travel passed mid-position, and that at about the same time the tacker began similarly to move to the left; now, since the tacker is drawn forward by the over-draw movement of the pincers, it will be understood that as the said tacker is drawn to one side, it is also drawn forward by and to follow the over-draw movement of the pincers, so that when the pincers finally come to rest in their extreme position at the left, the tacker will not only have been moved similarly to the left but will have been drawn forward into the position indicated in Fig. 19. When the tacker reaches its final position (Fig. 19) the timing of the mechanism is such that the tack drivers are released and are driven sharply downward by their driving spring to drive the tacks into the work to any desired extent as indicated in Fig. 19. As the tack block is drawn forward by the over-draw movement of the pincers its leading, lower edge, preferably rounded for the purpose, meets the up-drawn and over-drawn materials just above the point where they are bent over the edge of the insole (see Fig. 18) and, if necessary, lays such materials down upon the insole preparatory to the driving of its tacks, the pincers opening to release the work.

It is desirable that the tacks be driven always at a uniform distance from the bottom of the channel and, since the channel position is here determined by the sole rests 148 that travel therein, it is clear that if the outward movement of the tacker over the last be arrested always at a given distance from the said sole rests, or from the frame in which said sole rests are mounted, the tacks, when driven, will occupy uniform distances from the bottom of the channel. For this purpose, the tacker hanger 214 (see Fig. 6) is provided near its upper left hand hinge point with an upward extension 410 which (see Fig. 2) is provided with a fiber or other suitable contact plug 411, which meets an adjustable stop screw 412 carried on the tacker hanger. By adjusting this stop screw the outward movement of the tacker may be arrested at any desired point. When, however, the tacker has been so arrested, there may still be further outward or over-draw movement of the pincers by reason of the spring 229 (Figs. 47 and 48), by which the pincer movement is communicated to the tacker hanger and which will compress as required to permit of such movement.

As heretofore stated, the transverse or side movement of the pincers is positive since it takes place with the corresponding movement of the work, while the up-draw movement of the pincers is wholly spring actuated. The over-draw or forward movement of the pincers, however, is first positive and then, as it begins to do its work, becomes yielding; and this early positive over-draw movement is communicated positively to the tacker to impart to the latter its initial forward movement until all the parts have been set in motion, when this connection also becomes yielding so that, as heretofore stated, the forward movements of the pincers and the connected tacker, which involves overcoming considerable inertia, is first positively controlled, and when the inertia has been overcome they become wholly spring controlled for the performance of their work. The pincers have now drawn over the work, it has been tacked, and, in the meantime, the work has been fed from its starting position at the right to its final position of feed at the left. The deflectors which had deflected the materials forward for initial engagement by the pincers were withdrawn immediately so as not to drag upon the work as the latter was carried to one side in feeding, they having been withdrawn as stated by the first movement of the tack separator.

The pincers having been released and the tacks driven, the sole rests are elevated and withdrawn slightly from the channel, the back slide 169 is unlocked by depression of the ratchet block 191, Fig. 11, and its frustoconical bearing roller 167 is also unlocked by removal of the locking plate 201, whereupon the pincers, the sole rests, and the back slide rest are simultaneously returned to their original positions, at the extreme right, preparatory to a new engagement of the work by the pincers and a new feed. The tacker also returns, but to its mid-position, to receive a new supply of tacks. As soon as practicable after the pincers have been released to return for another engagement of the work, the added tension placed upon the up-draw spring 28 is removed by rotation of the cam from under the roller stud 379 (Fig. 9), to furnish the operative as much time as possible for readjustment of said spring tension before the pincers again engage the work for the next succeeding pulling movement. If no readjustment of the spring tension is necessary, or desired, the cam on the main shaft will continue to relieve and re-apply the same uniform tension following and preceding each release and closing of the pincers until the operative, by movement of his knee lever, changes the position of the stepped plunger 280 to produce a different spring tension.

It has been shown that the in and out movement of the tacker is obtained from the pincer carrier through the roller stud 240, (Figs. 6 and 46), working in the slotted head 242. This slot permits of considerable transverse or swinging movement of the pincer carrier without corresponding movement of the tacker, in order that with the pincers and tacker at the limit of their transverse movements in either direction, they may be returned together until the tacker has reached mid-position where it is arrested by movement of the positioning member described in order that it may receive its supply of tacks for the next operation, while the pincers are permitted to continue their movement beyond mid-position to starting position at the opposite side of the machine, said roller and slot permitting this relative side movement while at the same time holding the tacker back against the face plate of the separator mechanism to receive its new tacks. It is important that the pincers and tacker should return rearwardly before any substantial transverse movement in order that the tacker may be cleared of the work so as not to drag unnecessarily thereon while being returned to its mid-position for receiving its tacks. The tack feeding fingers 267, that are mounted upon and movable with the tacker, recede and are elevated during the return of the tacker and, just prior to the arrival of the tacker to its mid-position, or immediately thereafter, the separator and its gate begin their return movement to permit the lowermost tacks in the two raceways to gravitate into position in the upper rear ends of the separator slots in readiness to be fed forward to the tacker by feeding movement of the separator. The work has now been fed, and the return movements of the parts just described, for a new pull, having been mechanical, have taken place much more quickly than it would have been possible to feed the work by hand had there been no feed during the pulling movement. It follows, therefor, that there has been less loss of time in my machine between successive pulls, consequently the machine is more rapid.

The continued operation of the machine causes a repetition of the cycle of movements above described until the entire side of the shoe has been lasted. Whenever during the progress along one side of the shoe, particularly when working from the shank onto the ball, it is desired to increase the effective pull upon the pincers, the knee socket may be pushed inward as described to cause the machine automatically to increase each pull to a degree determined by the extent to which the knee socket is so pushed.

Having completed the lasting of one side of the shoe and, with or without stopping the machine, the operative reverses the shoe to present the opposite side to the pincers and now, because the feed, to progress still from the heel toward the toe, must be in an opposite direction, that is, from left to right, he throws the knee socket to the left. This causes the pivotally connected slide blocks 109, 111 to be slid downward and outward to the opposite side of the axis of the oscillatory shaft 113, to cause the & carrier for the pincers to be moved from its starting position at the right, across into a new starting position at the left. The said blocks 109, 111 being now at the lower or outer side of the axis of the oscillatory shaft 113, the oscillation of said shaft will now cause opposite movements of the parts that produce the side travel of the pincers, causing the latter to be moved from left to right while the pulling is in progress so that the feed is now to the right instead of to the left, as before, and still from the heel toward the toe. This change in starting position of the S carrier caused a corresponding change of angular position of the positioning member 315 to that shown in Fig. 28, so that when it is now drawn across the face of the centering block to the position, Fig. 30, it will shift the said block and its connected tacker hanger from mid-position of the latter to the right, in the direction of transverse travel of and to follow the pincers in their new course of travel toward the right, to drive the tacks at the right, instead of at the left as before. Thus, in the machine described, it is possible to feed the work in either direction at will and the feeding movement may be varied to be made more or less as desired, according to the extent to which the knee socket is swung to one side of its mid-position and the extent to which the pivotally connected slide blocks are thereby moved away from the center of oscillation of the shaft 113; and if said knee socket be permitted to stand in its mid-position, no side travel whatsoever of the pincers, tacker and related parts will occur, the machine in such condition producing a straight in and out pulling movement of the pincers and travel of the tacker. The machine, therefore, is capable of being so operated that the operative must feed the work between the pulls of the pincers, although in such case the machine probably would have to be slowed down somewhat.

While the sole rests rise and swing outward to clear themselves from the bottom of the channel to facilitate return of the parts for a new position, preferably they do not leave the channel entirely but always remain sufficiently entered into the channel beneath the channel lip to enable the operative to maintain the substantial position of the shoe, so as to avoid so far as possible accidental displacement of the shoe during such return.

Where it is not important to have the successive pulls of the pincers as close to one another as is possible with the machine, the work may be fed by the operative continuously through the machine, the pincers seizing the materials and pulling upon the same and the tacks being driven without interruption of the feed, which is continued during the return of the parts preparatory to a new pull. This would not be possible were it not for the transverse movement of the pincers together with that of the back slide. The transverse movements of the pincers herein, which is accompanied by like transverse movement of the back slide and of the tacker, should be distinguished from the transverse movement of the pincers alone and relative to the tacker and the back rest which heretofore has been incorporated in machines of this type for the purpose of plaiting the work around the toe and heel of a shoe. In the latter machines, also, this transverse movement of the pincers relative to the tacker and back rest is accompanied by a twist or turning of the pincers which is not present in my machine.

In my machine herein disclosed the transverse movements of the pincers, back slide rest and tacker do not in the least change the relative coöperation of the same in holding the work and pulling upon the materials, all of which occurs relatively precisely as if the parts had no transverse movement whatsoever. The only purpose of such transverse movement herein is, as stated, to produce the feed of the work during the pulling period, thereby to speed the machine and not in any sense to vary the character of its work.

In the machine above described the tacker is drawn forward by the pincer carrier always in the same relationship to the pincers except in so far as modified by contact of the tacker with the work, and if the shoe upper should present but a slight margin to be pulled up and over, the pincers would not, at the moment of release, have moved inward so far as with a slack upper, consequently, the tacker would not have moved in to or over the work so far as where the pincer pull was long, indicating a slack upper. Ordinarily this would be immaterial but under some conditions it might be desirable to vary the connections between the pincer carrier and the tacker so that with a full or elastic upper, requiring a long pincer pull, the tacker would advance more slowly than with a short or inelastic upper, indicating a short pincer pull. In the latter instance the tacker movement should be more rapid in order to reach a position adjacent the edge of the last, while the pincers are yet but a short distance inward from the last edge. Such a mechanism is illustrated in Figs. 70 and 71.

The pincer carrier is indicated at 22 and the tacker at 218, as in the principal figures. The connection between the pincer carrier and tacker instead of being substantially invariable, as in the principal figures, is here shown in the form of a pair of links 413, pivotally connected at 415 to the pincer carrier and supported near their leading ends upon swing fulcrum pins 416, on the pincer carrier yokes but having no lifting movement with the pincers. The inner, long arms of said links are connected by a transverse rod 417, carrying a roller 418 adapted to swing in a segmental slot 419 in a measuring plate 420, fulcrumed at 421 on the tacker hanger 214. At its lower end, the measuring plate is connected with the tacker by a pin 422, supported by a spring 423. The lower end of said measuring plate is also provided with a pin 424 which is cut away, or rabbeted, on its upper side at one end to form a flat shelf 424ª adapted to slide in contact with the upper side of a horizontally arranged groove 425ª into which the pin projects, in the face of a limiting block 425 supported on the diagonal arm 249 (Fig. 75) that carries the tack separator. The block 425 thus has transverse movement but no out and in movement. The action of the flat face on the end of the pin 424 in connection with the block 425 is precisely similar to the action of the segment 230 (Fig. 80) in connection with the stop plate 245, viz. as the tacker is drawn forward by the pincers, the movement will be positive until the shelf 424ª escapes from beneath the side of the slot 425ª and thereafter yielding through the spring 423.

It is clear that if the connecting links 418 are at the upper end of the measuring slot 419, being nearer to the axis 426 about which the tacker swings for its forward movement, such forward movement for a given pincer movement will be rapid and large. On the other hand, if the said links are at the bottom of said measuring slot, then, being farther removed from the swinging axis of the tacker, the movement imparted to the latter by the same pincer movement will be slower and of less extent. If, now, the upper presented to the pincers be slack or full, the up-draw movement of the pincers will be considerable and will serve to tip the links 418 to throw their inner ends to or toward the bottom of the measuring slot 419, so that the tacker will be drawn forward by the pincers slowly, to reach its proper tack driving position at a time only when the pincers have moved inward to a considerable distance from the edge of the last. If, however, the upper is short and scant, then the pincers will have relatively little up-draw movement, consequently will turn the said links 418 only slightly downward in the measuring slot 419 and the pincers as they move over the last will cause quick movement of the tacker to cause the latter to reach the edge of the last before the pincers have proceeded much if any beyond such edge, in order that when the pincers reach the limit of their short over-draw movement, enforced by the scant upper, the tacker will have already advanced into position to tack the upper in position. This connection is entirely automatic, adjusting itself at all times to the relative fullness or smallness of the upper so that whether the over-draw movement of the pincers be large or small the tacker will always be in position at the proper point when the pincers are opened to release the upper.

As illustrated herein, particularly Figs. 16 to 19, inclusive, the machine is adapted to operate upon what are known in the art as "McKay" sewed shoes. In such shoes the upper is laid upon the iron bottom of a last and the lasting tacks are fully driven through the sole and clenched upon the iron bottom of the last, as shown. Ordinarily a McKay insole is not channeled and it need not necessarily be channeled for use in connection with my machine, for the sole rests might serve merely as spurs or rests to engage and penetrate the inside more or less, to hold the work in position. I prefer, however, to channel a McKay insole as indicated in said figures or otherwise as may be found convenient, for the sole purpose if necessary, to furnish a guide to facilitate the passing of the work through the machine.

In using the machine upon what is known as "welted" work, the channel in the insole is already provided for the sole rests, as will be understood by those skilled in the art, and, therefore, my machine in this respect would operate similarly upon both types of shoes. In welted work, however, it is customary to use lasts without the iron bottoms and to drive the tacks but partially down to their heads, because they are to be subsequently removed after the shoe has been "welted" or "inseamed" by the securing of the insole, upper and its linings and welt, firmly together by a line of stitches. When used upon welted work, the tacker block 218 will be slotted at the fronts of its driver passages, as indicated at 218ª (Figs. 18 and 19), to permit the tacker to free itself from the partially driven tacks, and withdraw from the work, preparatory to its return to mid-position for receiving a new supply of tacks.

I have herein disclosed my invention in connection with one embodiment thereof, selected for illustrative purposes only. Obviously, my invention is not restricted to this particular embodiment.

What I claim, is:

1. A lasting machine comprising pincer jaws and approximate and final jaw closing devices therefor, said devices being rendered operative by independent means.

2. A lasting machine comprising pincer jaws and means to operate the same, comprising wedge mechanism and means to move said mechanism by separate operating devices, first for non-wedging approximate closure of said jaws and then for final wedging closure thereof.

3. A lasting machine comprising pincers and means to impart both positive and yielding pulling movement thereto.

4. A lasting machine comprising pincers and means to impart pulling movement thereto first positively and then yieldingly.

5. A lasting machine comprising pincers, means to impart movement thereto in a plurality of directions, and means for moving the said pincers in one direction operating both positively and yieldingly in succession.

6. A lasting machine comprising pincers, means to lift the same and both positive and yielding means for imparting outward movement thereto.

7. A lasting machine comprising pincers, means to move the same laterally, means to lift the same and means to impart overdraw movement thereto both positively and yieldingly.

8. A lasting machine comprising pulling pincers, means approximately to close the same and an actuating spring to impart final closing movement thereto.

9. A lasting machine comprising pincers, means to move the same transversely in two directions, means to close the pincers near the beginning of the transverse movement and to release them near the end thereof in either direction of movement.

10. A lasting machine comprising pincers, means to move the same transversely in two directions, means to close the pincers near the beginning of the transverse movement and to release them near the end thereof in either direction of movement, at the will of the operative.

11. A lasting machine comprising, in combination, pincers, a back rest for the work, means to move said pincers and back rest transversely in two directions, and means to close said pincers near the beginning and to open them near the close of the transverse movement in either direction as required.

12. A lasting machine comprising pincers, means to move the same transversely in two directions, pincer opening and closing means, a back rest and means to swing the same transversely.

13. A lasting machine comprising pincers, means to oscillate the same transversely, a back rest and means to swing the same horizontally.

14. A lasting machine comprising in combination pincers, opening and closing means therefor, means to impart pulling movement thereto, means to move the same transversely, a sole rest in juxtaposition to said pincers, and means also to move said rest transversely.

15. A lasting machine comprising, in combination, pincers, opening and closing means therefor, means to impart pulling movement thereto, means to move the same transversely, a sole rest in juxtaposition to said pincers, and means also to move said rest transversely with the transverse movement of the pincers.

16. A lasting machine comprising, in combination, pincers, opening and closing means therefor, sole rests arranged at opposite sides of said pincers, and means to move the latter and said sole rests transversely.

17. A lasting machine comprising pincers, opening and closing means therefor, a sole rest, means to move the latter and said pincers transversely, a back rest and means to move it transversely.

18. A lasting machine comprising, in combination, pincers, operating means therefor, a sole rest and means to impart both vertical and out and in movements thereto with respect to the shoe sole.

19. A lasting machine comprising, in combination, pincers, operating means therefor, including means to move them transversely, a sole rest also transversely movable and means to move it toward and from the work.

20. A lasting machine comprising, in combination, pincers, operating means therefor, including means to move them transversely, a sole rest also transversely movable and means to move it obliquely toward and from the work.

21. A lasting machine comprising, in combination, pincers and operating means therefor, a spring-pressed back rest and means to move it transversely.

22. A lasting machine comprising, in combination, pincers and operating means therefor, a spring-pressed back rest and locking means therefor controlled by said pincer operating means.

23. A lasting machine comprising, in combination, pincers and operating means therefor, a transversely movable spring-pressed back rest and automatic locking means therefor.

24. A lasting machine comprising, in combination, pincers, operating means therefor, means to move the same transversely, a spring-controlled back rest and means to move it transversely.

25. A lasting machine comprising, in combination, pincers, operating means therefor, means to move the same transversely, a spring-controlled back rest, means to move it transversely, and locking means for said rest.

26. A lasting machine comprising, in combination, pincers, operating means therefor and means to move them transversely, a spring-controlled back rest and means to move it transversely for predetermined distances irrespective of the spring-pressed position thereof.

27. A lasting machine comprising, in combination, pincers, operating means therefor and means to move them transversely, a spring-controlled back rest and means to move it transversely for predetermined distances irrespective of the spring-pressed position thereof, and locking means for said back rest.

28. A lasting machine comprising, in combination, pincers and operating means therefor, opposing work supports one of which is spring controlled and locking means controlled by said pincer operating means.

29. A lasting machine comprising pincers, operating means therefor, opposing work supports, means to lock the same in work holding position, and means to move said work supports and pincers transversely.

30. A lasting machine comprising pincers, operating means therefor, opposing work supports, means to lock the same in work holding position, and means to move said work supports and pincers transversely and in two directions.

31. A lasting machine comprising, in combination, pincers, and closing means therefor comprising a spring, means to move it in tensioned condition through a partial closing of said pincers and thereafter to render it effective for final closing of said pincers.

32. A lasting machine comprising, in combination, pincers and closing means therefor including a final closing spring and means to delay action thereof until and for final closure of the pincers.

33. A lasting machine comprising pincers having a movable jaw, a closing rod therefor connected therewith to present a lost motion, means approximately to close said movable jaw by said rod without using said lost motion, and other jaw closing means operable through said rod employing said lost motion.

34. A lasting machine comprising, in combination, pincers and spring actuated closing means therefor including a bell-crank adjustable to vary its spread.

35. A lasting machine comprising, in combination, pincers, closing means therefor, including a lever, means to move it, an independently movable spring-controlled lever mounted on said first-named lever and movable also with the latter, and a cam controlling said spring-controlled lever.

36. A lasting machine comprising, in combination, pincers, closing means including a cam-actuated, spring controlled lever, for partially closing said pincers, and a spring-actuated cam-controlled lever mounted on said first lever for finally closing said pincers.

37. A lasting machine comprising, in combination, pincers, an up-draw lever therefor provided with a longitudinal central opening, and pincer closing mechanism mounted in said opening and a part thereof arranged for longitudinal movement therein.

38. A lasting machine comprising, in combination, pincers, an up-draw lever for the same, a transversely oscillatory carrier for said lever, means to operate the latter and means to open and close said pincers while permitting transverse movement of the latter.

39. A lasting machine comprising, in combination, pincers, a carrier therefor, an up-draw lever from which said carrier is swung, a transversely oscillatory carrier for said up-draw lever, and means thereon engaging and to guide the lower end of said pincer carrier and pincer operating means.

40. A lasting machine comprising, in combination, pincers, and overdraw means therefor comprising a spring impelled actuator and positive supplemental starting means therefor.

41. A lasting machine comprising, in combination, pincers, means for imparting overdraw movement thereto comprising an actuator and its connections, said connections providing a yield to permit excess of movement of said actuator relative to said pincers on the return of the pincers after overdrawing.

42. A lasting machine comprising, in combination, lasting pincers, and means for imparting overdraw movement thereto comprising a spring-impelled actuator and connections between the same and said pincers including a yielding member.

43. A lasting machine comprising, in combination, pincers, and means for imparting overdraw movement thereto comprising a cam, and an independently operated spring actuator and connections between said cam and pincers including a yielding part.

44. A lasting machine comprising transversely movable pincers, a transversely movable lever for imparting overdraw movement thereto, and operating means for said lever and connected with the latter to permit of said transverse movement.

45. A lasting machine comprising, in combination, pincers, a depending swinging carrier therefor and a depending operating lever operated at its top and connected with said pincers at its lower end to impart overdraw movement to said pincers.

46. In a lasting machine the combination, with lasting devices, of a tacker comprising a driver bar stationarily mounted with respect to in and out movement, a driver shiftably connected therewith and operated thereby, and means to shift said driver in and out relatively to its bar and into and out of tacking position over the work.

47. In a lasting machine the combination with lasting devices of a tacker comprising a tacket head, a reciprocable driver bar therein and means to operate it, a tacker throat movably connected with said head, a driver adapted to operate therein connected with and to be operated by said driver bar and means to move the said throat.

48. A lasting machine comprising, in combination, pincers, means to impart pulling movement thereto, and an independently supported tacker connected with and to be moved by said pincers.

49. A lasting machine comprising, in combination, pincers, means to impart overdraw movement thereto, a tacker supported independently of said pincers and connected therewith to be moved by said overdraw movement thereof.

50. A lasting machine comprising pincers movable in the general direction of a line surrounding the last and automatic means to operate the same, combined with a tacker movable in the general direction of the pincer movement.

51. A lasting machine comprising transversely movable pincers combined with a transversely movable tacker and means to impart out and in movement thereto.

52. A lasting machine comprising transversely movable pincers and means to impart pulling movement thereto combined with a transversely movable tacker connected with and to be moved by said pincers.

53. A lasting machine comprising pincers, means to impart pulling and transverse movements thereto combined with a tacker connected with and to receive movements from and corresponding to the pincer movements.

54. A lasting machine comprising pincers, and means to impart overdraw movement thereto combined with a tacker and yielding connections between said pincers and tacker to move the latter by the former.

55. A lasting machine comprising pincers and means to impart overdraw movement thereto, combined with a tacker and means successively to move the same by said pincers positively and then yieldingly.

56. A lasting machine comprising pincers, means to impart pulling and also transverse movements thereto, combined with a tacker and means to impart corresponding but variable movements thereto by and from said pincers.

57. A lasting machine comprising, in combination, pincers, means to impart pulling movement thereto, a tacker and connections between said pincers and tacker for moving the latter by the former, said connections being variable to vary the movement of the tacker.

58. A lasting machine comprising pincers, means to impart lasting movement thereto, a tacker and connections between said pincers and tacker for moving the latter by the former, said connections being automatically variable to vary the movement of the tacker by said pincers.

59. A lasting machine comprising pincers, and means to impart lasting movement thereto determined by the amount of stock to be pulled upon, combined with a tacker and means to move the same by said pincers and proportionately to the pull of the latter permitted by said stock.

60. A lasting machine comprising pincers, and means to impart lasting movement thereto determined by the amount of stock to be pulled upon, combined with a tacker and automatic means to move the same by said pincers and proportionately to the pull of the latter permitted by said stock.

61. A lasting machine comprising, in combination, pincers, means to move the same transversely in two directions, a tacker, and means operated from the said pincers to move it in either direction of movement of the pincers.

62. A lasting machine comprising, in combination, pincers, means to move the same transversely in two directions, a tacker and means operated from the said pincers to move it in either direction of movement of the pincers but to a less extent.

63. A lasting machine comprising pincers and means to move them transversely from one to the opposite side of a median point, combined with a tacker and means to move the same transversely in either direction from and to said median point.

64. A lasting machine comprising, in combination, pincers and means to move the same transversely from one to the opposite side of a median point, a tacker movable from said median point in either direction and connecting devices for moving the tacker from said pincers.

65. A lasting machine provided with transversely movable pincers, means to vary the extent of transverse movement, or to eliminate it, at will, combined with a transversely movable tacker.

66. A lasting machine comprising pincers, combined with a tacker and means to move the same transversely to varying distances from a median point.

67. A lasting machine comprising pincers, combined with a tacker and means to move the same transversely to varying distances from a median point and to eliminate said transverse movement at will.

68. A lasting machine comprising, in combination, pincers, means to impart overdraw movement thereto, a tacker having out and in movements from said pincers and means to impart transverse movement to said pincers and tacker, simultaneously with said overdraw and out and in movements.

69. A lasting machine comprising pincers and means to move the same, combined with an independently supported swinging tacker moved by said pincers and a stationary tack supply device.

70. A lasting machine comprising transversely movable pincers combined with a transversely movable tacker and a stationary tack supply device to supply tacks to said tacker.

71. A lasting machine comprising, in combination, pincers having an overdraw movement, a tacker having an out and in movement controlled by said pincers and means to impart first a positive and then a yielding overdraw movement to said pincers.

72. A lasting machine comprising pincers, means to impart both positive and yielding overdraw movement thereto combined with a tacker and connections between the same and said pincers for moving the former by the latter said connections acting both positively and yieldingly.

73. A lasting machine comprising pincers, means to impart both positive and yielding overdraw movement thereto combined with a tacker and connections between the same and said pincers for moving the former by the latter, said connections acting both positively and yieldingly, and means positively to move said pincers and tacker transversely.

74. A lasting machine comprising lasting pincers and means to operate the same combined with a deflector and means independent of the pincer movement to move said deflector intermittently into deflecting position.

75. A lasting machine comprising pincers and means to operate the same combined with a pair of deflectors stationarily supported relatively to said pincers and means to move said deflectors into and out of deflecting position.

76. A lasting machine comprising pincers and means to operate the same combined with a pair of deflectors stationarily supported relatively to said pincers and means to move said deflectors periodically into and out of deflecting position and means to remove them from operative position when the machine is stopped.

77. A lasting machine comprising pincers and means to impart both pulling and transverse movements thereto, combined with a pair of independently supported deflectors spaced to permit transverse movement of said pincers between them and means to move said deflectors into and out of deflecting position.

78. A lasting machine comprising pincers and means to impart pulling and transverse movements thereto combined with a work supporting and transversely movable roller.

79. A lasting machine comprising pincers and means to impart pulling and transverse movements thereto combined with a work supporting and transversely movable roller, and means yieldingly to support the same.

80. A lasting machine comprising pincers and means to impart pulling and transverse movements thereto combined with a work supporting and transversely movable roller, means yieldingly to support the same, together with locking means for said roller.

81. A lasting machine comprising pincers and means to move the same combined with a work supporting roller and means to lock it against rotation and means also to impart work feeding movement to the locked roller.

82. A lasting machine comprising pincers and means to impart pulling movement thereto through the medium of a spring combined with manually controlled power-operated means to vary the tension of said spring in distinct steps.

83. A lasting machine comprising, in combination, lasting pincers, means to impart transverse movement thereto, means to impart pulling movement thereto through the medium of a spring, and knee-operated means for varying both the direction of transverse pincer movement and the tension of said pulling spring.

84. A lasting machine comprising, in combination, lasting pincers, means to impart transverse movement thereto, means to impart pulling movement thereto through the medium of a spring, and manual means for varying both the direction of transverse pincer movement and the tension of said pulling spring.

85. A lasting machine comprising lasting pincers, means to close and open the same and to impart pulling movement thereto combined with a deflector, and means to withdraw said deflector in advance of opening movement of the pincers.

86. A lasting machine comprising lasting pincers, means to close and open the same, means to impart pulling and also side travel to said pincers combined with a deflector, and means to withdraw the same in advance of substantial side travel of the said pincers.

In testimony whereof, I have signed my name to this specification, in the presence of two subscribing witnesses.

THOMAS H. SEELY.

Witnesses:
FREDERICK L. EMERY,
HORACE A. CROSSMAN.